United States Patent
Pitroda

(10) Patent No.: US 7,366,990 B2
(45) Date of Patent: Apr. 29, 2008

(54) METHOD AND SYSTEM FOR MANAGING USER ACTIVITIES AND INFORMATION USING A CUSTOMIZED COMPUTER INTERFACE

(75) Inventor: Satyan G. Pitroda, Oakbrook, IL (US)

(73) Assignee: C-Sam, Inc., Oakbrook Terrace, IL (US)

(*) Notice: Subject to any disclaimer, the term of this patent is extended or adjusted under 35 U.S.C. 154(b) by 572 days.

(21) Appl. No.: 09/766,221

(22) Filed: Jan. 19, 2001

(65) Prior Publication Data

US 2002/0097277 A1    Jul. 25, 2002

(51) Int. Cl.
*G06K 15/00* (2006.01)

(52) U.S. Cl. ...................... 715/745; 715/854

(58) Field of Classification Search ............... 345/834, 345/764, 781, 733, 769, 853–855, 837, 839, 345/763; 715/853–855, 771–773, 734–737, 715/740, 749, 789, 811, 745, 744, 746–747, 715/856, 804, 805

See application file for complete search history.

(56) References Cited

U.S. PATENT DOCUMENTS

| | | | |
|---|---|---|---|
| 5,619,632 A * | 4/1997 | Lamping et al. ............ 345/441 |
| 5,721,853 A * | 2/1998 | Smith ......................... 345/803 |
| 5,751,931 A * | 5/1998 | Cox et al. ................... 345/440 |
| 5,828,360 A * | 10/1998 | Anderson et al. ............ 345/834 |
| 5,832,489 A | 11/1998 | Kucala et al. |
| 6,014,135 A * | 1/2000 | Fernandes .................... 345/744 |
| 6,021,403 A * | 2/2000 | Horvitz et al. ............... 706/45 |
| 6,031,537 A * | 2/2000 | Hugh ........................... 715/854 |
| 6,043,818 A * | 3/2000 | Nakano et al. .............. 345/851 |
| 6,097,393 A * | 8/2000 | Prouty et al. ................ 345/419 |
| 6,188,403 B1 * | 2/2001 | Sacerdoti et al. ............ 345/764 |
| 6,256,032 B1 * | 7/2001 | Hugh .......................... 715/854 |
| 6,260,035 B1 * | 7/2001 | Horvitz et al. ............... 706/47 |
| 6,262,730 B1 * | 7/2001 | Horvitz et al. .............. 715/707 |
| 6,727,927 B1 * | 4/2004 | Dempski et al. ............. 715/853 |
| 2002/0199186 A1 * | 12/2002 | Ali et al. ..................... 725/28 |
| 2002/0199194 A1 * | 12/2002 | Ali .............................. 725/46 |
| 2004/0267729 A1 * | 12/2004 | Swaminathan et al. ........ 707/3 |

(Continued)

FOREIGN PATENT DOCUMENTS

EP    0 123 084 A    10/1984

(Continued)

OTHER PUBLICATIONS

Article entitled "Personal Ontologies" (Published by IEEE Internet Computing IEEE USA, vol. 3, No. 5, Sep. 1999, (Authors, Michael N. Huhns, Larry M. Stephens; University of South Carolina) pp. 85-87, XP002349591 ISSN: 1089-7801 (p. 85, col. 3, line 9; p. 86, col. 2, line 7, figure 1)).

(Continued)

*Primary Examiner*—Steven P. Sax
(74) *Attorney, Agent, or Firm*—Welsh & Katz, Ltd.

(57) ABSTRACT

Methods and systems for managing user information using a customized computer interface which is user centric and geared toward creating and managing a personal information portal. In one aspect, the invention provides computerized methods for organizing a representation of user activities and information and navigating through an information management system that utilizes the representation.

26 Claims, 57 Drawing Sheets

U.S. PATENT DOCUMENTS

2005/0149312 A1* 7/2005 McGaughy .................. 703/14
2006/0178918 A1* 8/2006 Mikurak ........................ 705/7

FOREIGN PATENT DOCUMENTS

WO        WO94/29803     12/1994
WO        WO98/20436      5/1998

OTHER PUBLICATIONS

Correspondence of Jun. 8, 2006 from T. Kimura Patent Office re "Notification Of Reasons For Refusal" from the Japanese Patent Office, & copies of 2 cited Japanese patent national publication No. 08-511117 & 07-160462, & also a copy of WO 94/29803 PCT Dec. 22, 1994

Jul. 3, 2007 translation of "Decision of Refusal" from the Japanese Patent Office, for the reasons as stated in the Notification of Reasons For Refusal dated Apr. 17, 2006 (2 pgs.) from a corresponding Japanese Appl. No. 2002-558117 Also, enclosing the Decision Of Refusal in the Japanese Language (3 pgs.).

* cited by examiner

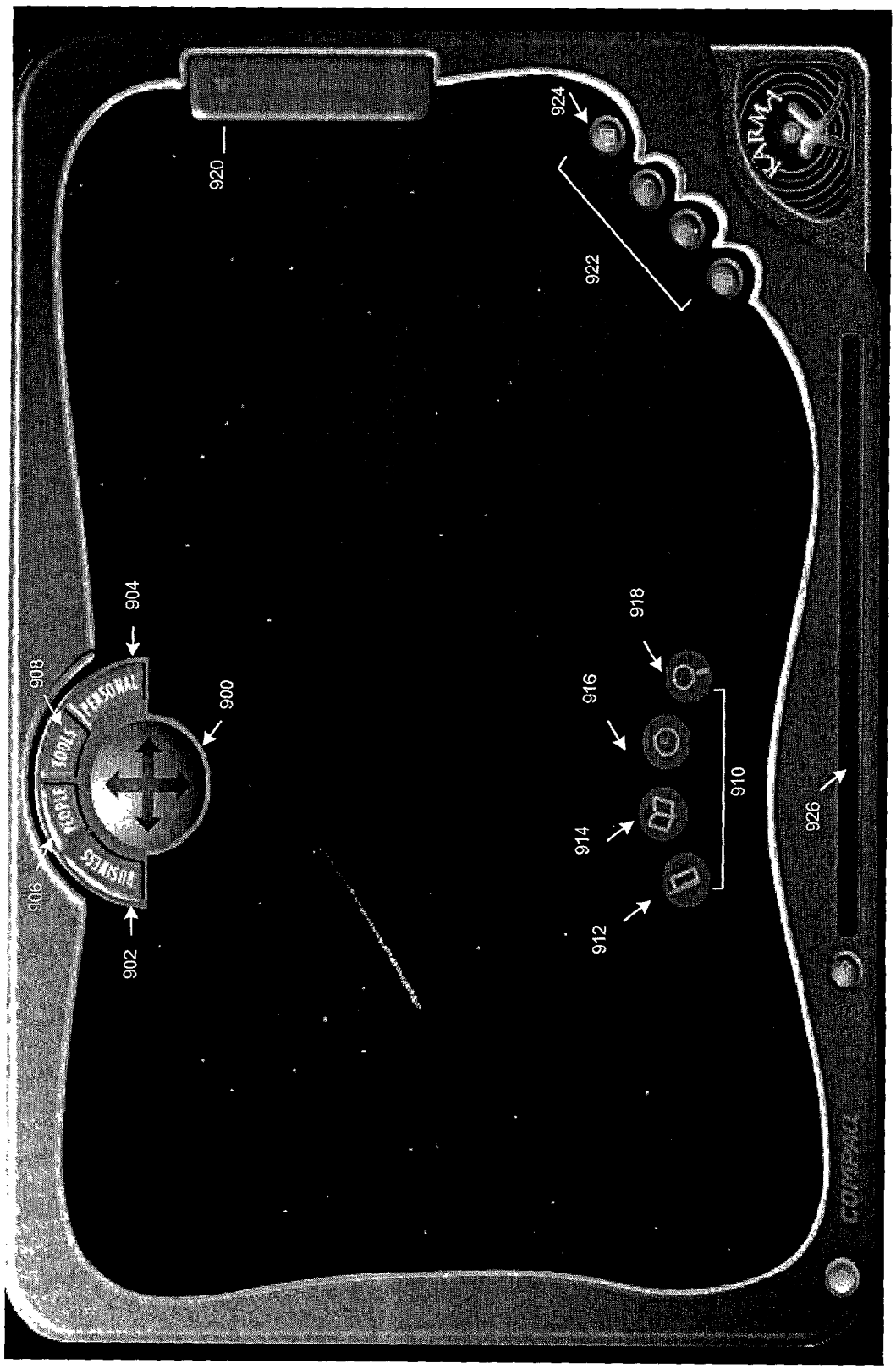

1610

1620

1640

1650

General
1512

FIG. 26

Sample Login Screen

METHOD AND SYSTEM FOR MANAGING USER ACTIVITIES AND INFORMATION USING A CUSTOMIZED COMPUTER INTERFACE

The present invention provides a method and system for managing activities and information using a user-centric computer interface.

Current computer operating systems, such as Microsoft Windows or Apple, organize and store information in a hierarchical file structure. The hierarchical file structure represents information to a computer user in a hierarchical manner using graphical icons that are analogous to folders and files found in a typical office file cabinet. While such a graphical user interface (GUI) may be superior to the prior text based systems, variants of which are still used on the Unix platform, it forces the user to organize information accordingly. The GUI requires the user to know where various applications are and, in addition, to know where files and documents produced using those applications are.

While these computer operating systems were adequate for organization of simple data files, the file cabinet analogy has proven to be inadequate for using computers to manage real life activities and information. Increased computer usage and functionality has rendered the once appropriate hierarchical file cabinet analogy inappropriate and inadequate for managing an individual's real life activities and information.

In the file cabinet structure, an individual retrieves information in one particular manner—through a single narrow traversal of a potentially deep tree-like directory structure. Such access into deep hierarchical folders greatly increases the possibility that an individual will forget how to retrieve information without mentally establishing the relationships of the folders to desired files. Many individuals do not know how to, lack the requisite computer skills, or simply are unaware of the ability to properly organize the directory structure of the underlying file system. This leads to the haphazard storage of important information and documents and potential difficulties for their future retrieval. If an individual stores a document about e-commerce patents in a subfolder designated for patent documents within a folder designated for business information, the individual may be unable to find that document if the individual's current thought process that stimulated the desire to retrieve the document stemmed from a personal (as opposed to business) interest in e-commerce (as opposed to patent) topics.

Furthermore, the office file cabinet requires the computer user to know what computer task the user wants to perform and the name of the software application that needs to be invoked to perform the specific task. If the user wants to write a letter, the user must be aware that Microsoft Word® is the application to open in order to perform word processing. Requiring the user to have such knowledge and awareness only adds to the plethora of details that the user must remember in order to properly organize information in the computer. In order to create a letter to a business contact, the individual would have to determine what particular application to use (i.e. Microsoft Word®), where to find the contact information of the business contact (i.e. Microsoft Outlook®), and most importantly, where to store the letter once it is completed.

DEFINITION OF TERMS

Characteristics—Information including general, communications, management, and documents relating to an object Child—an object that is related to and stems from a parent universe Communication—an exchange of information related to an object Jump—an object which has more than one parent object Node—an object that is a subset of a sphere Notebook—a part of a record which organizes information and provides access to transactions Object—a sphere, universe, or personality Parent—an object that is related to and contains child and jump universes Personality—an object that represents a person and is defined by data representing the person Record—Information relating to relationships Relationship—an association between objects where each object is associated with at least one sphere Sphere—an object that represents related activities and information Universe—an object that is a subset of a sphere that represents related activities and information

SUMMARY OF THE INVENTION

The present invention provides computerized methods and systems for managing user information using a customized computer interface which is user centric and geared toward creating and managing a personal information portal. In one aspect, the invention provides computerized methods for organizing a representation of user activities and information and navigating through an information management system that utilizes such a representation of user activities and information. In general, each user activity has a plurality of characteristics. These characteristics may be "general" notes about the activity, "communications" received or sent in relation to the activity, "management" of tasks and meetings related to the activity and "documents" associated with the activity.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

FIG. 9B illustrates another initial display of an example of the KUI of FIG. 1.

FIG. 10AB illustrates an example of the KUI of FIG. 1 with the focus on the Personal universe.

FIG. 10AC illustrates an example of the KUI of FIG. 1 with the focus on the People universe.

FIG. 10AD illustrates an example of the KUI of FIG. 1 with the focus on the Tools universe.

FIG. 10AE illustrates an example of the KUI of FIG. 1 with the focus on four spheres.

FIG. 10BB illustrates another example of the KUI of FIG. 1 with the focus on the Personal universe.

FIG. 10BC illustrates another example of the KUI of FIG. 1 with the focus on the People universe.

FIG. 10BD illustrates another example of the KUI of FIG. 1 with the focus on the Tools universe.

FIG. 26 illustrates a login screen utilized by an embodiment of FIG. 1.

DETAILED DESCRIPTION

Figure 1:
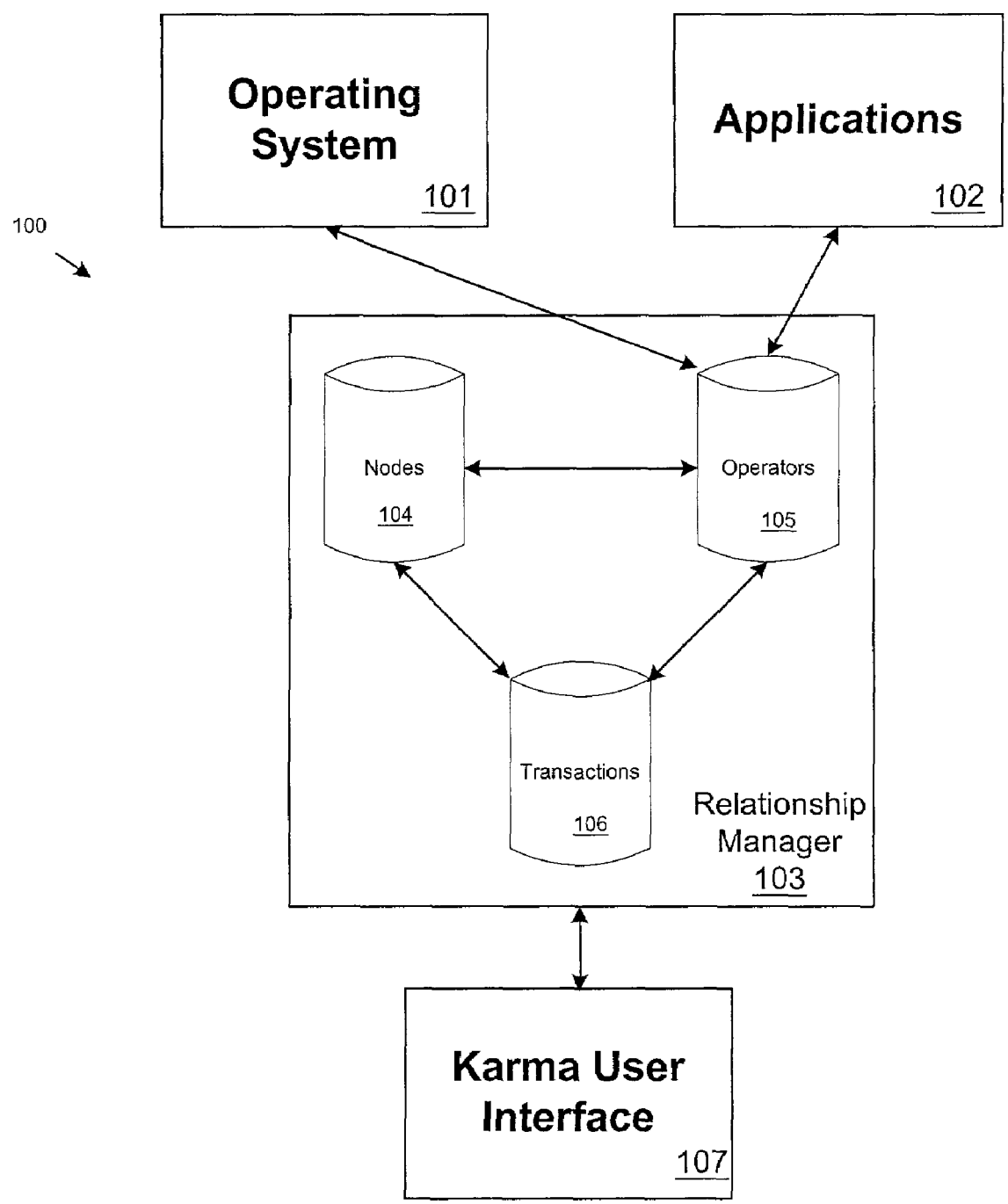
FIG. 1 is a diagram depicting a general overview of an example embodiment of the present invention.

The present invention provides computerized methods and systems for managing user information using a customized computer interface which is user centric and geared toward creating and managing a personal information portal. In one aspect, the invention provides computerized methods for organizing a representation of user activities and information and navigating through an information management system that utilizes the representation.

The method creates a plurality of spheres corresponding to user activities and information in the user's life. For each sphere, user activities and information are identified and universes corresponding to the user activities and information are created. Personalities corresponding to an individual associated with the user and the user's activities and information are created. Relationships, such as a child, parent, or jump relationship, may then be established among the spheres, universes, and personalities. A notebook may then be associated with each universe, where notebooks organize characteristics that make up the universe's activities and information as well as provide access to software applications relating to the universe's activities and information.

The present invention also provides a method for navigating through an organization of spheres, universes, and notebooks. The method displays icons representing spheres corresponding to activities and information. By selecting one of the icons representing the sphere, the sphere along with icons representing universes comprising child and jump, are displayed. The user may then traverse through related universes by selecting an icon representing a universe. The selection displays child and jump universes of which the user may select another universe until the desired universe is ultimately displayed. Upon selection of the desired universe, a notebook associated with that desired universe is displayed and the user can enter or modify any information corresponding to the universe in the notebook.

Similarly, the invention also provides a method for creating a personal portal of activities and information on a networked computer. The method comprises receiving a representation of activities and information from an external source, storing the representation on the networked computer, displaying the representation on a web page in response to a request by a privileged user, offering at least one networked based application tools t process the representation of activities and information, and synchronizing the representation of the networked computer with a different representation of activities and information on the local computer of the privileged user.

In one embodiment, the present invention provides a comprehensive user-centric computerized system that mimics the way people organize and structure their activities and information in real life. Such a system leads to more efficient use of computing time and resources since users are at ease with the system's style of organization and can therefore access documents and information more quickly.

Further objectives, advantages, and features of the invention will become apparent from the following detailed description of preferred embodiments of the present inventions when taken in conjunction with the accompanying drawings in which like reference numeral designate like elements throughout the different views.

The system and method of the present invention, referred to herein as Karma 100, provide a customized user-centric interface that is geared toward creating a personal information portal. Karma abstracts the traditional hierarchical file system so that the user is never required to access it. Karma allows a user to structure a computer in terms of the user's activities and information, relationships, and communications in order to operate and manipulate the computer in a highly efficient manner. In short, Karma places the user at the center of his or her computer and lets the user customize or build a computer interface around him or herself graphically. Consequently, the computer user's productivity may be dramatically increased by not having to think in terms of computer applications, but in terms of relationships, activities and information. The present invention provides an intuitive interface that enhances the operation of current standard computer interfaces by providing a simpler and more natural way to work with objects, applications, information, and processes that constitute a user's operation of the computer. Further, the present invention allows the user to store and access information from any number of information appliances. The personal information portal may be resident on any computer in a network. Further, the computer user may utilize the graphical user interface to access the portal from any networked computer.

An illustrative embodiment of the invention is depicted graphically in the drawings and is explained below. Referring now to the drawings, FIG. 1 diagrammatically illustrates one embodiment of a system 100 for management of data in accordance with the present invention. Briefly, the present invention may be described as comprising a relationship manager 103, an operating system 101, applications 102, and a graphical user interface 107. The relationship manager 103 is comprised of data objects that organize information provided by the user. Relationships are created among these objects so that information is easily accessed. Information about objects is stored within a nodes database 104. Each time an operator acts on a node, a transaction is generated and stored in a separate but associated transaction database 106. Operators 105 allow the user to access the information in the nodes database 104 and transaction database 106. Operators associate applications 102 such as communications applications, document creating applications, system management tools, and navigational tools with actual tasks the user may perform. The Karma user interface 107 depicts the underlying data in the relationship manager 103 and provides access to the operators 105 and applications 102. Further, the graphical user interface 107 enables the user to create data objects and establish relationships between the data objects.

Figure 2A:
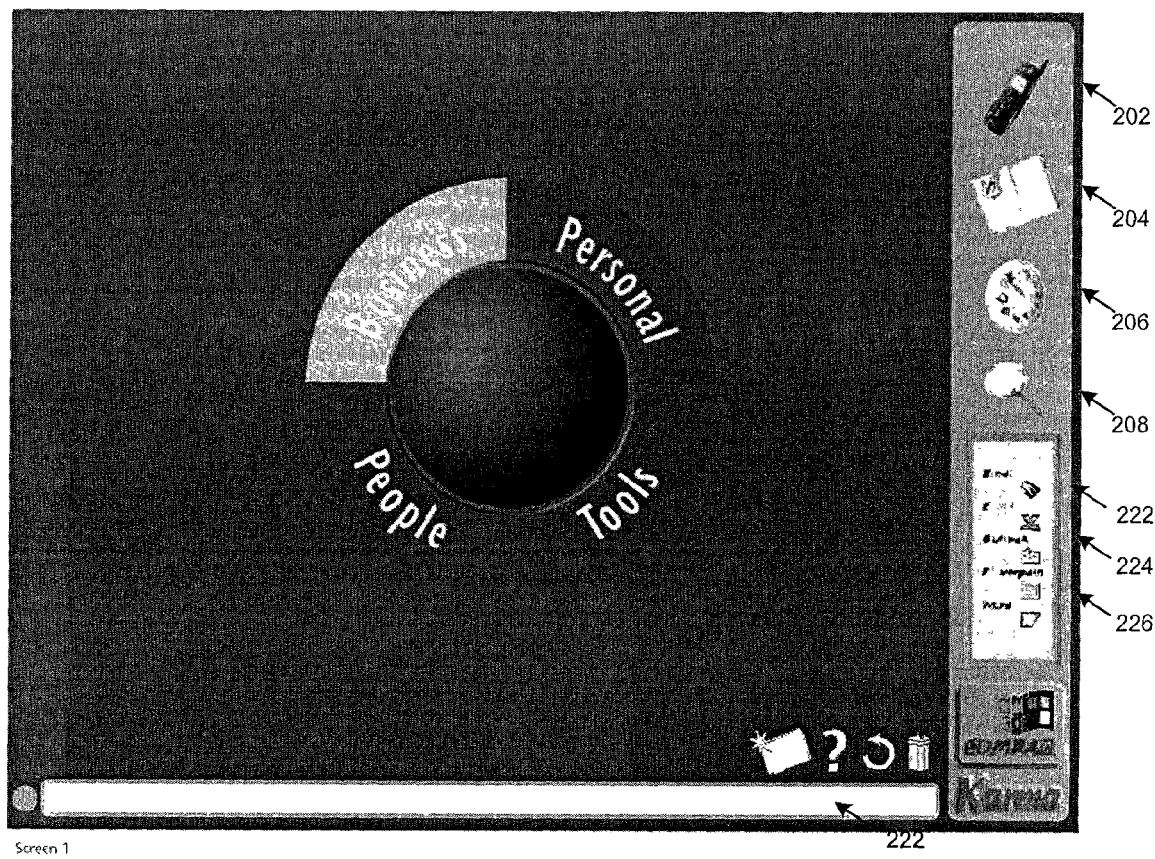
FIG. 2A illustrates an example embodiment of the KUI of FIG. 1.
Figure 2B:
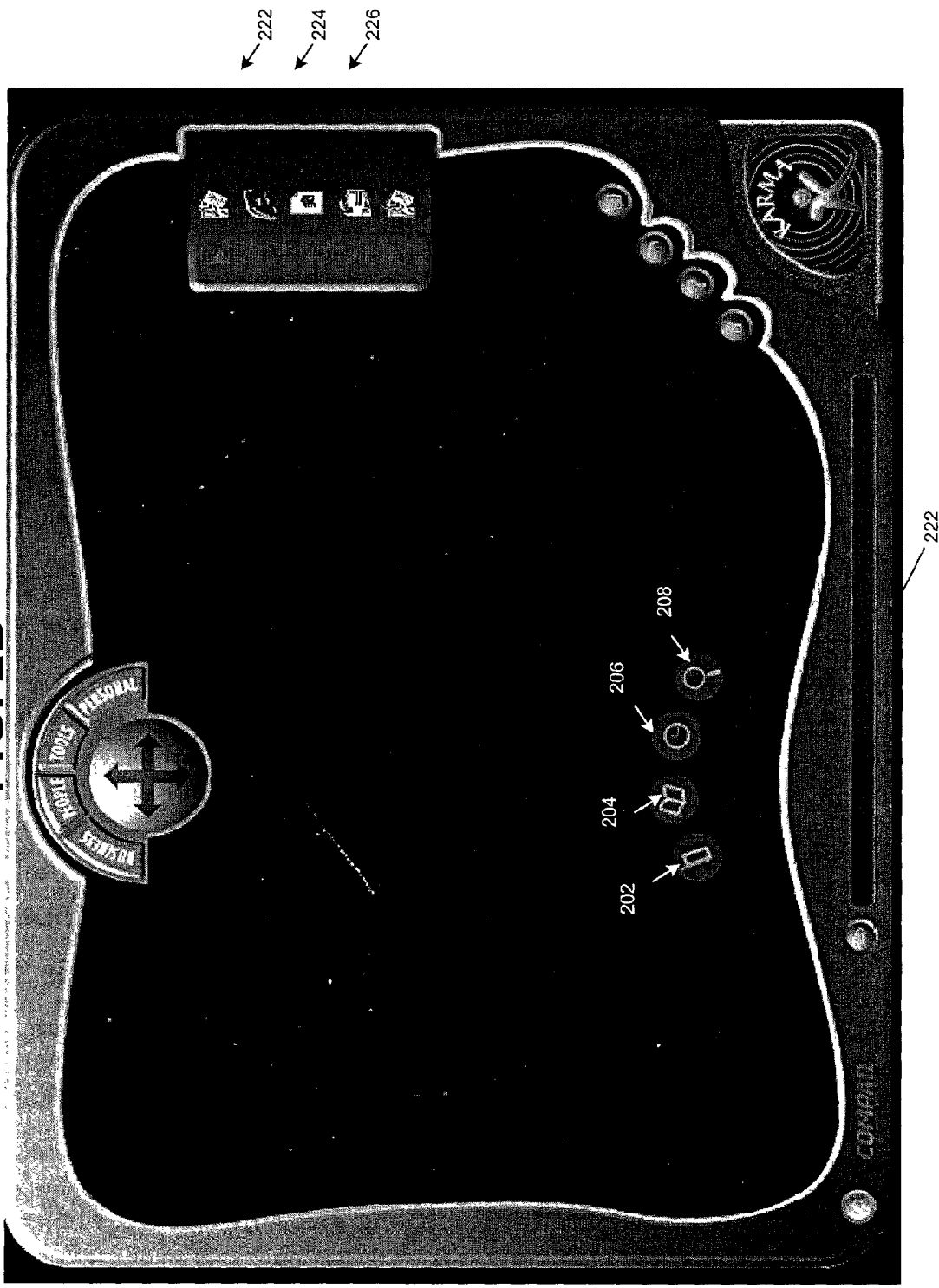
FIG. 2B illustrates another example embodiment of the KUI of FIG. 1.

The Karma system 100 places the user at the center of his or her activities and information and lets the user customize or build the system 100 including the Karma user interface 107 around them. FIGS. 2A and 2B illustrate two examples of the Karma user interface 107. In both examples, the Karma user interface 107 depicts user activities and information partitioned into two spheres of interest: personal and business. Within each sphere, Karma 100 allows the user to define universes relating to the particular activities and information and personalities relating to the people associated with the particular universe. Karma 100 allows the user to perform operations upon the universes and personalities. As shown in FIGS. 2A and 2B, operations include communication 202, management 204, history 206, and search 208. The communication operator 202 allows the user to communicate using chat, email, facsimile, mail, telephone, and voicemail. The management operator 204 allows the user to work with documents, a diary, to do lists, and appointments. The history operator 206 allows the user to review transactions of all operations performed on a universe or personality. The search operator 208 the user to search for specific text strings, people, documents, or other information stored in the Karma system 100.

The Karma system 100 may employ learning as a method to build an expert system that reflects the user's behavior, personality, information and activities to improve the user's way of life. The Karma system 100 monitors operations performed by the user to determine whether specific operations need to be performed again. For example, the Karma system 100 may prompt the user to communicate with friends that the user has not talked to in a while. By analyzing the list of transactions and tracking communications to friends, the Karma system 100 may determine that the user has not contacted a certain friend in a long time. By reminding the user to communicate, the Karma system 100 may improve the user's relationships and way of life. In addition, the Karma system 100 may learn behaviors by tracking the activities that the user regularly performs. For example, the user may regularly frequent an Italian restaurant on his or her birthday. The Karma system 100 may learn the behavior and automatically make the reservation at the restaurant when the user's birthday next arrives.

Figure 3:
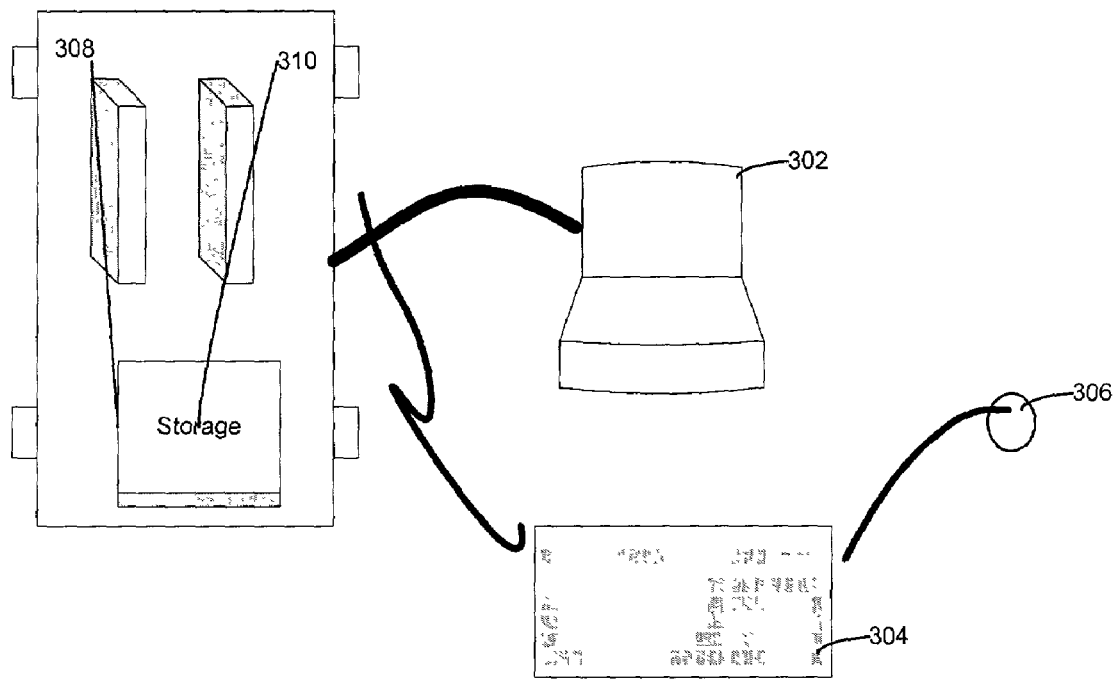
FIG. 3 illustrates an environment for utilizing the embodiment of FIG. 1.

Karma 100 may be used in conjunction with any computer system, such as a personal desktop computer, a notebook computer, a computer network, a personal digital assistant, a cellular telephone, or a mobile/wireless assistant. For example, as shown in FIG. 3, a computer system such as a personal desktop computer including a monitor 302, a keyboard 304, a mouse 306, CPU 308, random access memory (RAM) 310 and storage in the form of a hard disk. In addition, the computer may also include a floppy disk, a CD-ROM drive, read-only-memory, and a modem, as are well known in the art. Karma may also be implemented on computing platforms that emerge in the future, but in the embodiment described below it is implemented on a desktop computer. Specifically, a cellular telephone or a wireless digital assistant may also be an appropriate computing platform for Karma.

Karma may operate on top of the computer operating software currently available on a number of platforms, such as Microsoft Windows®, Apple MacOS® and Sun Solaris®. It could also be implemented as an operating system of its own on computing platforms that may emerge in the future. The computer system may be running Windows 98, Windows NT, or equivalent, Palm OS, WindowsCE, or equivalent, or an operating system used on Apple or Sun Computers. Karma is not limited to a particular operating system or computer system to function.

The computer system may use a suitable relational database to create and maintain relationships in Karma, or implement a data object store of its own. In an illustrative embodiment, an Oracle database, manufactured by Oracle, Inc., is used for the management of Karma relationships. Although an Oracle® database is used, any suitable relational database may be used, such as MS Access® by Microsoft Corporation, Inc.

The computer system is provided with software, which may be loaded from floppy disks, from a CD-ROM, over a network, or from any other suitable storage media. The software may be loaded onto the hard drive of a computer in a manner that is known to those skilled in the art.

The monitor 302 may be any display that may be viewed by the computer user. For example, it may be a cathode ray display, or a dual scan display on a notebook computer, or an active matrix display on a notebook computer. The display may optionally be touch sensitive. Further, current displays on a PIM or cellular telephone display may also be used.

The RAM 310 may be any conventional RAM that is known to those skilled in the art. The same is true of the ROM of the computer. The permanent storage may be in the form of conventional hard drives, read-write CD-ROMs, ZIP drives, or any other medium that stores data when the computer is not operating. In order to enter data or other information, the user may use a keyboard, either alone or in conjunction with a pointing device, such as a mouse, or a pointer used on a touch sensitive screen. Alternatively, the information may be entered by voice command using any conventional voice command software package.

In addition to a personal computer, this invention may be practiced using a network computer, a "dumb terminal" on a multi-user system, or an Internet or Intranet computer, in which software is resident on the Internet or Intranet, rather than stored on a hard disk on a personal computer. In one embodiment, information is stored in a database of a networked computer where the computer user may access the networked computer from any computer appliance with access to the networked computer. In such an embodiment, a personal information portal is available to the computer user to manage the user's activities and information.

The relationship manager 103 functions to create, store, and manage associations between data objects in the Karma system 100. Data objects are defined as spheres, universes, personalities, and notebooks. At the highest level of abstraction, spheres represent the main areas of a user's life, whereas universes and personalities represent activities and information that fall under the main areas or spheres of a user's life. Further, universes and personalities are collectively termed "nodes" and form the basic element to represent user activities and information.

Figure 4:
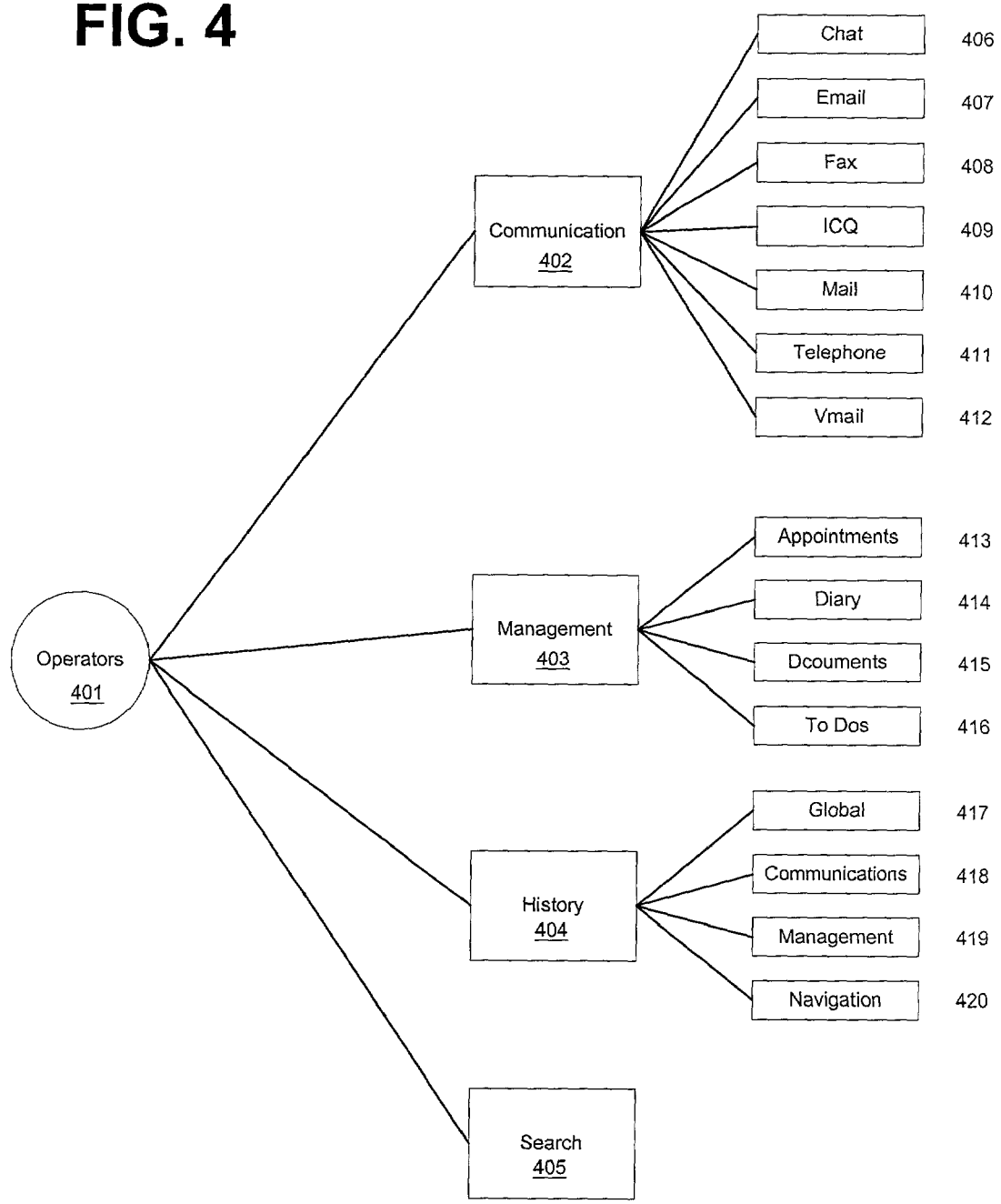
FIG. 4 illustrates operations performed by an embodiment of FIG. 1.

The relationship manager 103 keeps track of the data objects and operations performed on the data objects. Operations are performed by invoking an operator 401 form the operations database 105. As shown in FIG. 4, in an illustrative embodiment of Karma 100, operators 401 fall into four main groups: communication 402, management 403, history 404, and search 405. When an operation is performed on a data object, a transaction is kept in a database in the transactions database 106. The transaction includes the data object acted upon, the operation performed, and the date and time of the event. Although four main groups of operators have been defined, the list is illustrative and not meant to be exhaustive. For example, an operator 401 to calculate expenses or to track financial matters may be defined.

The communication operator 402 allows the user to perform and manage communications with universes and personalities. The Internet relay chat operator 406 allows the user to join an IRC chat server that the user has defined in a notebook associated with the data object. The Email operator 407 allows the user to send an email to an email address stored in the notebook associated with the data object. The fax operator 408 allows the user to send a facsimile to a fax number stored in the notebook associated with a particular data object. The ICQ operator 409 allows the user to communicate with a particular Internet real time messaging ICQ member whose details are stored in the notebook associated with the data object. The mail operator 410 allows the user to send a letter to an address stored in the notebook associated with a particular data object. The telephone operator 411 allows the user to call a number stored in the notebook associated with the particular data object. The Vmail operator 412 allows the user to listen to the voicemails received from a personality or to send voicemails to a particular personality. Although seven groups of communication operators 402 have been defined, the list is illustrative and not meant to be exhaustive. For example, a communication operator 402 to allow the user to send and receive messages via a two-way radio system may be defined.

The management operator 403 allows the user to manage information associated with the data objects. Management operations include appointments 413, to dos 416, diary 414, and documents 415. The appointments operator 413 allows the user to schedule appointments relating to a particular data object. The To dos 416 operator allows the user to create a task associated with a particular data object. The diary operator 414 allows the user to view all appointments and to dos relating to a particular data object. The documents operator 415 allows the user to create a document associated with a particular data object. Although four groups of management operators 403 have been defined, the list is illustrative and not meant to be exhaustive. For example, a management operator 403 for tracking a budget or expense account may be defined.

The history operator 404 allows the user to review all activities and information. The user may review activities and information globally within the Karma system 100 or specify activities and information for a specific node. In either case, the user may specify a specific time period for which to review activities and information. By specifying a time period, the Karma system 100 filters all activities and information to those within the specified time period. For example, the user may wish to review all communications relating to a particular data object that took place between Jan. 1, 1999 and Jan. 1, 2000. The history operator 404 also allows the user to review communications 418 and management 419 operations. For example, the user may wish to review all management 419 operations performed the previous day. The history operator also allows the user to review navigation 420 entries in the Karma system 100.

The search operator 405 allows the user to perform a text string search either globally or upon a particular data object. Searching allows the user to retrieve misplaced or forgotten information related to the user's activities. For example, the user may need to recall whether his car stereo is still under warranty. Searching for the term "car stereo" may retrieve the date of purchase for the item.

Figure 5:
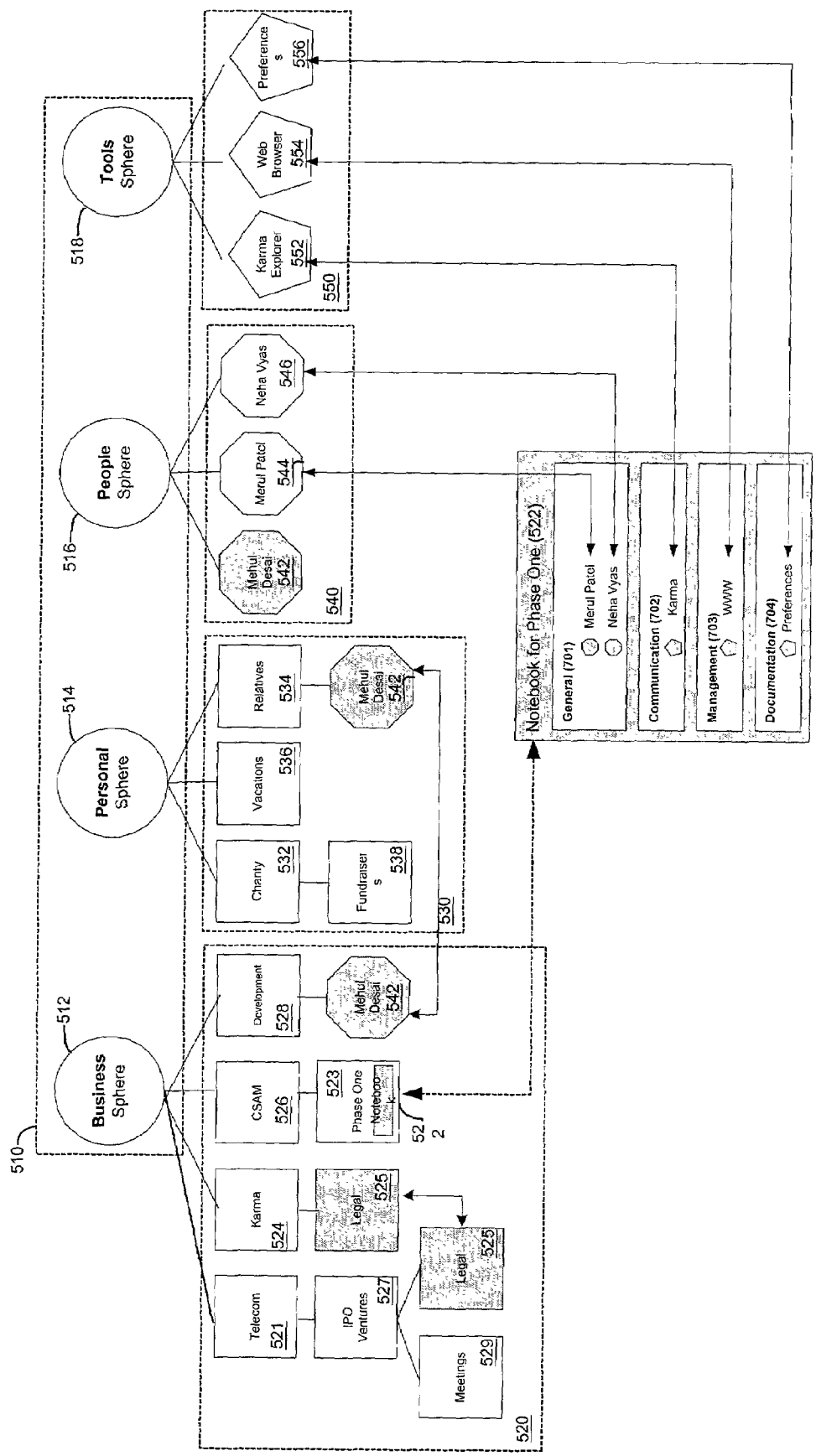
FIG. 5 illustrates one embodiment of FIG. 1 with predefined spheres.

FIG. 5 depicts an illustrative embodiment of the Karma system 100 and illustrates the general relationships between data objects in the Karma system 100. At the highest level of abstraction, the system contains a plurality of spheres 510. These spheres 510 may represent facets of an individual's real world existence. For example, business sphere 512 represents the user's profit related activities and information and personal sphere 514 represents the user's non-profit related activities and information. Since the Karma system 100 represents the user's real world existence, a student may define a "School" sphere or "Academic" sphere and a retiree may define a "Hobbies" sphere. Although in an illustrative embodiment, there are four predefined spheres, the Karma system 100 may accommodate any number of spheres without limit. Further, the Karma system 100 may be preconfigured for particular spheres. For example, in a student version of the Karma system 100, the Karma system 100 may be preconfigured for "School" and "Home" spheres.

In an illustrative embodiment, the Karma system 100 may present a personal sphere 514 that is pre-configured for the following universes: family, friends, relatives, entertainment, hobbies, sports, shopping, voluntary activity and self. Further, selection of the family universe may present the following sub-universes: spouse, son(s), daughter(s), father(s), mother(s), brother(s), sister(s), grandparent(s), mother-in-law, father-in-law, brother-in-law(s), sister-in-law(s), nephew(s), niece(s), aunt(s) and uncle(s). Alternatively, the Karma system 100 may interview the computer user to determine how the Karma system 100 should be configured. For example, the Karma system 100 may ask the computer user how many children the user has and in response to the question, the Karma system 100 may configure the personal sphere 514 to include universes for each child.

In addition to maintaining data objects, the relationship manager 103 manages relationships between data objects. For example, the computer user may be engaged in a number of business ventures and define a business sphere which represents user activities and information related to profit matters. In FIG. 5, business sphere 512 has been defined to represent the user's business activities and information relating to businesses "Karma" 524, "CSAM" 526, "Development" 528, and "Telecom" 521. Businesses "Karma" 524, "CSAM" 526, "Development" 528, and "Telecom" 521 are termed "primary" since they stem directly from the business sphere. Business activities and information relating to telecommunications are represented as "Telecom" 521 and the node representing telecommunications business activities and information is considered to be a primary universe in the business sphere 512.

Relationships between data objects in the Karma system 100 may be hierarchical. For example, activities and information relating to the business "CSAM" are maintained in CSAM universe 526 and CSAM 526 is termed a primary universe. CSAM universe 526 contains a universe relating to Phase One activities and information named Phase One universe 523. Phase One universe 523 is a secondary universe since it stems from a primary universe. Further, CSAM universe 526 is termed a "parent" universe of "child" universe Phase one 523. In addition to relationships being hierarchical, each universe may relate to more than one universe. For example, in FIG. 5, Legal universe 525 is related to both the Karma universe 524 and to IPO Ventures universe 527. Since Legal universe 525 is related to both Karma activities and information and to IPO Venture activities and information, Legal universe 525 is termed a "jump" universe. "Jump" relationships represent the fact that many activities and information in a user's life do not fall neatly into one category or another, but may blend across many. Where there is overlap between two spheres or universes, an association between the two data objects may be made by naming the relationship a "jump."

In addition to universes, relationship manager 103 manages personalities. Personalities represent people in the user's life. Each personality is defined by data representing an individual's characteristics. For example, data defining personalities may embrace information including name, address(es), telephone number(s), connections, habits, hobbies, sports, skills, likes and dislikes. The user may define and input characteristics corresponding to personalities in the Karma system 100. For example, in FIG. 5, Merul Patel may be defined by information including his work address of 5 Lower Regent Street, London, and his email address of merul@intouch.com. In FIG. 5, there are three personalities defined that represent people in the user's life. They are Mehul Desai 542, Merul Patel 544, and Neha Vyas 546.

Personalities may be related to universes. As in life, people exist not only as individuals but also as relationships to activities and information the user engages in. For example, a person may be someone that the user knows and that person may also be a business partner. The Karma system 100 lists all the people in the user's life by tracking their names in the people sphere. Further, since these individuals may also be related to the user's business or personal activities and information, the personality is also listed in another place under the appropriate sphere. For example in FIG. 5, Mehul Desai 542 is shown in the people sphere since he is a person the user knows and he is also shown in the personal sphere 514 since Mehul is a person related to the user. Further, since Mehul is also a business associate, a "jump" relationship exists between the personal 514 and business 512 spheres.

Figure 6:
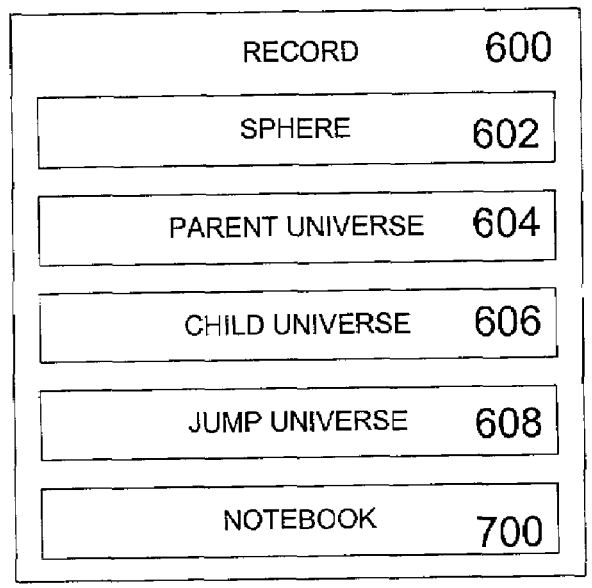
FIG. 6 illustrates a record utilized by an embodiment of the relationship manager of FIG. 1.

In an illustrative embodiment, relationships between universes are stored in a record 600 as depicted in FIG. 6. The record 600 contains the name of the associated sphere 602, the parent universe or universes (if any) 604, the child universe or universes (if any) 606, and the jump universe or universes (if any) 608. Each universe has an associated record 600 and records function to provide information relating to the relationships in the system. For example, the record 600 for CSAM universe 526 will contain the information that CSAM is in the business sphere 512, has no parent universe, has a child universe of Phase One 523, and has no jump universes. As is known by those skilled in the art, relationship information may be stored in a number of ways including a table, a matrix, and in object format.

Figure 7:
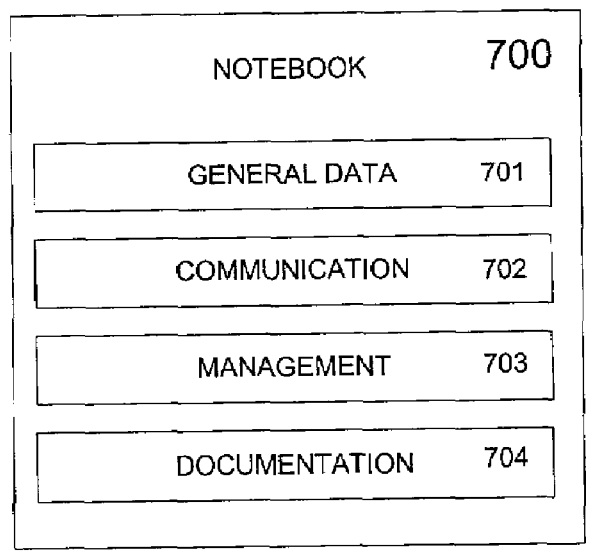
FIG. 7 illustrates a notebook structure utilized by an embodiment of the relationship manager of FIG. 1.
Figure 18A:
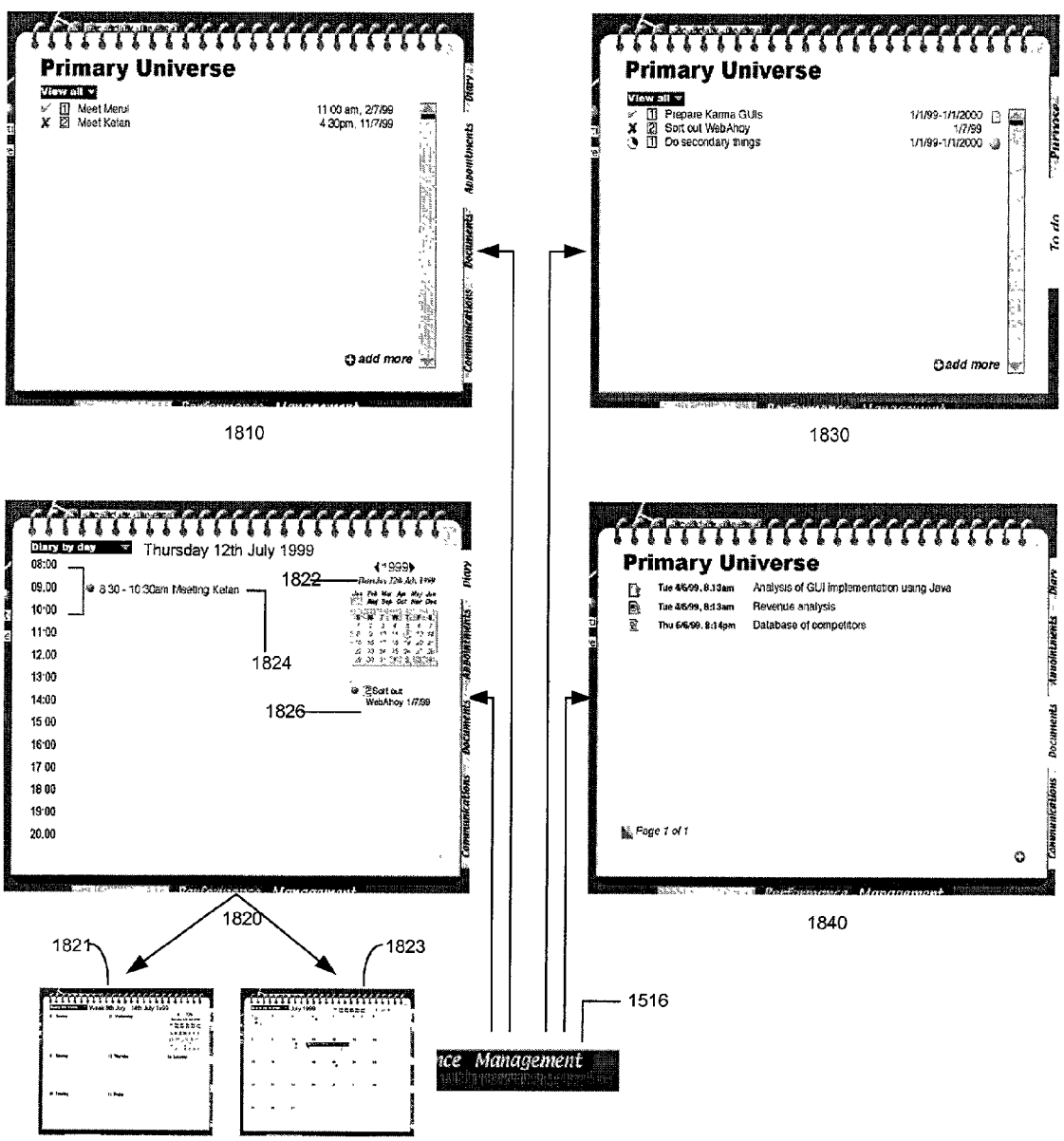
FIG. 18A illustrates the sheets included in the management tab of a notebook in an example of the KUI of FIG. 1.
Figure 18B:
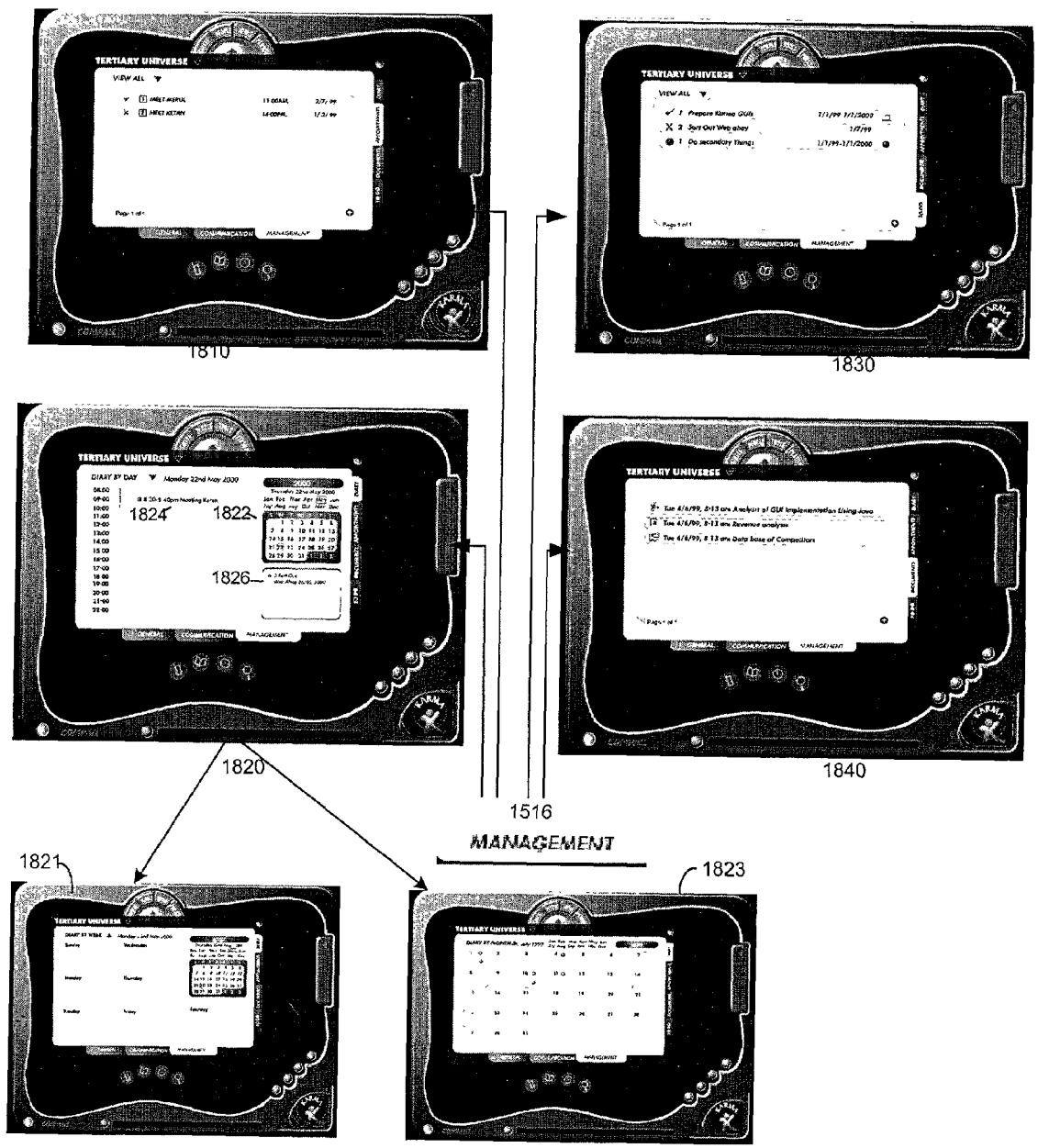
FIG. 18B illustrates the sheets included in the management tab of a notebook in another example of the KUI of FIG. 1

In an illustrative embodiment, every record 600 includes a notebook 700 as shown in FIG. 7. The notebook 700 organizes characteristics that comprise information and access to transactions related to an associated node. The notebook 700 is organized into four main areas: general 701, communication 702, management 703, and document 704. The four areas represent the type of information that the notebook contains. The general 701 section of notebook 700 may contain information relating to attributes of the node, whereas the communication 702 section may contain information relating to transactions performed using the communication operator 402. The management 703 section of the notebook may contain information relating to transactions performed using the management operator 403. For example, appointments created using the appointment operator 413 are kept in the management section 703 of the notebook associated with the node. An example of the Karma user interface 107 for the diary section of a notebook 700 is shown in FIGS. 18A and 18B. Although only four sections of the notebook have been defined in an illustrative embodiment, the Karma system 100 may accommodate any number of sections. Further, the size of the notebook associated with a node is not limited and may be as large as necessary to contain information related to a node.

General 701 information includes attributes relating to the associated universe or personality. Such information may include remarks and dates. For example, the attributes for the Phase One universe 523 may include a description of the project and the starting and ending dates of the schedule. Further, the attributes for a personality such as Neha Vyas 546 may include how the user met her and Ms. Vyas' birthdate. General 701 information may also include contact data such as geographic addresses, email addresses, web site addresses, phone numbers and facsimile numbers. General 701 information may also include notes or other textual information associated with the universe or personality. For example, notes relating to personality Merul Patel 544 may include a sentence about the fact that Mr. Patel was recently quoted in a newspaper article relating to his physics research. General 701 information may also include data regarding and access to other universes and personalities. For example, Phase One universe's notebook 522 includes access to associated personalities Merul Patel 544 and Neha Vyas 546.

Communication 702 information includes all messages exchanged by the user using means including telephone, email, mail, chat, ICQ, voice mail, and facsimile. In an illustrative embodiment, the notebook 700 maintains communication logs of all correspondence between the user and entities associated with the universe. For example, if the user has a Karma universe, the notebook 700 contains dates, remarks, and notes of all correspondence between the user and people or businesses associated with the Karma universe in the communication section of the notebook associated with the Karma universe.

Management 703 information includes the user's appointments, diary, communications, and documents. The notebook 700 maintains a log of all appointments for the user. In an illustrative embodiment, an appointment may be related to many universes and personalities. Further, an appointment may have a description, specific starting date, ending date, priority, reminder, frequency data for each appointment. For example, a monthly appointment with Merul Patel 544 may have a start date of Feb. 7, 2000 at 11:00 am, an ending date of Feb. 7, 2000 at 12:00 am, and is repeated every month. Management 703 information may also include a diary that maintains all the activities that the user schedules to effectively manage a day, week, month, and year. The diary includes time slots, details relating to appointments, a calendar, and tasks. Further, tasks may be divided into current, overdue, and unscheduled. Management 703 information may also include documents. Documents are writings containing data. Documents may have creation and modification dates, summary fields, relationship data, and identifying characteristic, such as application type. For example, a letter written in Microsoft Word® may have been created and modified on Jan. 2, 2000 and pertain to the Phase One notebook 522.

The notebook 700 also provides shortcuts to applications, including communication, management, and documentation applications. If the notebook contains the email address associated with a particular individual, then by simply clicking on the email icon next to the address, a new email to the individual is generated and saved in the notebook. Alternatively, the universe may be dragged to the email function of the communications operator to achieve the same result, or the email function of the communications operator may be selected while the appropriate node is in focus. The actual application used for email may either be a commercial product, such as Microsoft Outlook™ or a proprietary application developed for the Karma system 100.

The notebook 700 also includes access to management transactions. Management applications allow the user to organize and administer activities and information associated with the universe. Management applications include a diary planner, appointment scheduler, calendar, and task scheduler. For example, a universe relating to children may have access to a diary planner to note exam dates, doctor's appointments, and birthday parties and a task scheduler to list errands and chores. In an illustrative embodiment, the management applications are proprietary software applications. However, other commercial software applications that provide the required management functionality may be used.

The notebook 700 also includes access to document transactions. Documentation applications may be commercially available software or Karma proprietary tools. A documentation application such as Microsoft Office®, manufactured by Microsoft, Inc., provides word processing, spreadsheet preparation, and presentation development tools A documentation application such as Visio, manufactured by Visio Corporation, provides drawing software. Having a documentation section of the notebook 700 allows the user to associate different types of software with different activities and information. For example, different businesses in the user's life may use different documentation software. One may use Microsoft Office whereas another may require WordPerfect, manufactured by Corel, Inc.

Returning to FIG. 5, the people sphere 516 contains specialized universes known as personalities. Personalities are data objects related to specific people associated with the user. All personalities associated with the Karma system 100 are listed in the people sphere 516. A notebook associated with a personality manages all the information related to a specific person. Such information may include an address, phone and fax numbers, email, company, title, related projects, attributes and relationships with other universes. Because individuals tend to remember characteristics about people they meet, the Karma system 100 allows the user to manage attributes relating to personalities. For example, Sam Pitroda may be defined as a personality in the people sphere and he may be defined by attributes such as that he is an Indian from Bombay, that he has long hair, and that he is a telecommunications expert. A computer user may not remember who Sam Pitroda is by viewing his telephone number or his title, but may recall him by viewing his attributes.

The people sphere 516 serves as the centralized access point for the personalities located in the user's life; however, personalities may also be accessed through the notebooks of other universes. For example, as shown in FIG. 5, personality Merul Patel 544 and personality Neha Vyas 546 may be accessed through the notebook for Phase One 522 as well as through the people sphere 516. Further, personalities may also be accessed by entering a universe in which the personality is related. For example, personality Mehul Desai 542 may be accessed through either the relatives universe 534 or the development universe 542.

Similarly, the tools sphere 518 contains specialized universes related to the tools 102 available in the Karma system 100. Such tools 102 may include web browsers, file transfer protocol (FTP) applications, maintenance utilities, preference utilities, archival and retrieval utilities, data import and export utilities, backup and restoration utilities, global clock and calendar, system navigation applications, and communications, management, and document creating applications. As noted earlier, certain tools such as communications, management, and document creating applications can also be accessed through operators. The tools sphere 518 also provides a direct manner to access applications that are not associated with normal user activities and information. For example, tools such as a web browser or computer configuration software may be accessed through the tools sphere 518. In addition, applications such as statistical analysis and graphical design software, which also do not correspond to real-world activities and information that a user would perform with respect to a personality or universe are accessible through the tools sphere 518.

An illustrative embodiment of the present invention also includes a data storage object that maintains a history of previous actions performed in the system. For example, any communication, management, documentation, and navigation activity performed by the user is logged, recorded and stored in this structure. Such activity may include appointments, tasks, and document details. The recorded information associated with a particular action may include its date of creation, modification, or navigation, name of the corresponding universe, notes summarizing the contents of the documents, or notes summarizing the communication, appointment, or task. The user can specify the duration of time that such logs remain within the relationship manager 101.

Figure 8:
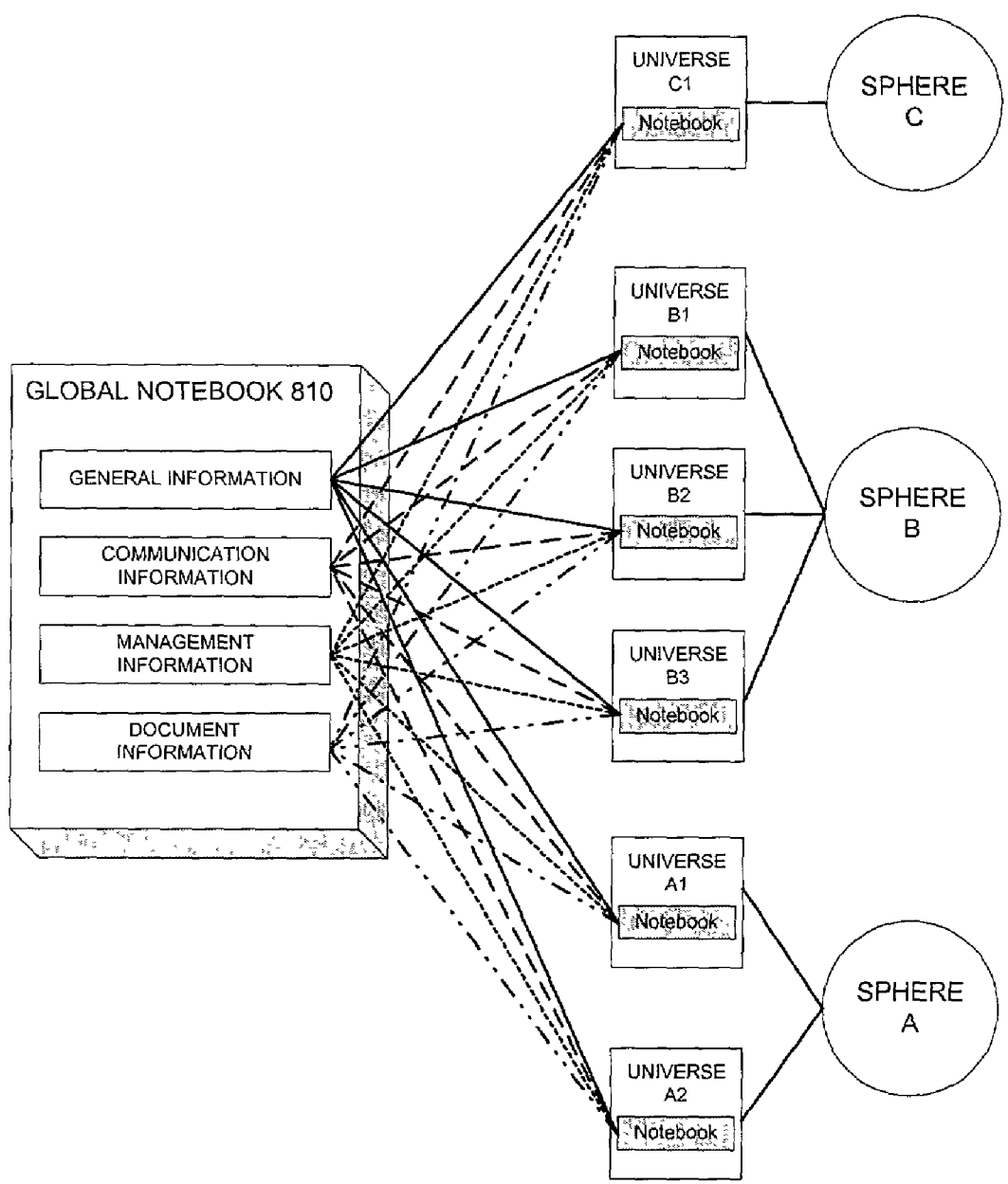
FIG. 8 illustrates a global notebook structure and its relationship to notebooks associated with universes.

An alternative embodiment of the present invention provides an additional data object referred to as a global notebook 810. As shown in FIG. 8, the global notebook 810 consolidates information associated with specific universes and provides comprehensive access to all general, communication, management, and documentation information without regard to their particular associations with specific universes. For example, a user may access the global notebook 810 to determine the activities scheduled for any given day. While these scheduled activities may be related to different universes, the global notebook 810 provides a "bird's eye view" of the Karma system 100. An embodiment of the present invention provides for managing user activities and information comprising the steps of (1) creating a plurality of spheres corresponding to the activities and information; (2) identifying activities and information for each sphere; (3) creating universes corresponding to a subset of the activities and information, wherein each universe corresponds to at least one sphere; (4) creating personalities corresponding to an individual associated with the user and the user's activities and information, wherein each personality corresponds to at least one sphere; and (5) establishing parent, child, and jump relationships among the spheres, universes and personalities. An embodiment of the present invention allows the user to build an expert system that reflects the user's personality, activities and information to improve user interactions. An embodiment of the present invention improves user interactions by reviewing the user's activities and information to make predictions regarding living preferences. For example, the user may often travel to Chicago and often stay at the Mayfair hotel. The invention may review and analyze the user's activities and information to form a prediction that the next time that the user travels to Chicago, the user will stay at the Mayfair hotel. Based upon this prediction, the invention may make a reservation at the Mayfair without waiting for an instruction from the user.

Figure 9A:
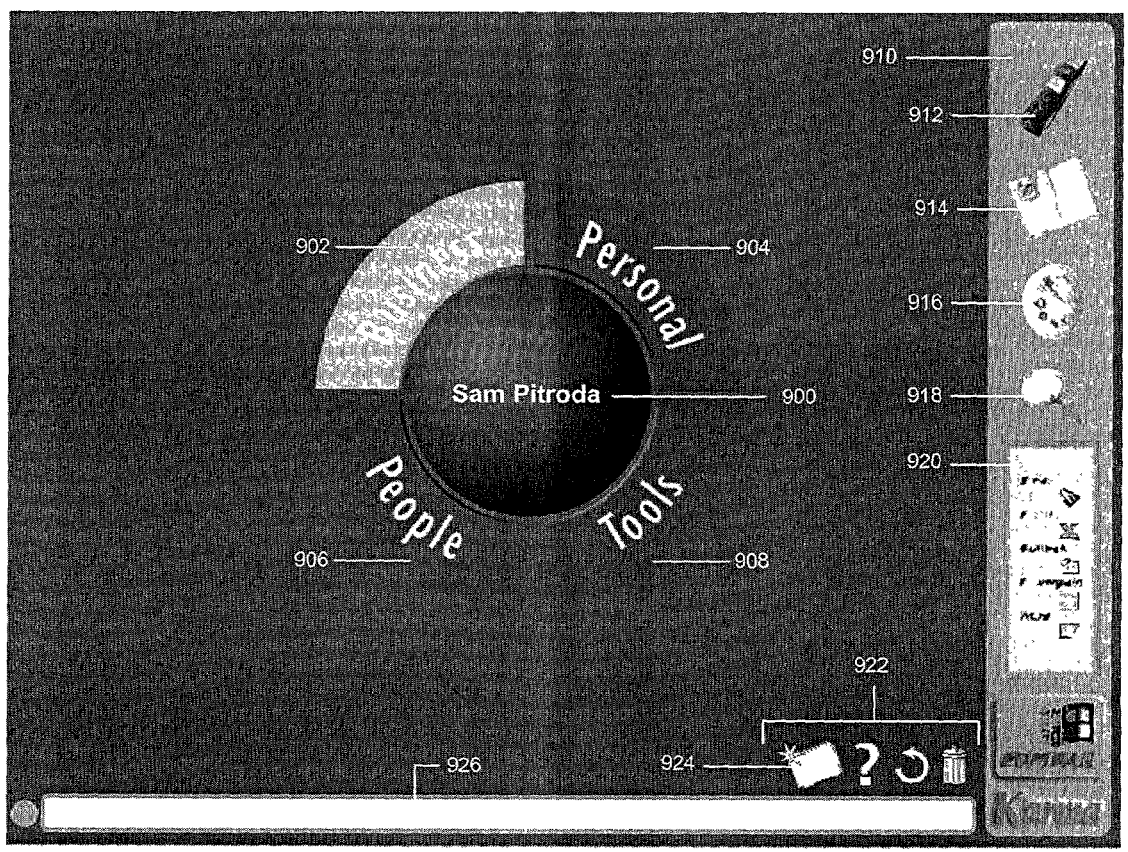
FIG. 9A illustrates an initial display of an example of the KUI of FIG. 1.

The Karma user interface (KUI) 107 functions to display the relationships between the objects in the system. FIG. 9A illustrates an example initial display and FIG. 9B illustrates another example of KUI 107. In FIG. 9A is a circle 900 that displays the name of the user. In an alternative example, as shown in FIG. 9B, circle 900 does not display the name of the user. In FIGS. 9A and 9B, four equal sections surround the circle 900. These four sections, labeled "Business" 902, "Personal" 904, "People" 906, and "Tools" 908, are graphical representations of the business 512, personal 514, people 516, and tools 518 spheres that are stored in the relationship manager as depicted in FIG. 5. In addition to the four sections, the KUI 107 displays an interactive status bar 926, a tool bar 910, and global icons 922.

Figure 10A:
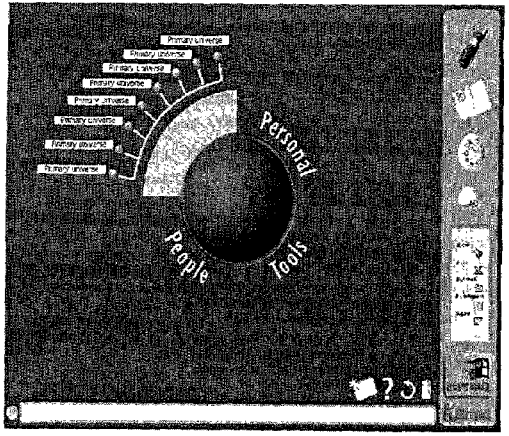
FIG. 10AA illustrates an example of the KUI of FIG. 1 with a focus on the Business universe.
Figure 10A:
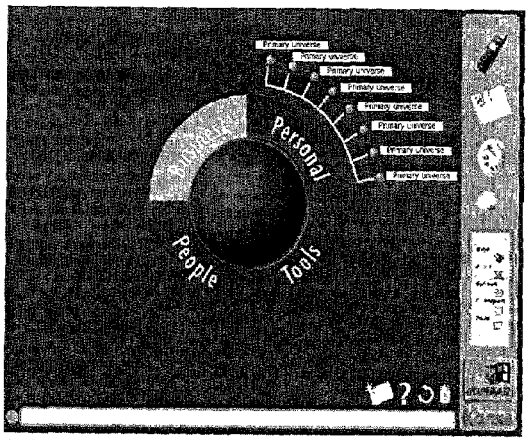
Figure 10A:
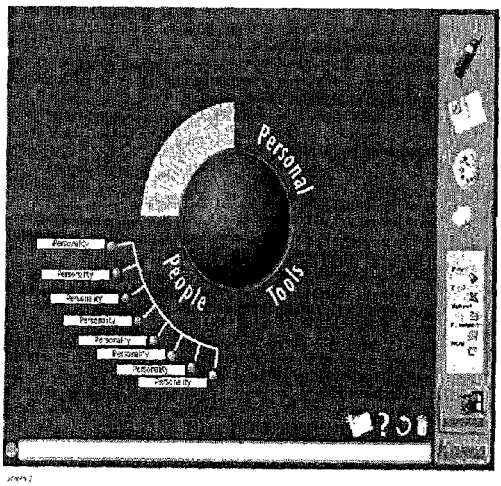
Figure 10A:
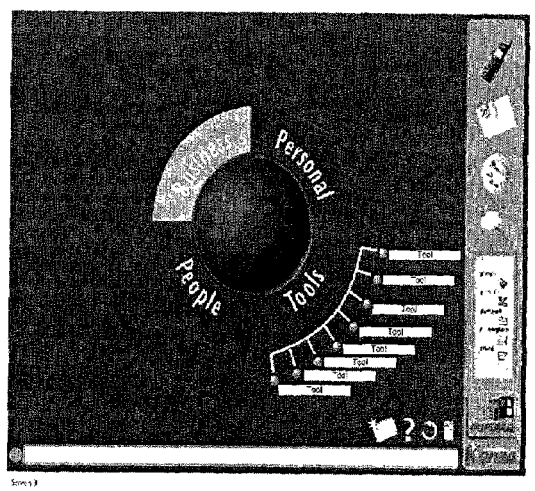
Figure 10A:
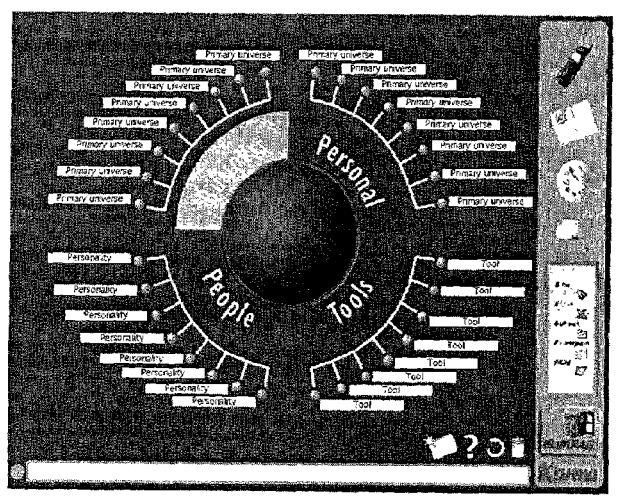
Figure 10B:
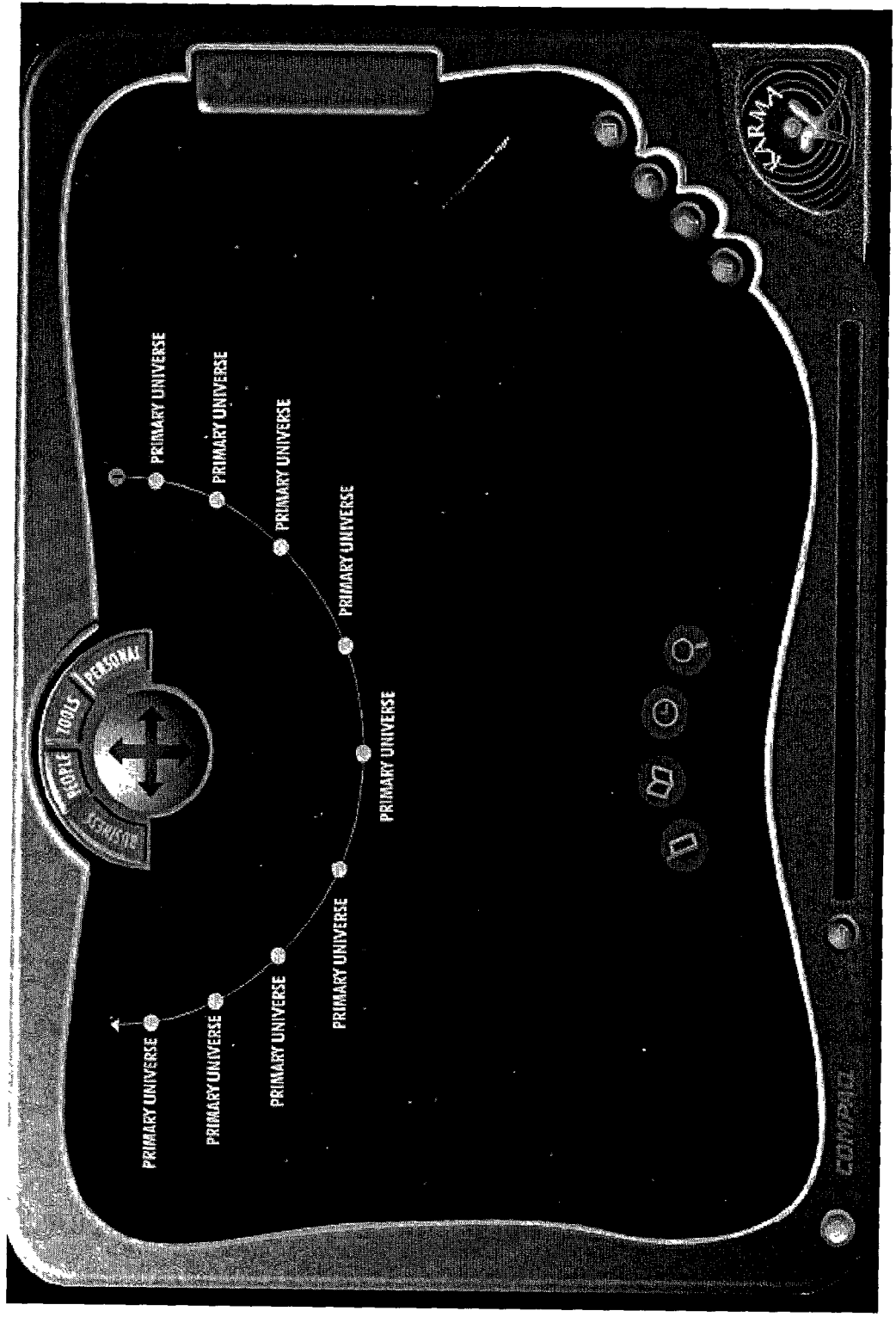
FIG. 10BA illustrates another example of the KUI of FIG. 1 with the focus on the Business universe.
Figure 10B:
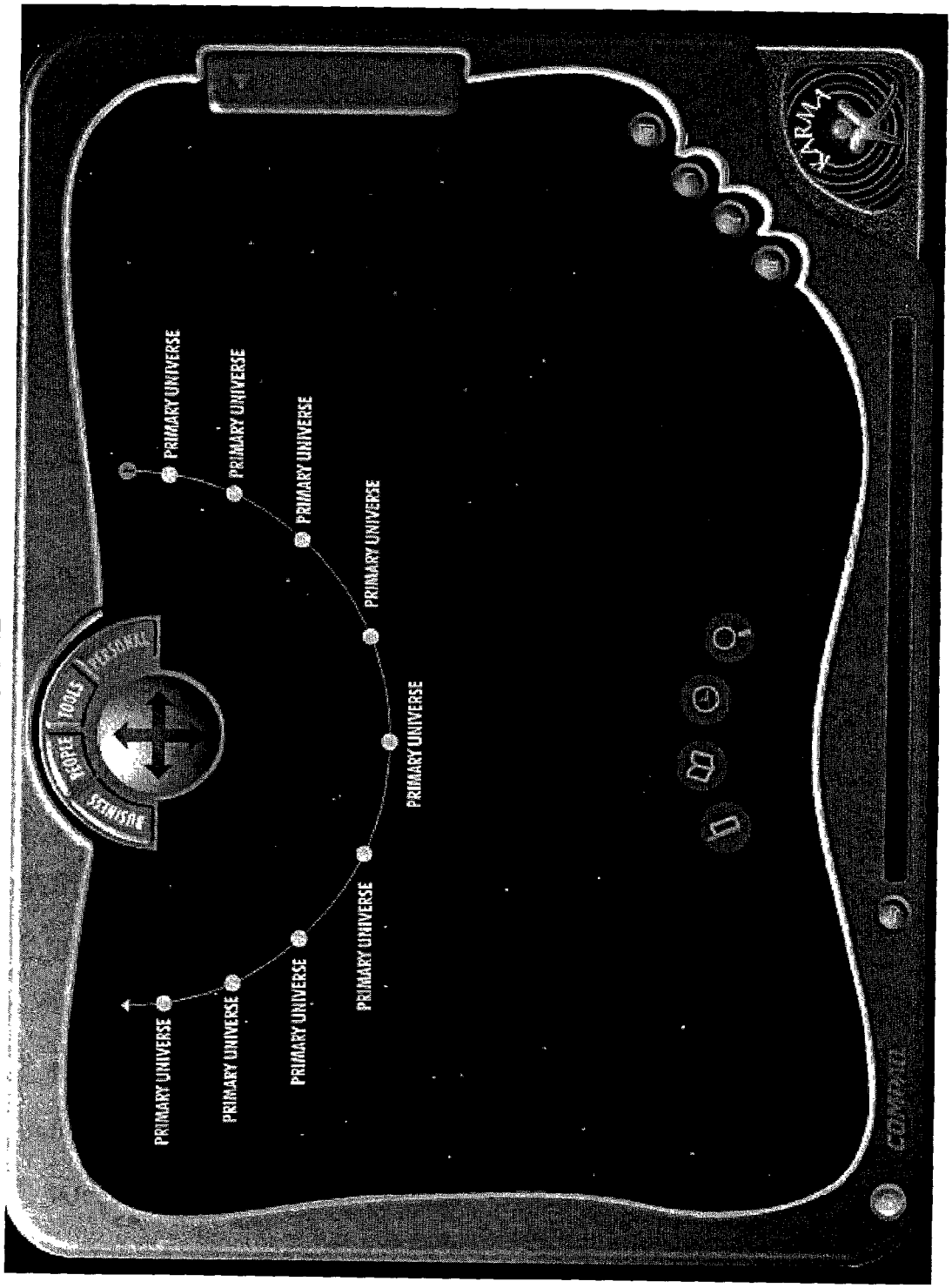
Figure 10B:
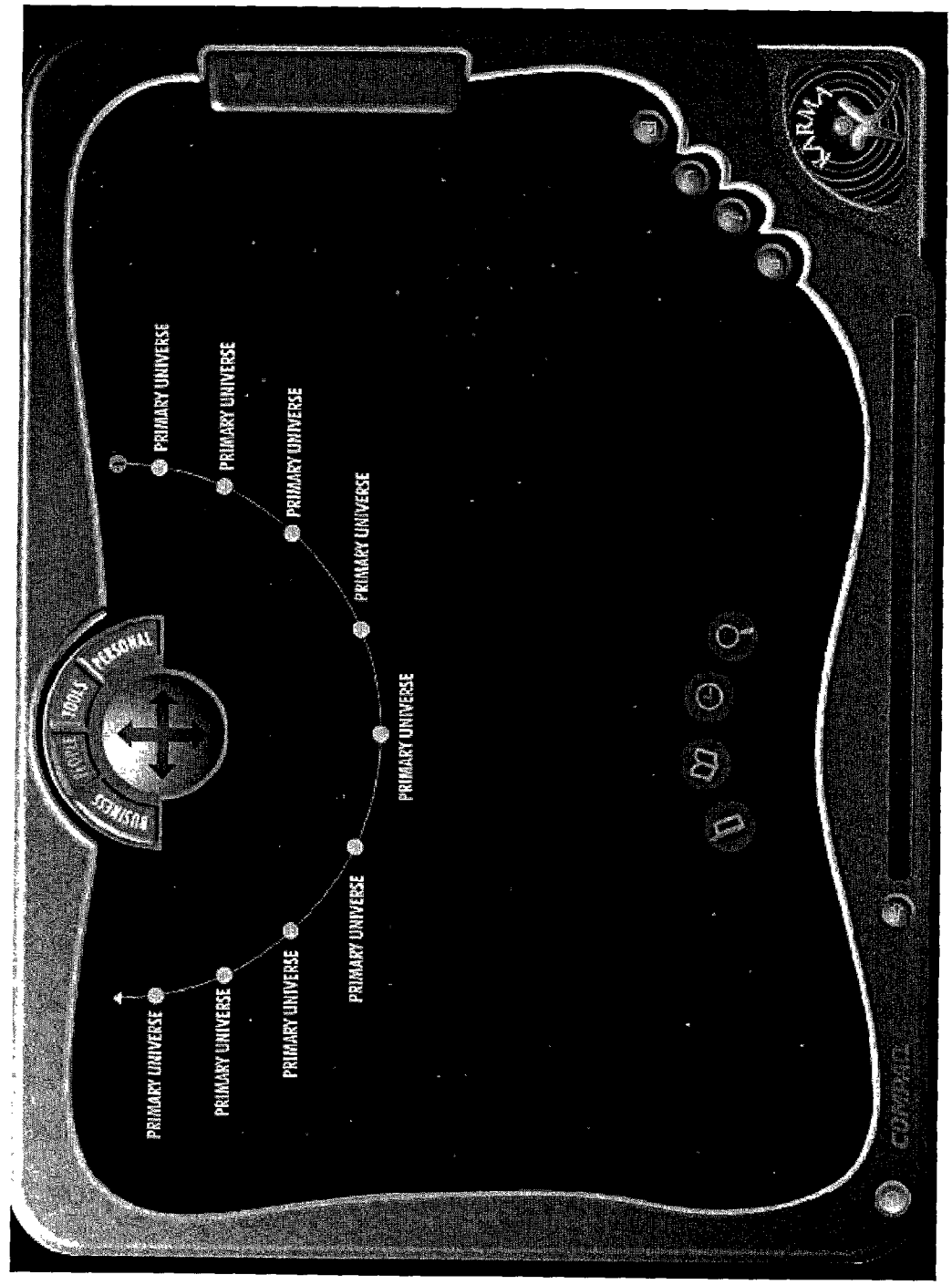
Figure 10B:
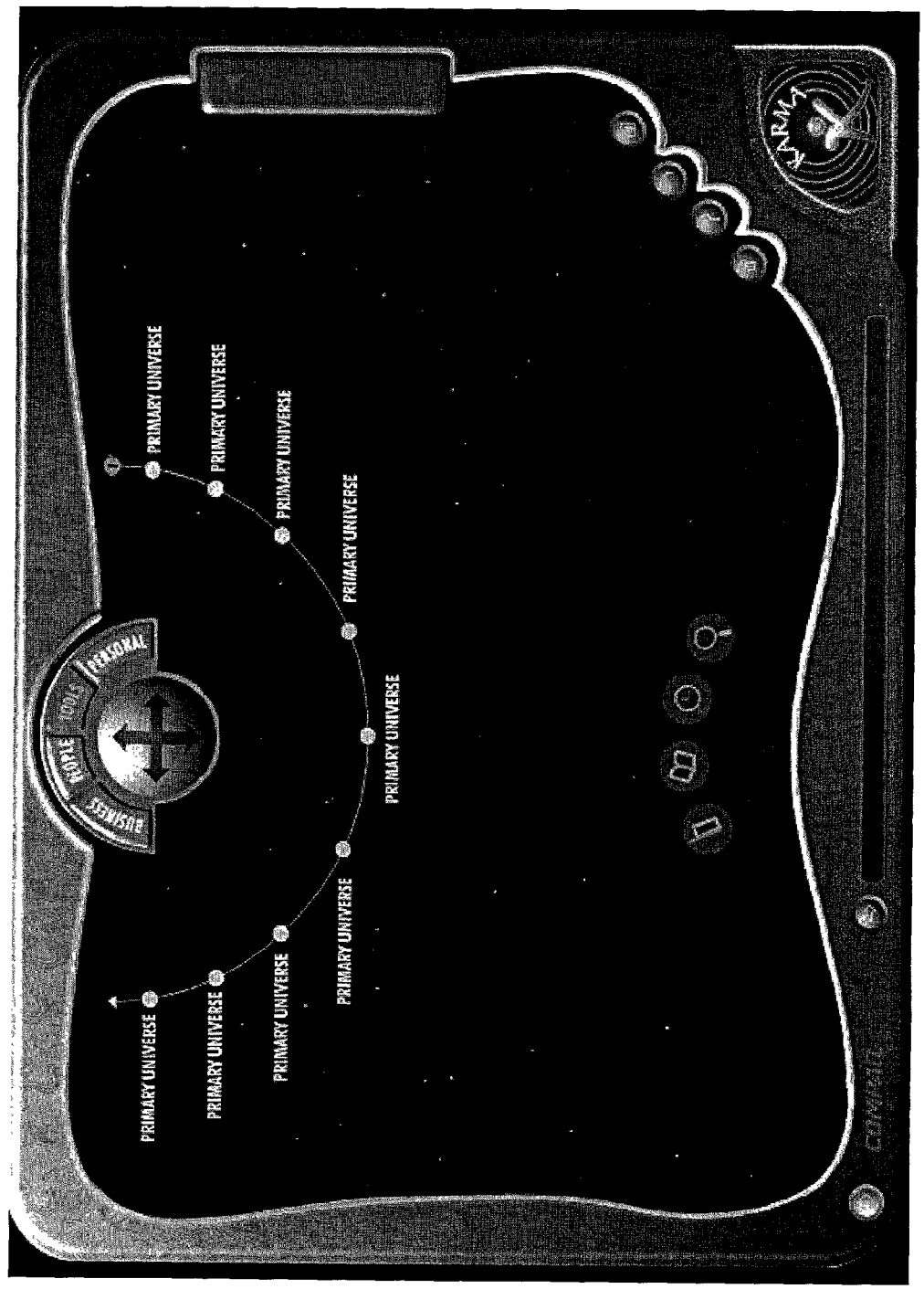

In an illustrative embodiment, the passage of a navigational device such as a mouse over one of the four sections places the sphere in "focus" and causes a set of nodes to be temporarily displayed. These nodes graphically represent the initial set of universes that are associated with the sphere. As mentioned previously, the initial set of universes is termed "primary" since they directly stem from a sphere. The universes may be displayed in alphabetical order, in creation date/time order where the universes are displayed in the order of last access, or in any other rational order. For example, FIGS. 10AA and 10BA illustrate screen shots of when the focus is on the Business sphere 902. Since the Business sphere 512 does not have a parent universe, the displayed nodes are termed primary universes. In another example, the Business sphere 902 may display primary universes termed "Real Estate," "Stock Investments," "IPO," "Trusts," "Intellectual Property," and "Development." Likewise, example screen shots of the Personal sphere 904 is shown in FIGS. 10AB and 10BB, the People sphere 906 is shown in FIGS. 10AC and 10BC, and the Tools sphere 908 is shown in FIGS. 10AD and 10BD. In one embodiment, placing the focus on the center circle 900, displays all primary universes in the Karma system 100, as shown in FIG. 10AE.

As shown in FIGS. 9A and 9B, the status bar 926 displays explanatory messages of the Karma system 100. The effect of "focusing" over a node causes the status bar to display the purpose or description of the focused universe. For example, focusing on the business sphere 902 may display the words "Projects Relating to For-profit Activities" in the status bar 926. The status bar 926 also displays the receipt of communications such as emails, facsimiles, and voice mails. For example, the receipt of an email may display the sender's name and subject line of the email message in the status bar 926. The status bar 926 also displays appointments and "to do" items. For example, an appointment to meet a venture capitalist on May 23, 2000 at 12:00 pm displays as a reminder in the status bar 926. Further, in addition to displaying messages, the status bar 926 allows for text entry. The user may enter text to navigate through the Karma system 100. For example, the user may enter the word "patent" to navigate to the patent universe.

The tool bar 910 enables a user to directly access operators and other unassociated applications. The tool bar 910 contains a display of graphical icons including a mobile phone icon 912 representing the communication operator 402, a diary icon 914 representing the diary operator 414, a clock icon 916 representing the management operator 403, and a magnifying glass icon 918 representing the search operator 405. In one example, an adaptive tool bar 920 used to access the tools sphere 518 is also displayed with tool bar 910, as shown in FIG. 9A. In another example, the adaptive tool bar 920 is separate from the tool bar 910, as shown in FIG. 9B. To identify each tool, floating text pops up as focus is placed on an icon in the tool bar 910. For example, as the mouse passes over the mobile phone icon, the text "Communications" may appear in a floating text box.

The effect of "focusing" may be accomplished through a variety of actions including placing a mouse over the desired item and clicking or double-clicking on the desired item. Further, "focusing" may be accomplished by hardware other than a mouse, such as keyboard, light pen, touch screen, or voice command. For example, if the computer screen is touch sensitive and the user touches the Business sphere 902, all primary universes associated with Business sphere 902 will be displayed as shown in view 10A. Alternatively in a voice command computer system, the user may speak the word "Business" or an equivalent command, to have all the primary universes associated with Business sphere 902 be displayed.

The user may also interact with a universe by "selecting" or by "entering" the universe. Selecting may be accomplished by clicking the mouse when the mouse pointer is over the desired universe. Entering is accomplished by double-clicking the mouse when the mouse pointer is over the desired universe. Further, "selecting" may be accomplished by hardware other than a mouse, such as keyboard, light pen, touch screen, or voice command. Alternatively in a voice command computer system, the user may speak the word "Business" or an equivalent command, to have all the primary universes associated with Business sphere 902 be displayed. Alternatively, the user may type "Business" into the status bar 926 to go to the business sphere and then "Primary universe" to go to the first primary universe of the business sphere.

Figure 11A:
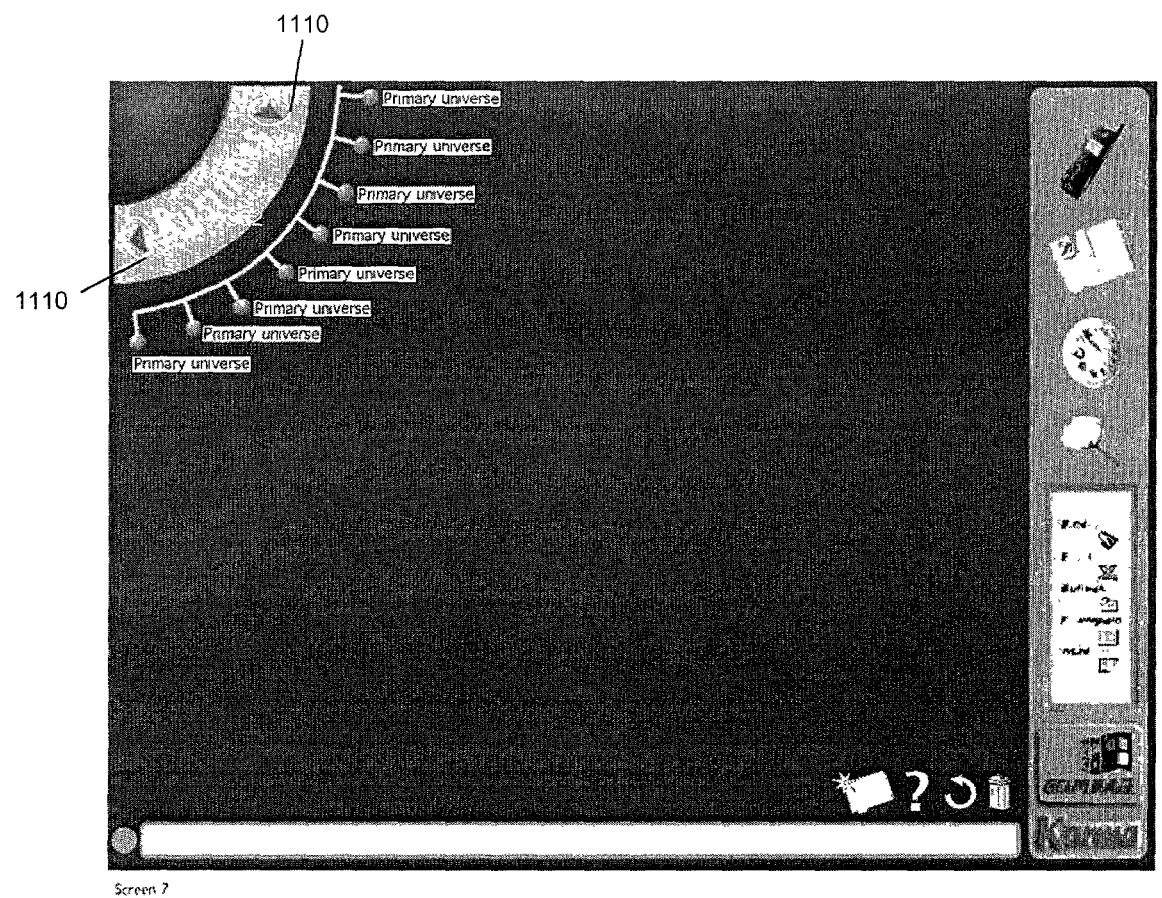
FIG. 11A illustrates an example of the KUI of FIG. 1 when the Business sphere is selected.
Figure 11B:
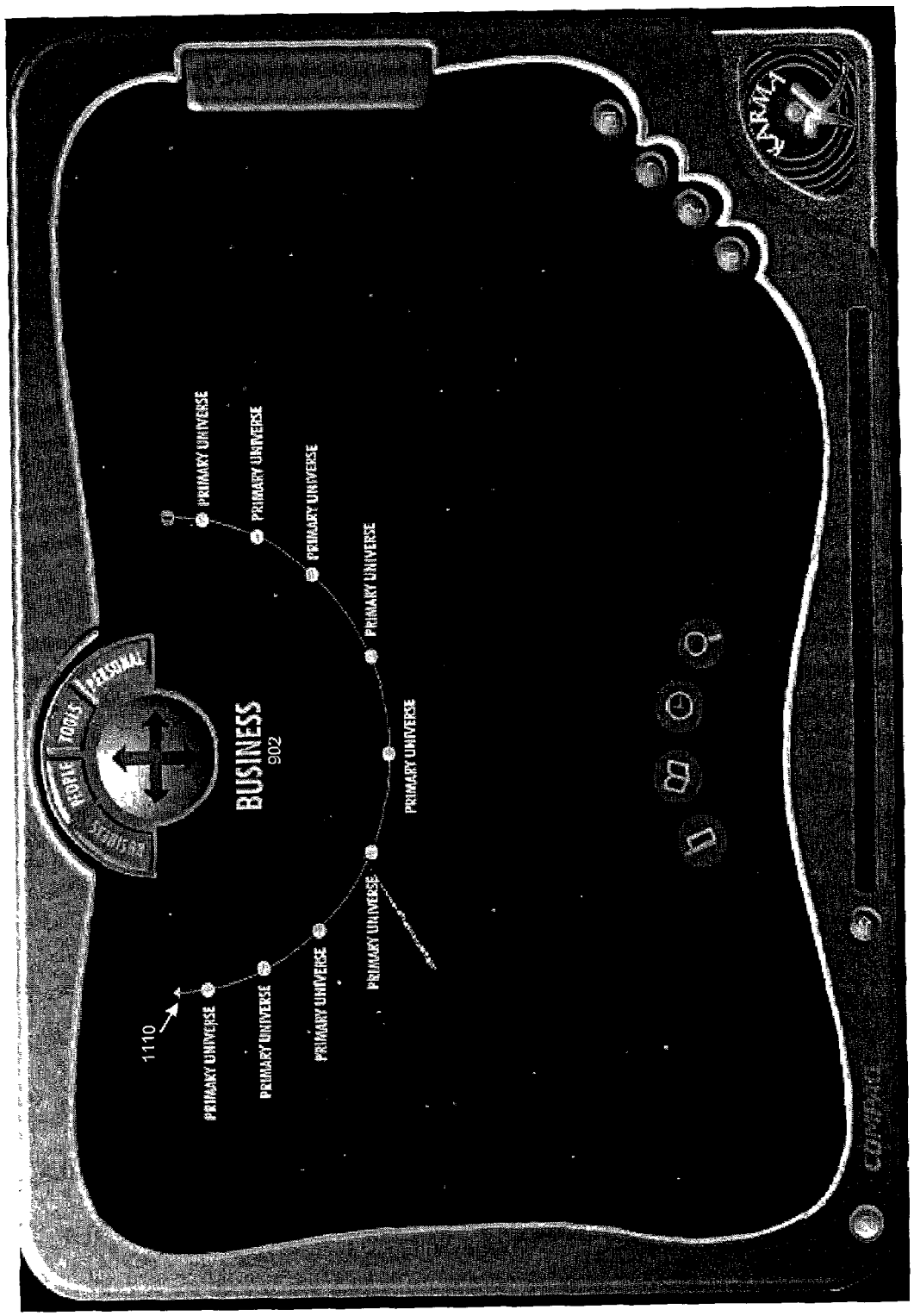
FIG. 11B illustrates another example of the KUI of FIG. 1 when the Business sphere is selected.

When the user "selects" a particular sphere, primary universes relating to the sphere are displayed, as shown in FIGS. 11A and 11B. In FIG. 11A, the selected sphere and its primary universes move to a corner of the display, whereas in FIG. 11B, the selected sphere and its primary universes are displayed in the center of the screen. The universes may be displayed in alphabetical, creation date/time, or in any other rational order. In both FIGS. 11A and 11B, Business sphere 902 has been selected. In one example, the KUI 107 displays up to eight universes at one time and if more than eight universes exist than a scrolling mechanism is implemented to display the other universes. As FIG. 11A and 11B illustrate, since there are greater than eight primary universes, the sphere's arc displays a scrollbar 1110 in order to access hidden primary universes. The user may decide the number of levels and the structure of the hierarchy that the relationship manager displays on the graphical user interface. For example, the user may decide only to display primary universes and hide secondary and tertiary universes when a particular sphere is selected.

Figure 12:
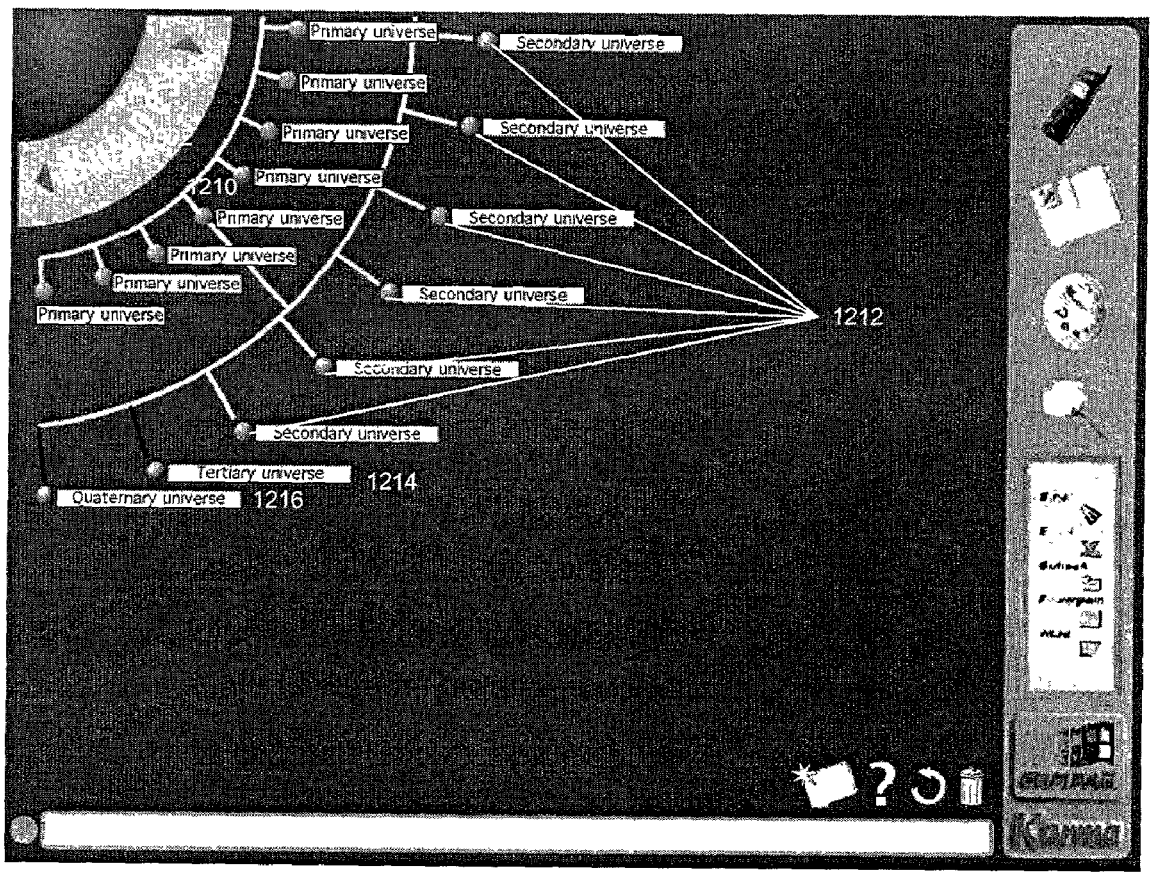
FIG. 12 illustrates an example of the KUI of FIG. 1 when a primary universe displaying child and jump universes is in focus.

In an embodiment, KUI 107 uses properties associated with the graphical user interface to present relationship information to the user. For example, child universes may be displayed in one color whereas jump universes may be displayed in another color. As shown in FIG. 12, child universes 1212 are displayed with yellow links whereas jump universes 1212, 1216 are displayed with purple links. In alternative embodiments, relationship information may be shown by varying font, size, color, or images associated with representations of data objects in the Karma system 100.

Figure 13A:
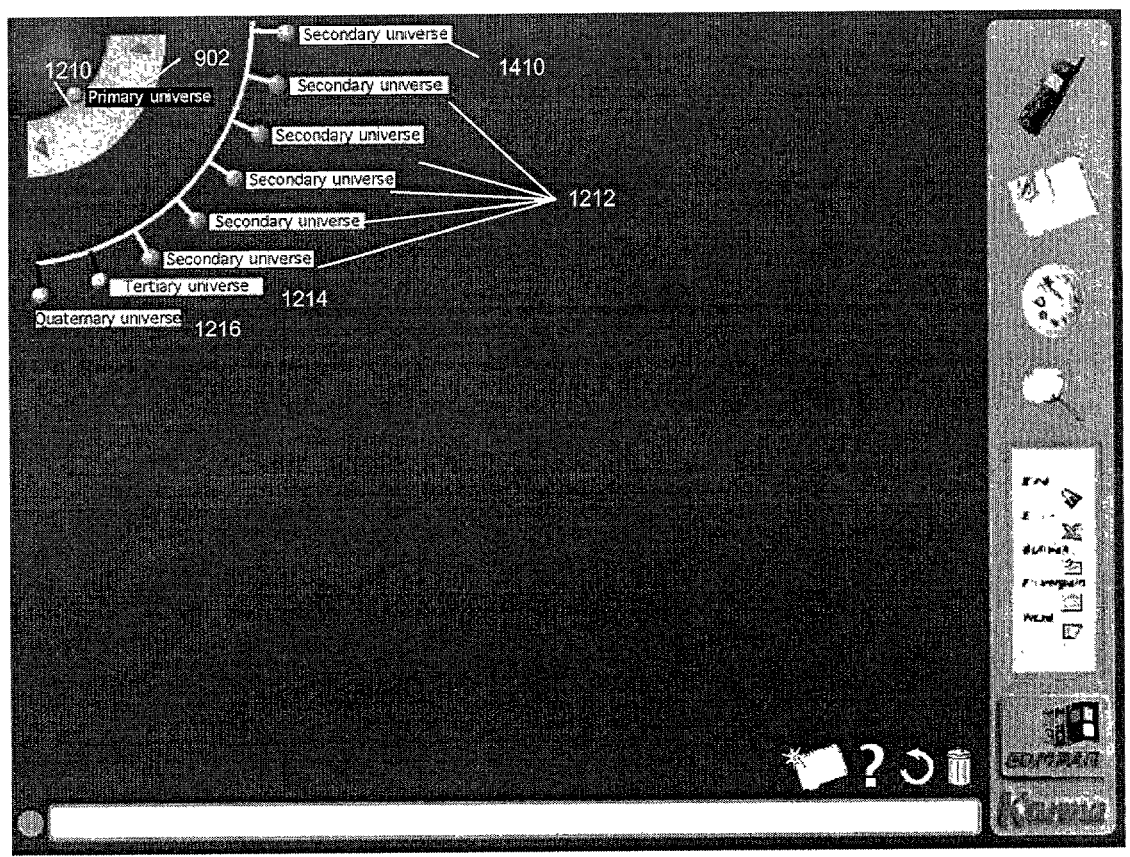
FIG. 13A illustrates an example of the KUI of FIG. 1 when a primary universe is selected.
Figure 13B:
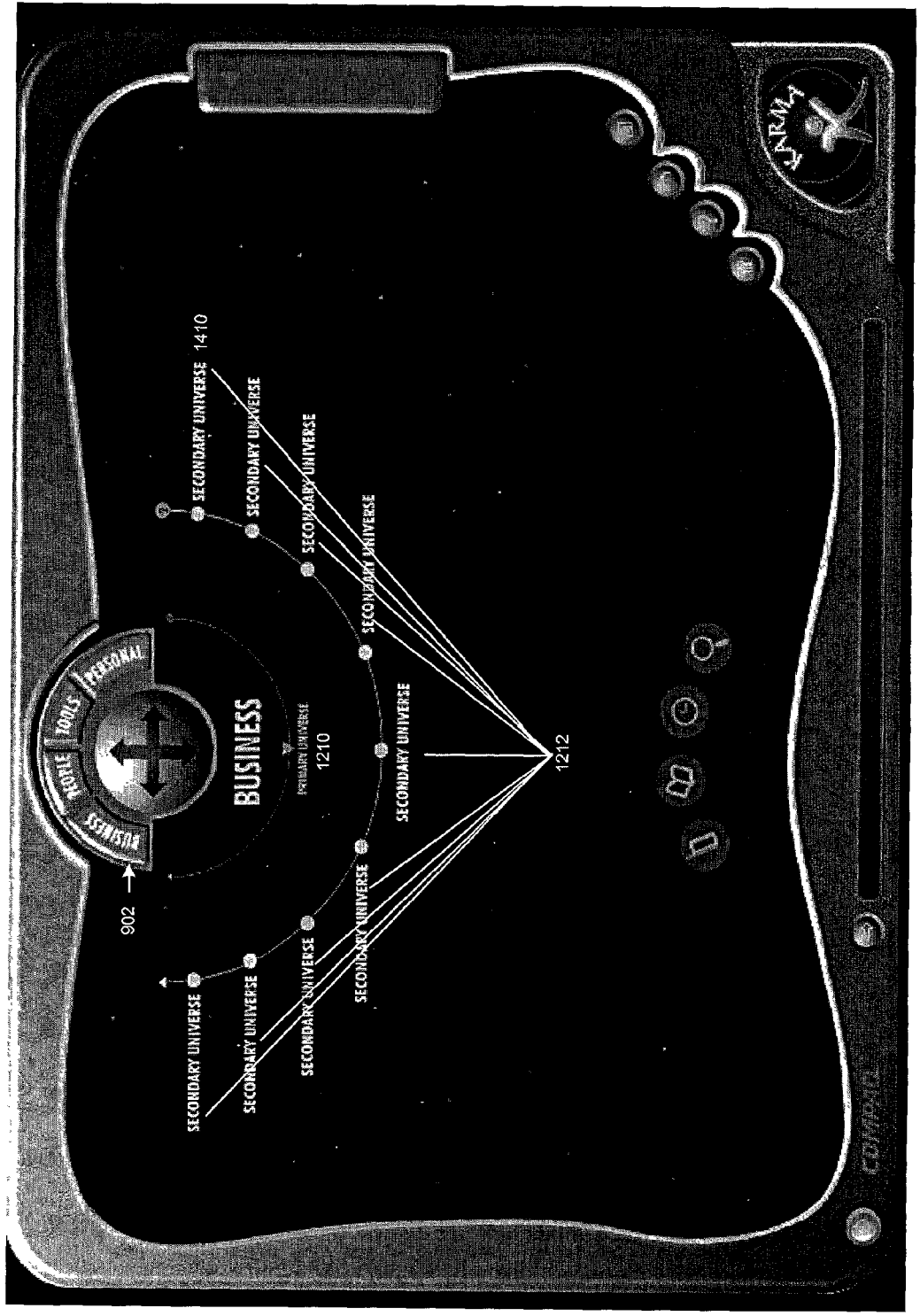
FIG. 13B illustrates another example of the KUI of FIG. 1 when a primary universe is selected.
Figure 14A:
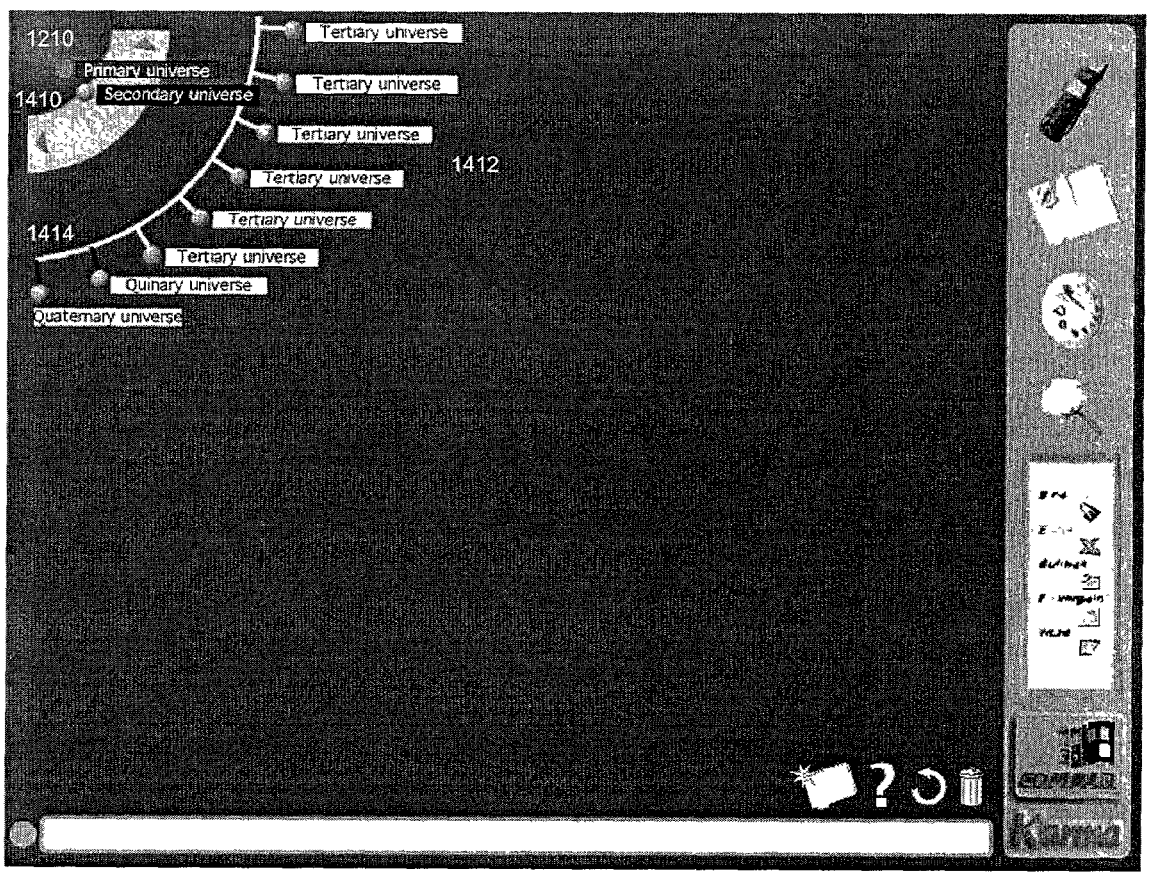
FIG. 14A illustrates an example of the KUI of FIG. 1 when a secondary universe is selected.
Figure 14B:
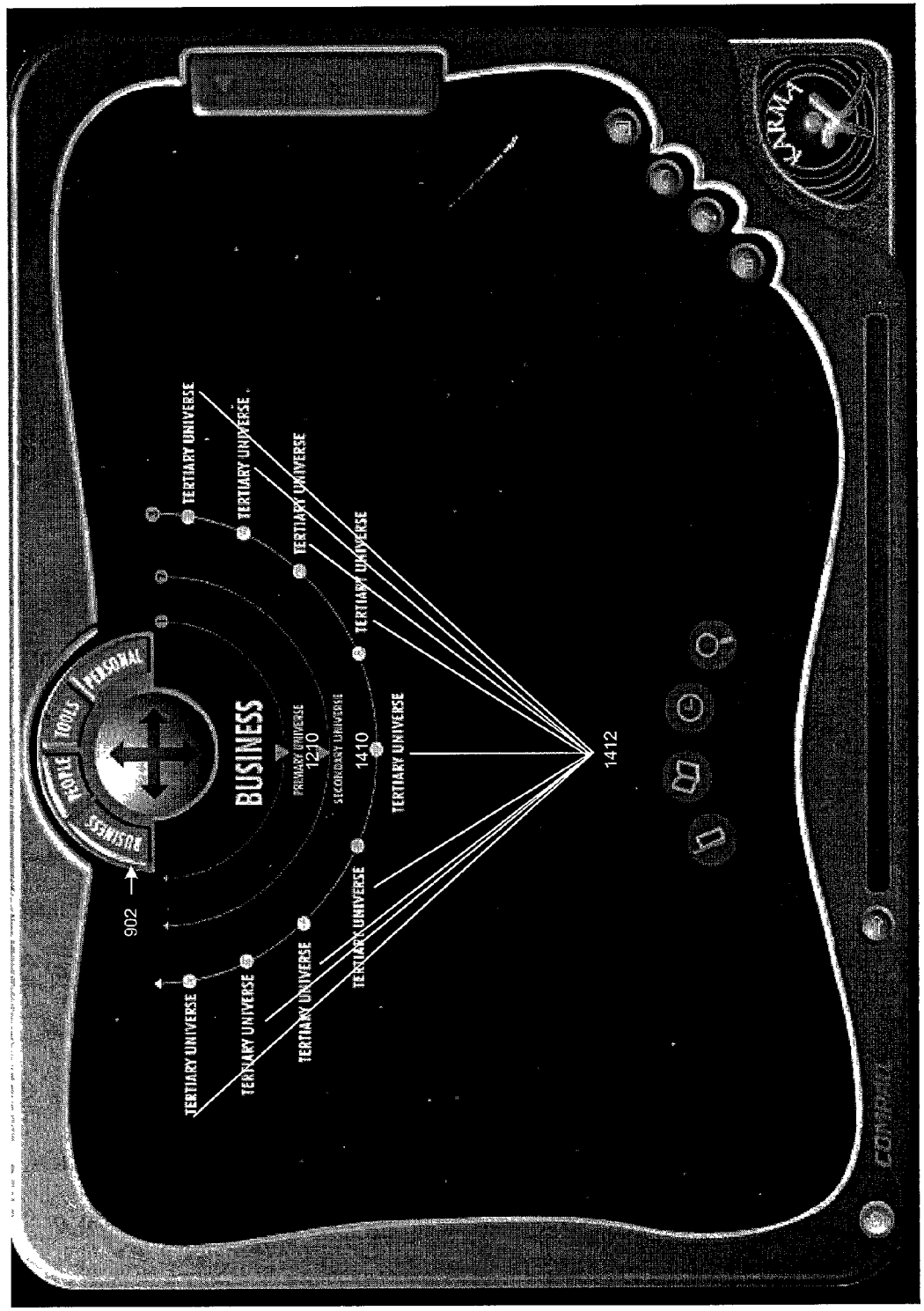
FIG. 14B illustrates another example of the KUI of FIG. 1 when a secondary universe is selected.

When a primary universe is selected, the display changes to reveal child universes of the selected primary universe. As shown in FIGS. 13A and 13B, primary universe 1210 becomes the focal point and child universes of primary universe 1210 are displayed. In the embodiment of FIG. 13A, the primary universe is shown in a corner of the screen, whereas in the embodiment of FIG. 13B, the primary universe is shown in the center of the screen. FIGS. 14A and 14B illustrate one further level of traversal, in which secondary universe 1410 (a member of the group of child universes 1212) has been selected so that its child universes 1412 are displayed. In FIG. 14A, jump universes 1414 are also displayed.

Figure 15A:
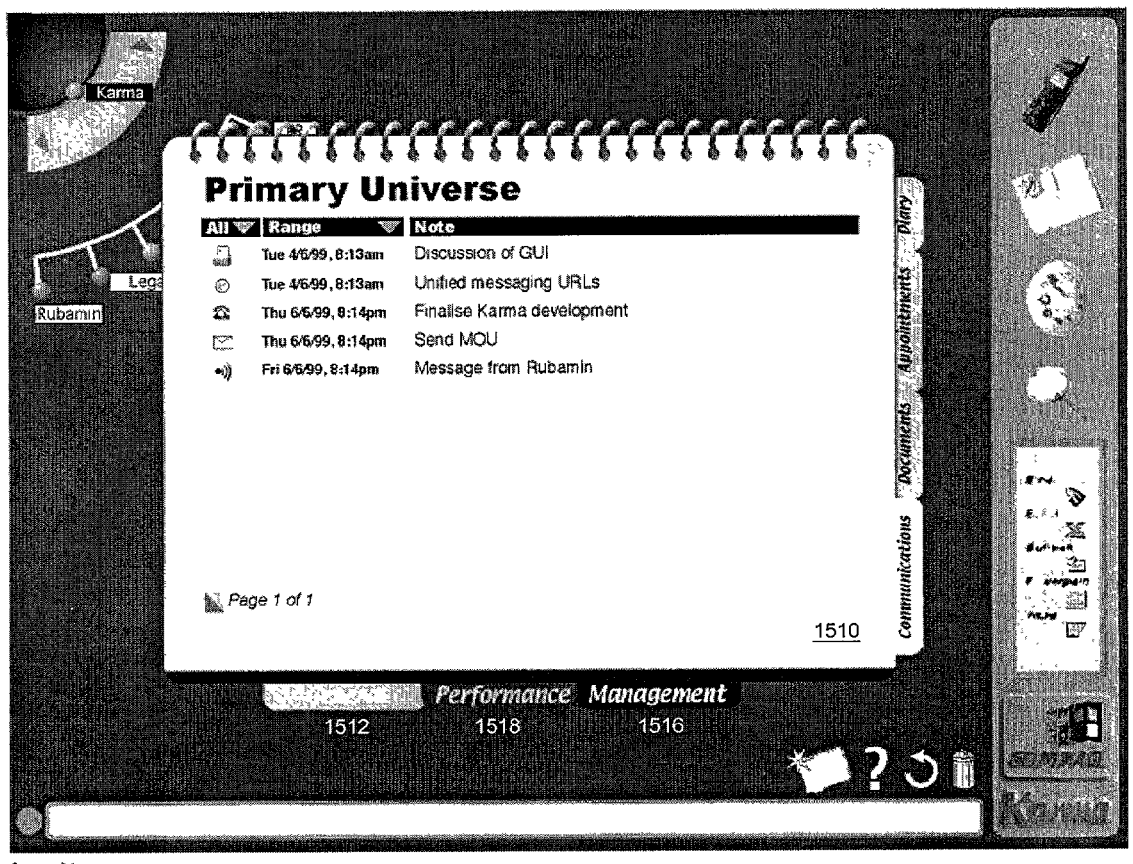
FIG. 15A illustrates a graphical representation of the notebook structure in an example of the KUI of FIG. 1.
Figure 15B:
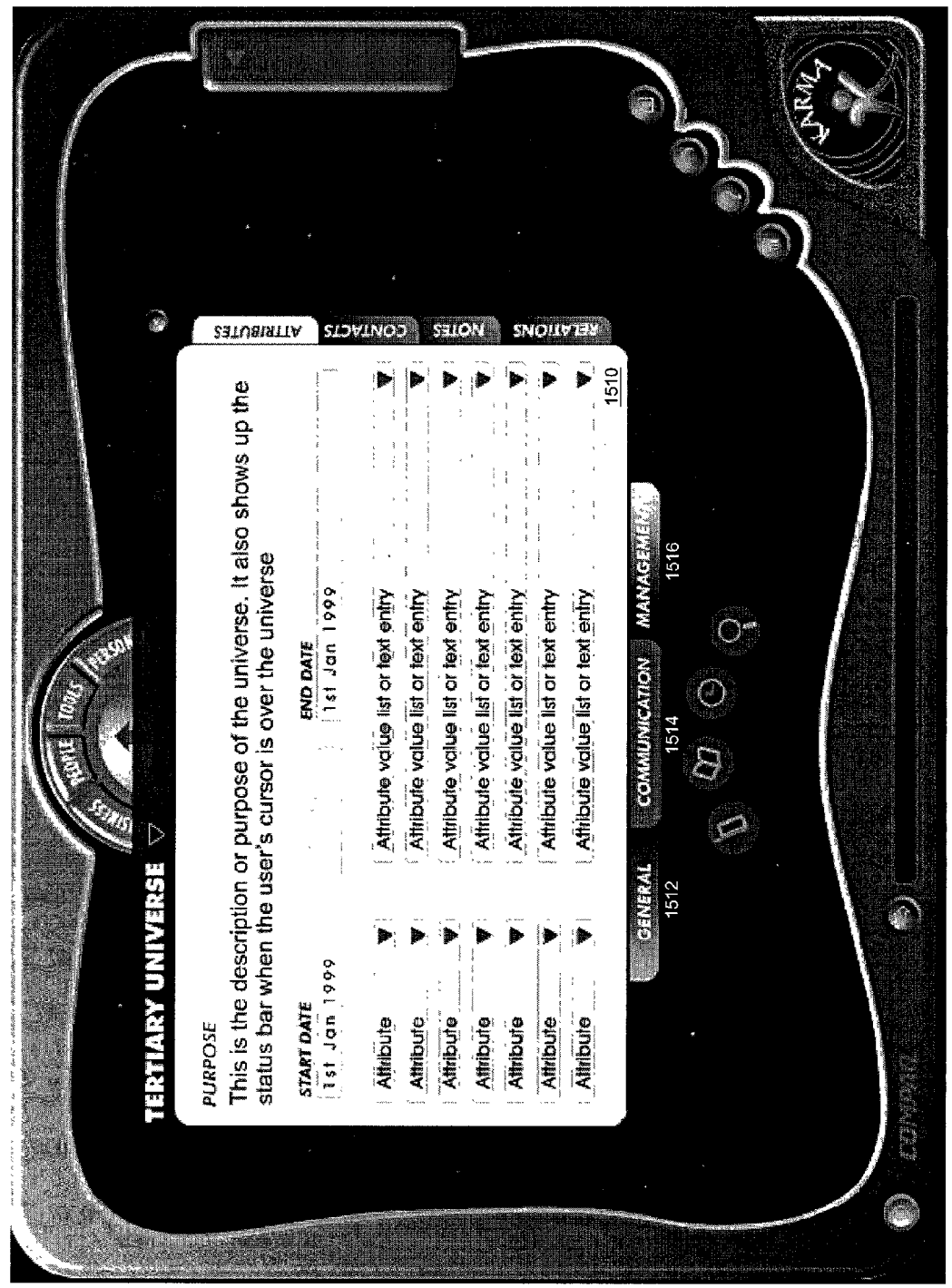
FIG. 15B illustrates another graphical representation of the notebook in another example of the KUI of FIG. 1.

As mentioned, a user may "enter" a universe by double clicking on a desired universe. Entering a universe displays a graphical representation of its associated notebook 700. Once a notebook 700 is displayed, KUI 107 records its associated universe as the currently selected universe. FIGS. 15A and 15B illustrate examples of graphical displays of notebook 1510. As shown, the graphical representation 1510 of notebook 700 may include several tabs, such as a general tab 1512, a communication tab 1514, a management tab 1516, and a performance tab 1518. The list of tabs included in a graphical representation is meant to be illustrative and not limiting. For example, in FIG. 15A, a performance tab is displayed whereas in FIG. 15B, a performance tab is not available. Other tabs which may be available include purpose, documents, appointments, diary, and to dos.

Figure 16A:
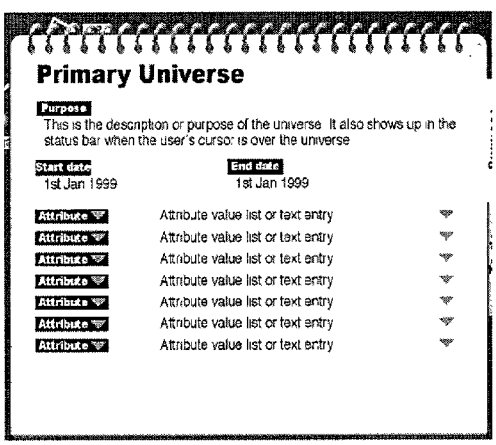
FIG. 16A illustrates sheets included in the general tab of a notebook in an example of the KUI of FIG. 1.
Figure 16A:
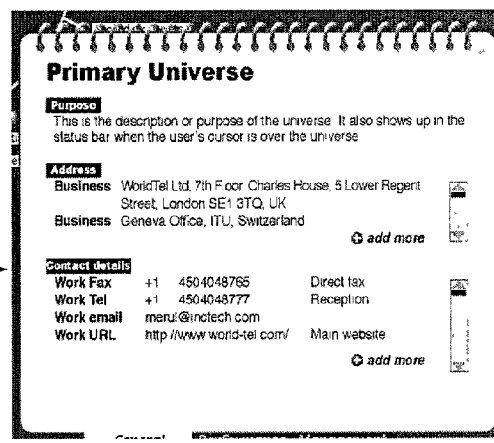
Figure 16A:
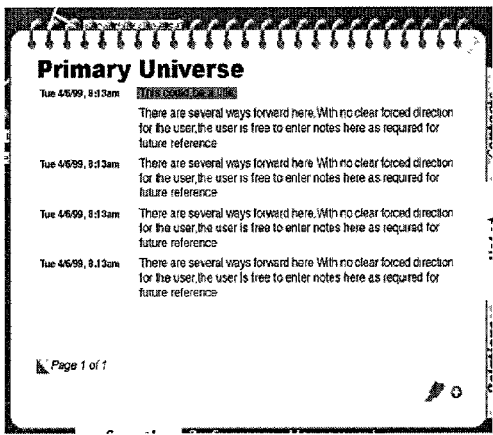
Figure 16A:
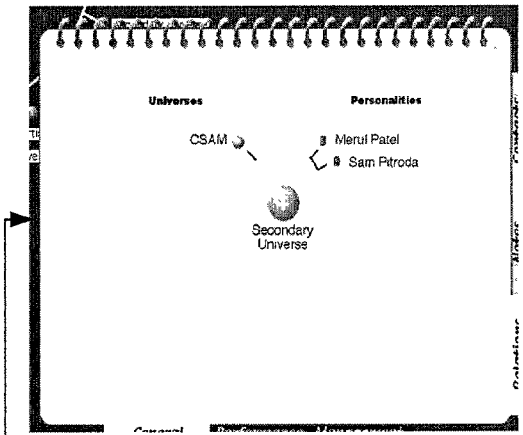
Figure 16B:
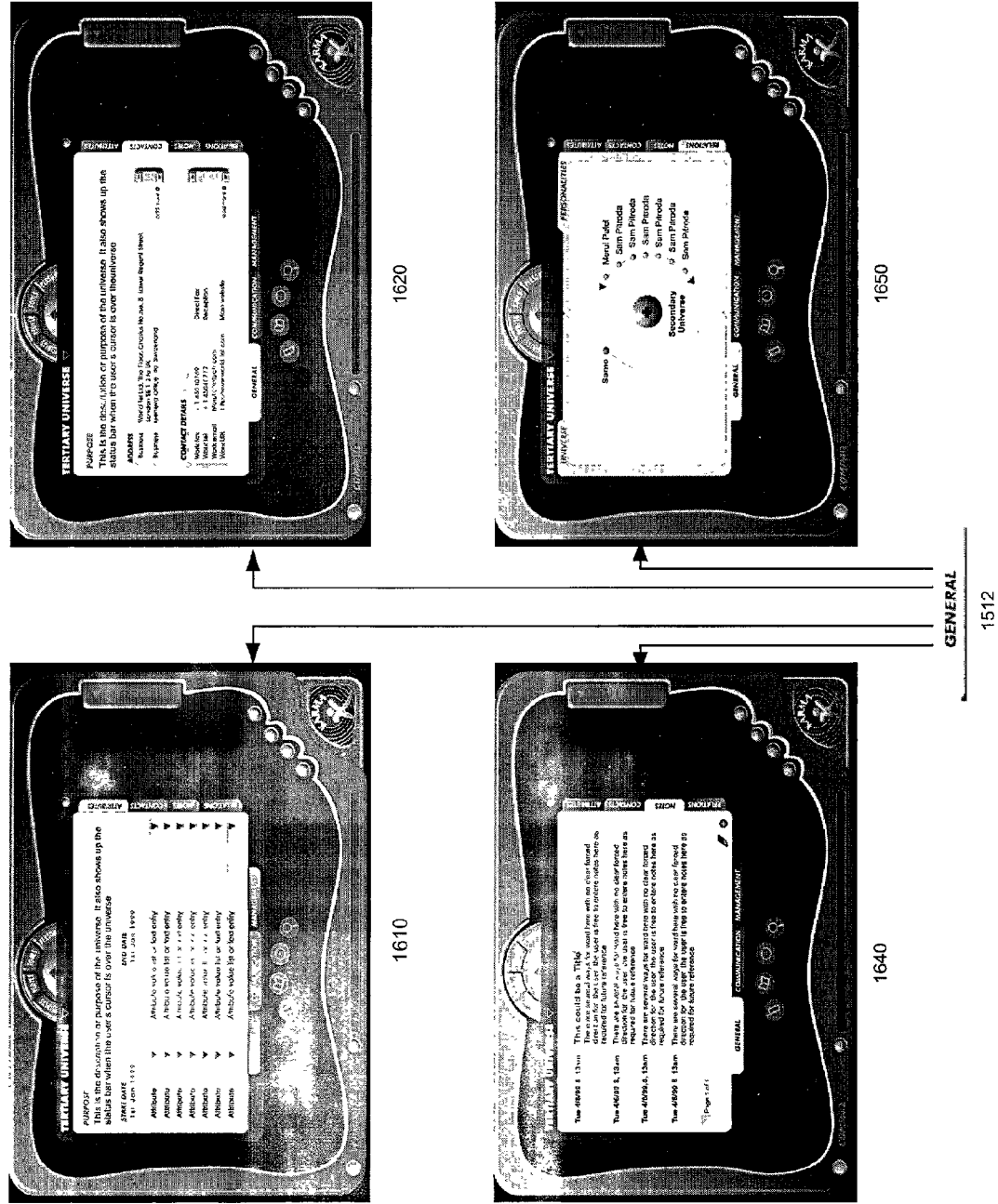
FIG. 16B illustrates sheets included in the general tab of a notebook in another example of the KUI of FIG. 1.

As depicted in FIGS. 16A and 16B, the general tab 1512 of a notebook 700 may further comprise of separate sheets, including an attribute sheet 1610, contacts sheet 1620, notes sheet 1640, and a relations sheet 1650. The general tab 1512 is a graphical representation of a notebook's general data section 701. The attribute sheet 1610 provides the ability to store characteristics or remarks pertaining to a universe. For example, attributes for the business universe may be project size, project location, client, and project duration. The contacts sheets 1620 provides the ability to store contact details for the universe. For example, contacts sheet 1620 provides access to the address and contact details for WordTel Ltd. and is stored in the notebook section of the data object 700 for the universe. The notesheet 1640 provides the ability to enter information that may be useful for further reference. For example, notes for the business universe relating to the CSAM universe may include a comment regarding a competitor's product. The relations sheets 1650 provides the ability to view associations between data objects in Karma system 100. For example, relations sheet 1650 provides a view of universes and personalities in a secondary universe. Although in an illustrative embodiment, four separate sheets have been defined, the list is not meant to be exhaustive. Further, the user may define other areas as relevant to the general data section 701.

Figure 17A:
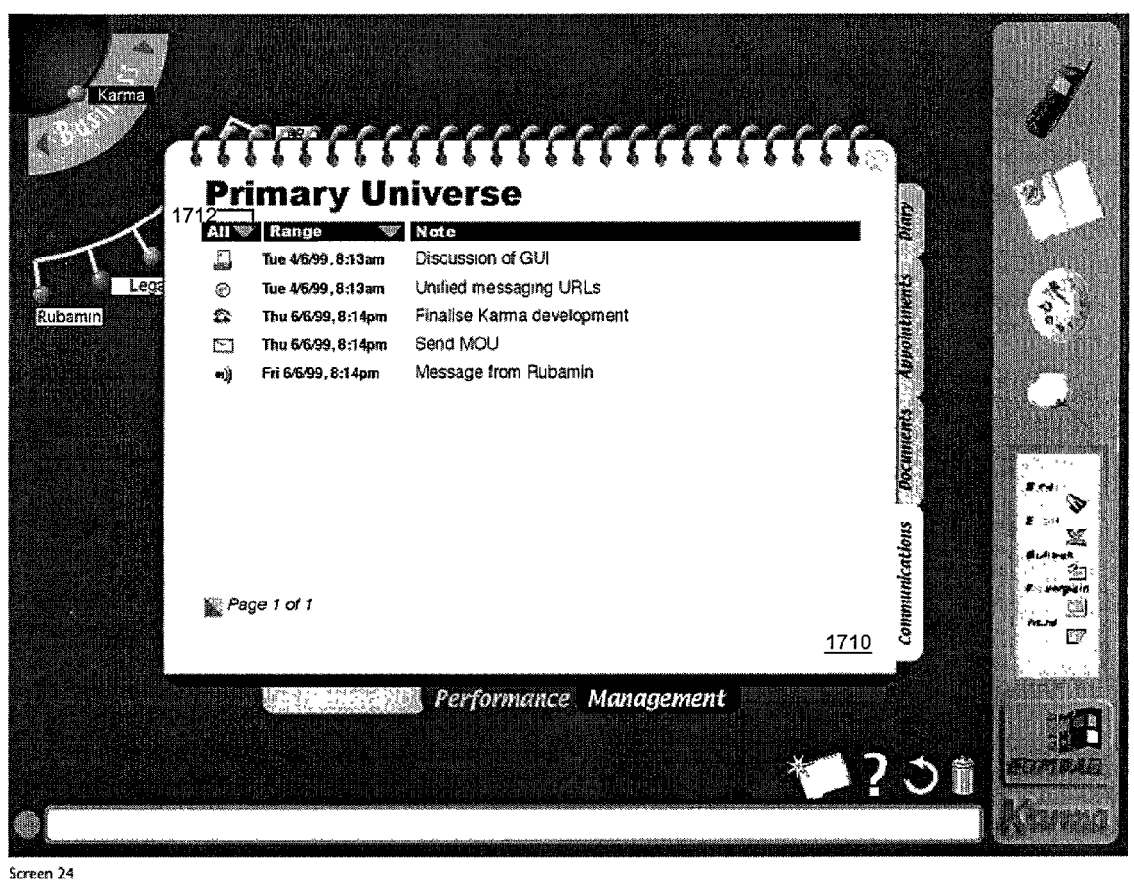
FIG. 17A illustrates the comprehensive communications sheet in the communications tab of a notebook in an example of the KUI of FIG. 1.
Figure 17B:
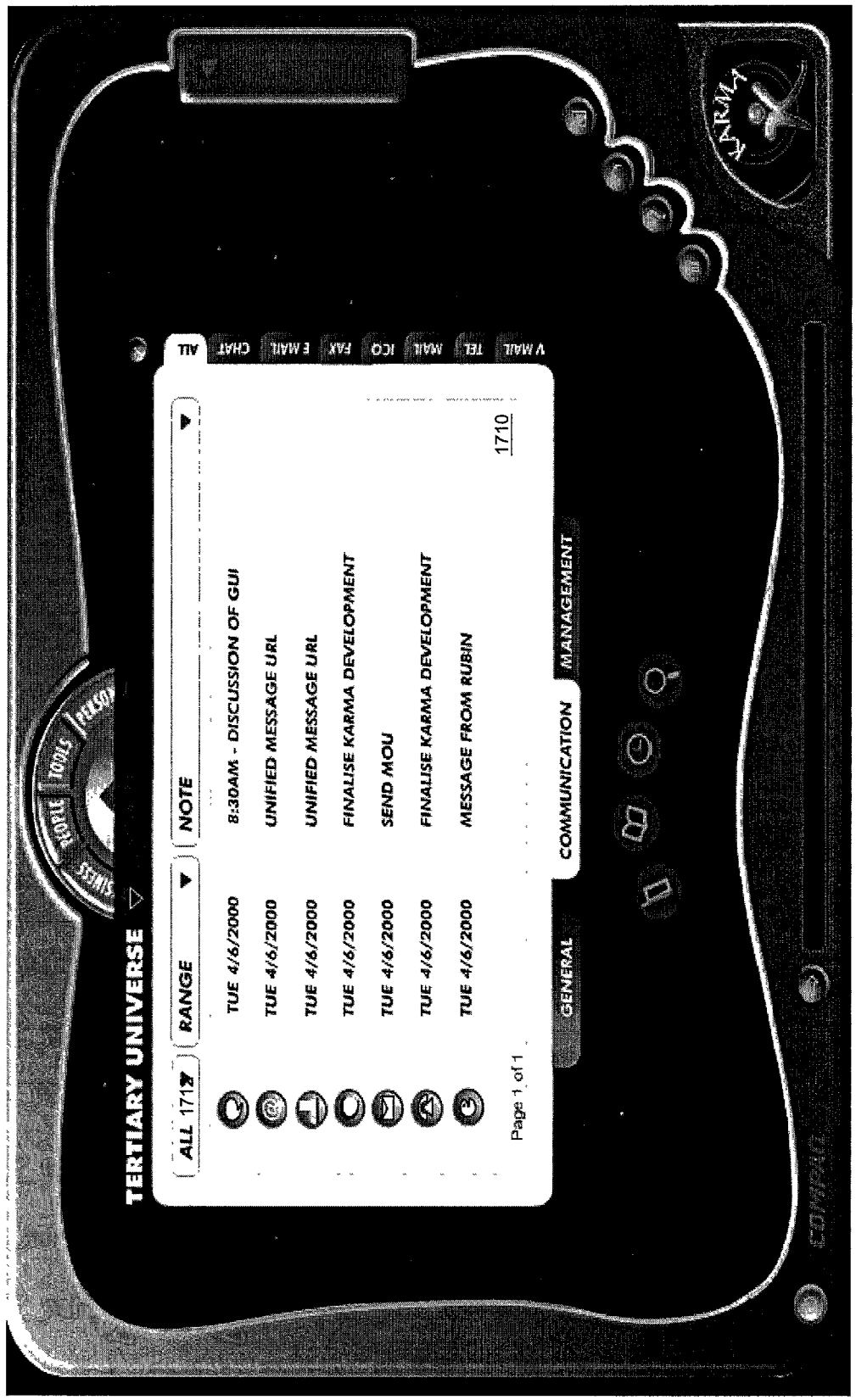
FIG. 17B Illustrates the comprehensive communications sheet in the communications tab of a notebook in another example of the KUI of FIG. 1.

The communication tab 1514 of a notebook 700 is a graphical representation of a notebook's communication section 702 and may also be comprised of separate sheets, including a comprehensive communications sheet 1710 as illustrated in FIGS. 17A and 17B. By toggling the submenu 1712 provided on sheet 1710, the user can isolate and view specific forms of communication, such as chat, email, fax, ICQ, mail, telephone, and voice mail. Forms of communication may have an associated icon to represent the type of communication. For example, in FIGS. 17A and 17B, a telephone icon represents telephone communications. Communication sheet 1710 provides log information and is automatically updated when new communications occur, either by applying a communication operator on the universe/personality or by clicking on the icon adjacent to the relevant contact detail on the contacts sheet 1620. In one embodiment, as shown in FIG. 17B, communications are separated into different types that the user may select by selecting the tab associated with the type of communication. For example, if the user is interested in only email communications relating to a desired universe, the user selects the email tab of the communications sheet 1710 to view all email communications.

Referring to FIGS. 18A and 18B, the management tab 1516 is a graphical representation of the notebook's management section 703 and the notebook's documentation section 704. The management tab 1516 may be comprised of separate sheets, including an appointments sheet 1810, a diary sheet 1820, a to do sheet 1830, and a documents sheet 1840. The appointments sheet 1810 enables the user to schedule and view new and existing appointments related to the universe. In an example embodiment, the diary sheet 1820 consolidates all management activities and information into a single view by displaying a calendar 1822 and all appointments 1824 and to do activities 1826 that the user has scheduled regardless of the universe the user is working with. In an alternative embodiment, the diary sheet 1820 may relate to an associated universe and display associated universe specific information. The diary sheet 1820 provides multiple views of the user's activities including a daily view 1820, a weekly view 1821, and a monthly view 1823. The to do sheet 1830 provides the user with the ability to schedule tasks which need to be performed and alerts the user of pending tasks associated with the node. The document sheet 1840 provides the user with a list of documents associated with the universe as well as access to pertinent document creating applications.

In an alternative embodiment, the Karma system 100 may enable a user to access a global notebook that maintains information relevant to all data objects in the Karma system 100. The user may access the global notebook by double clicking the mouse when it is over the circle 900 of the initial display (as shown in FIGS. 9A and 9B). A spiral notebook similar to the graphical representation of notebook 700 is displayed when the circle 900 is selected.

Figure 19A:
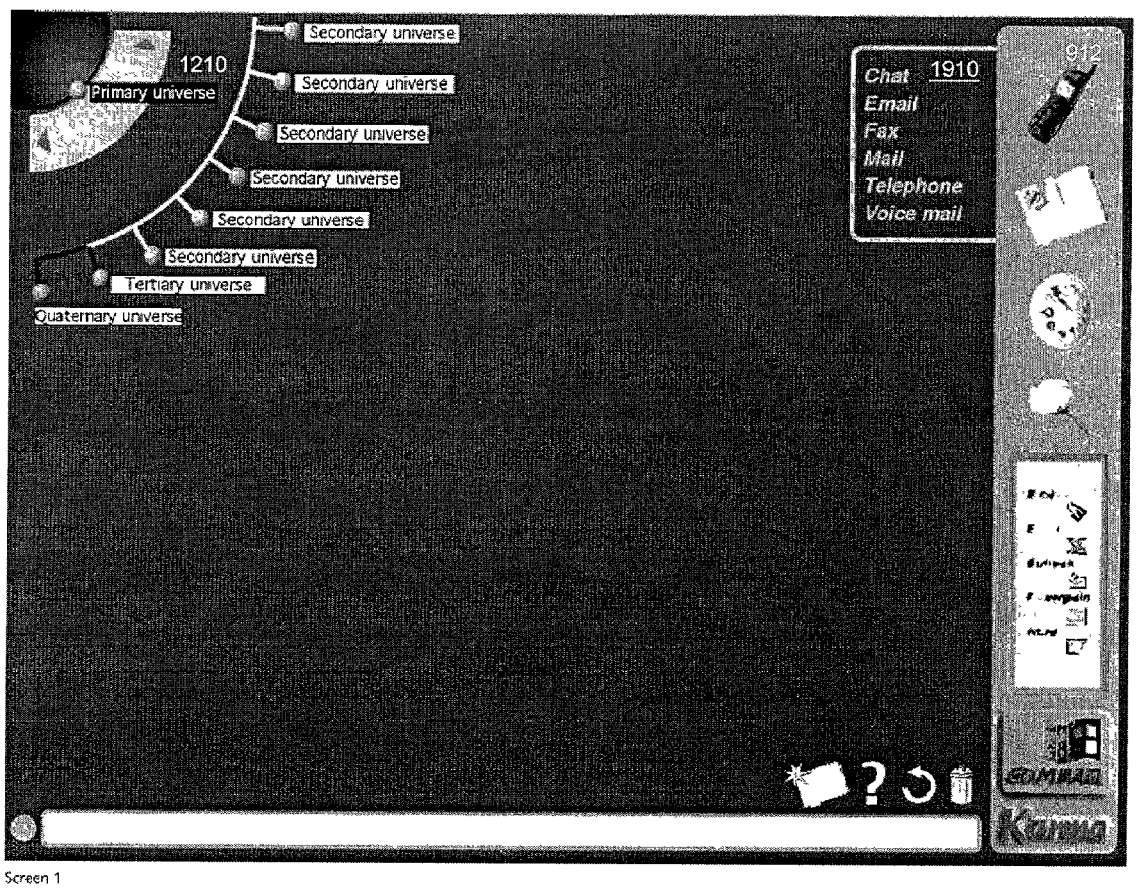
FIG. 19A illustrates an example of the KUI of FIG. 1 when the communication operator is selected.
Figure 19B:
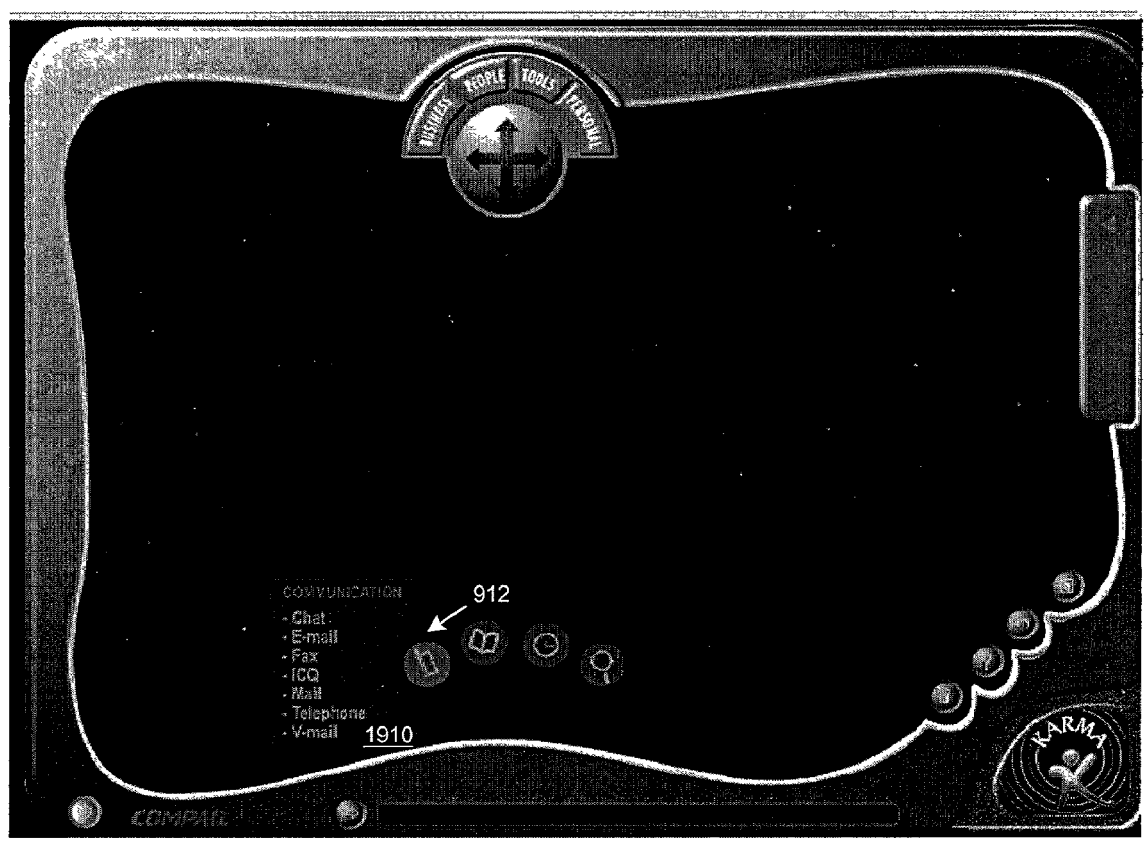
FIG. 19B illustrates another example of the KUI of FIG. 1 when the communication operator is selected.

As depicted in FIGS. 19A and 19B, an embodiment of the present invention provides icons to tools that the user may use often. Tools that may be used often include communications, management, history, and search. In the KUI 107, the mobile phone icon 912 represents the communication operator 402 and when selected, a submenu 1910 is displayed. FIGS. 19A and 19B illustrate the submenu 1910 that includes selections for access to types of communication such as chat, email, fax, mail, telephone, ICQ, and voice mail. In an illustrative embodiment of the present invention, the mobile phone icon 912 animates when there is incoming communication. For example, if there is incoming email, the mobile phone icon 912 may animate to notify the user of the email.

Figure 20A:
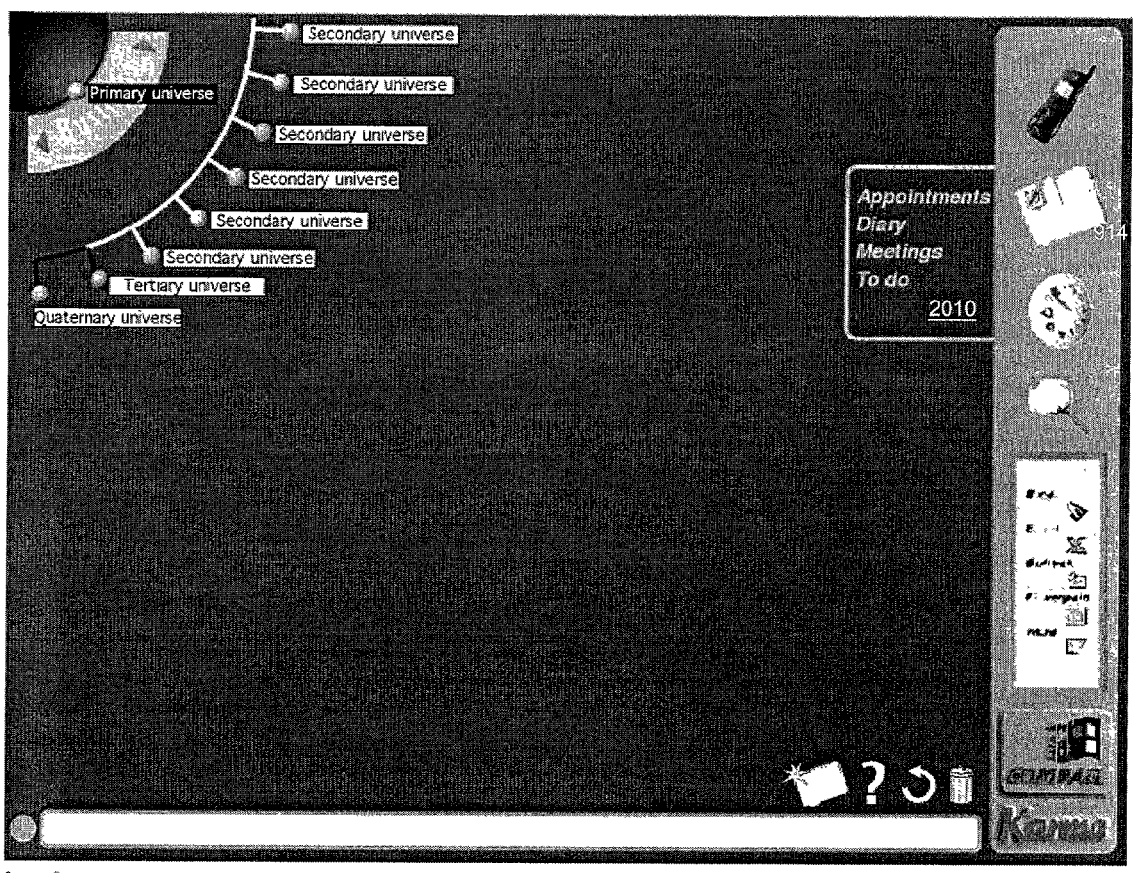
FIG. 20A illustrates an example of the KUI of FIG. 1 when the management operator is selected.
Figure 20B:
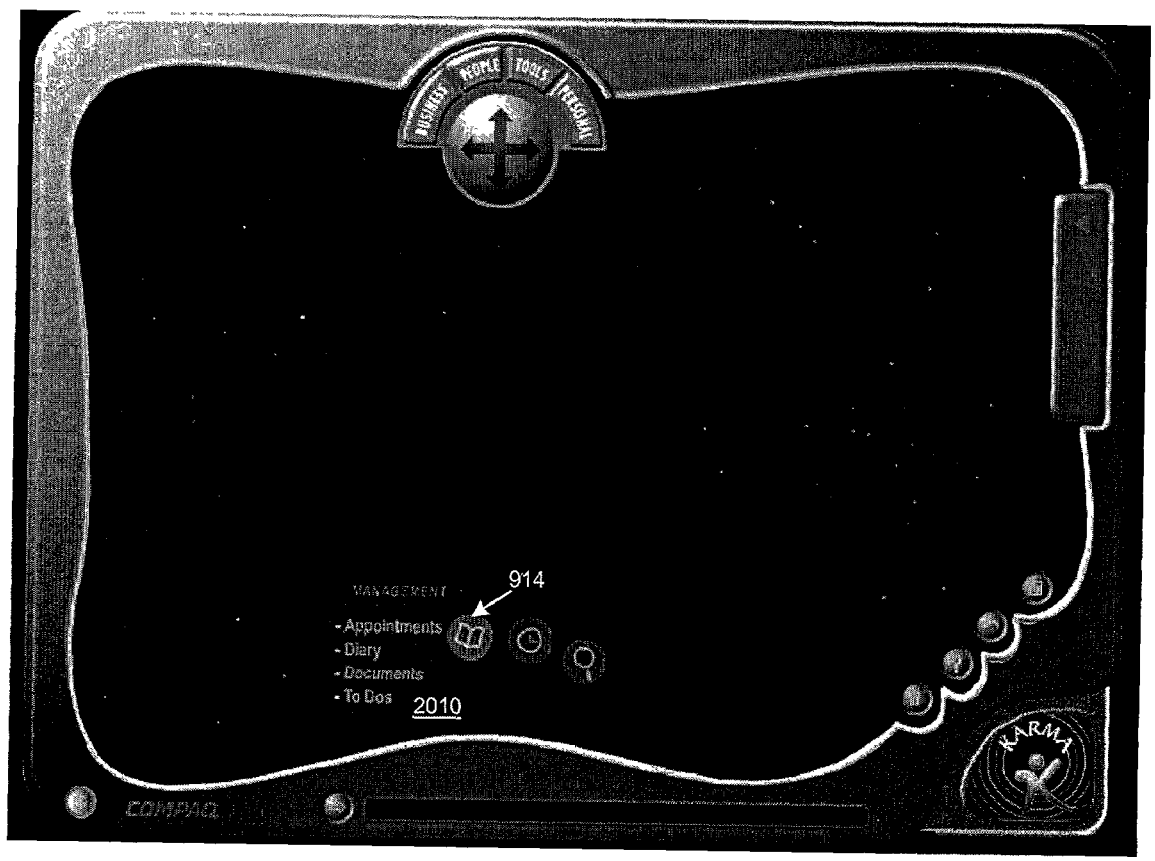
FIG. 20B illustrates another example of the KUI of FIG. 1 when the management operator is selected.

In KUI 107, the diary icon 914 represents the management operator 403, and when selected, as in FIGS. 20A and 20B, a submenu 2010 is displayed. FIGS. 20A and 20B illustrate the submenu 2010 that includes selections for accessing appointments, diary, meetings, documents, and to do functions.

Figure 21A:
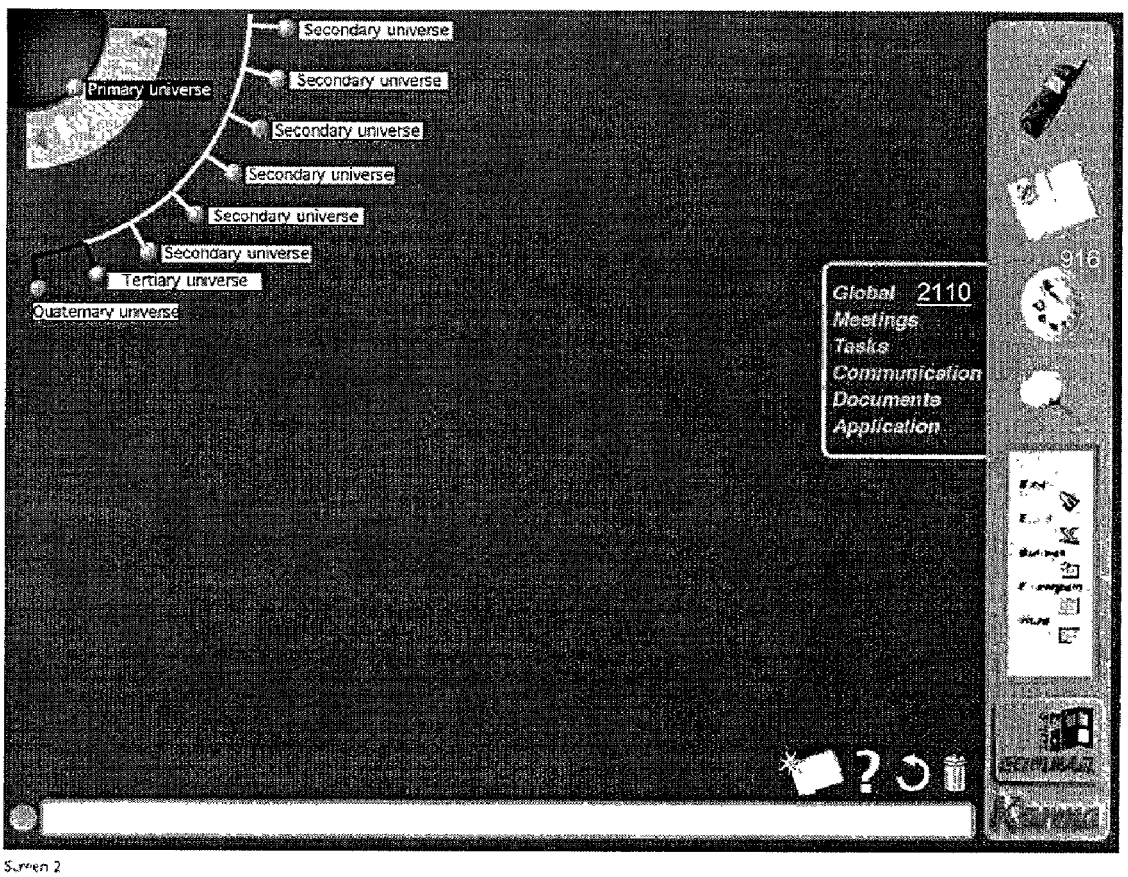
FIG. 21A illustrates an example of the KUI of FIG. 1 when the history operator is selected.
Figure 21B:
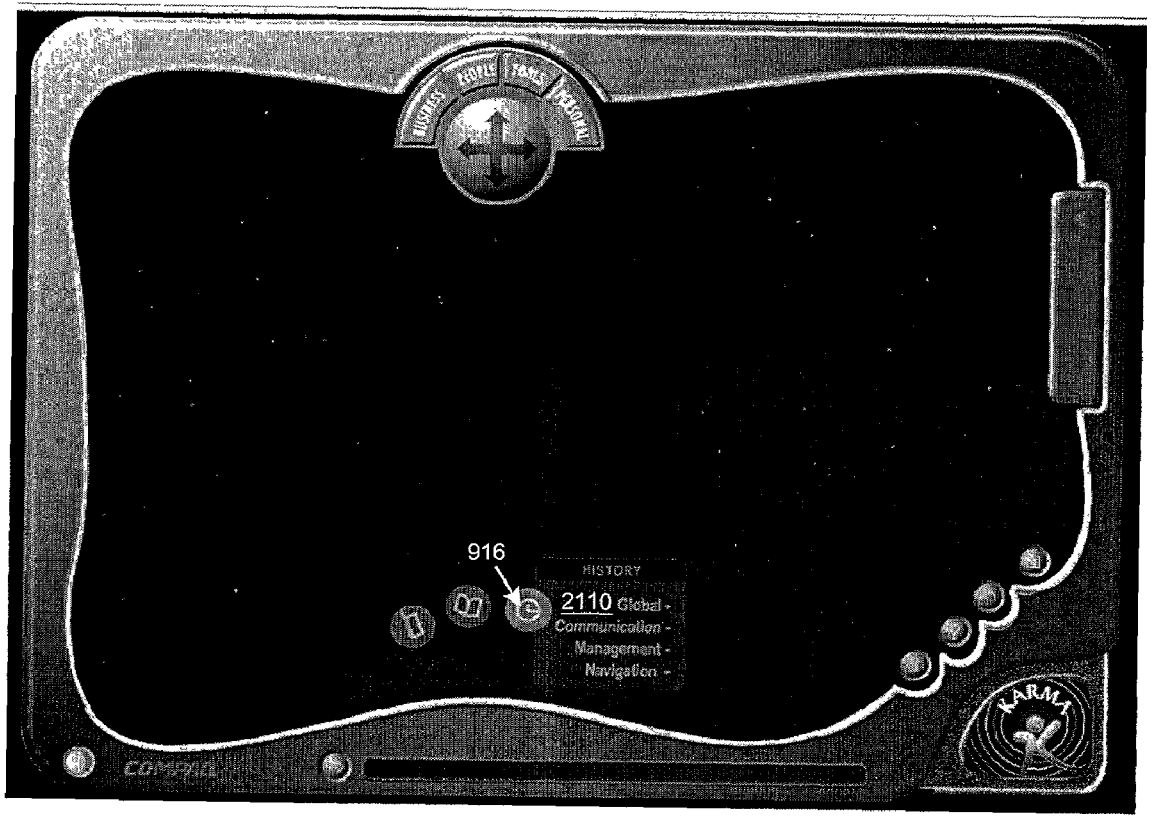
FIG. 21B illustrates another example of the KUI of FIG. 1 when the history operator is selected.

In KUI 107, the clock icon 916 enables the user to access the history operator 404. Referring to FIGS. 21A and 21B, selection of clock icon 916 displays a submenu 2110 of different views of the historical logs. As shown in FIG. 21A, one example of the clock icon allows the user to view the historical logs by selecting an item from the submenu 2110 including a global view of all logs, a view of meeting logs, a view of task logs, a view of communication logs, a view of document logs, and a view of application logs. In this embodiment, if a universe is currently selected when a view from submenu 2110 is chosen, then the view displays only logs corresponding to that universe. For example, in FIG. 21A, a selection of the global view of submenu 2110 will display the logs for all communication, management, document, and navigation activity related to primary universe 1210 since that is the currently selected universe. In an alternative embodiment, as shown in FIG. 21B, the submenu 2110 allows the user to view the historical logs by selecting a global view of all logs, selecting communications transactions, management transactions, and navigation.

Figure 22A:
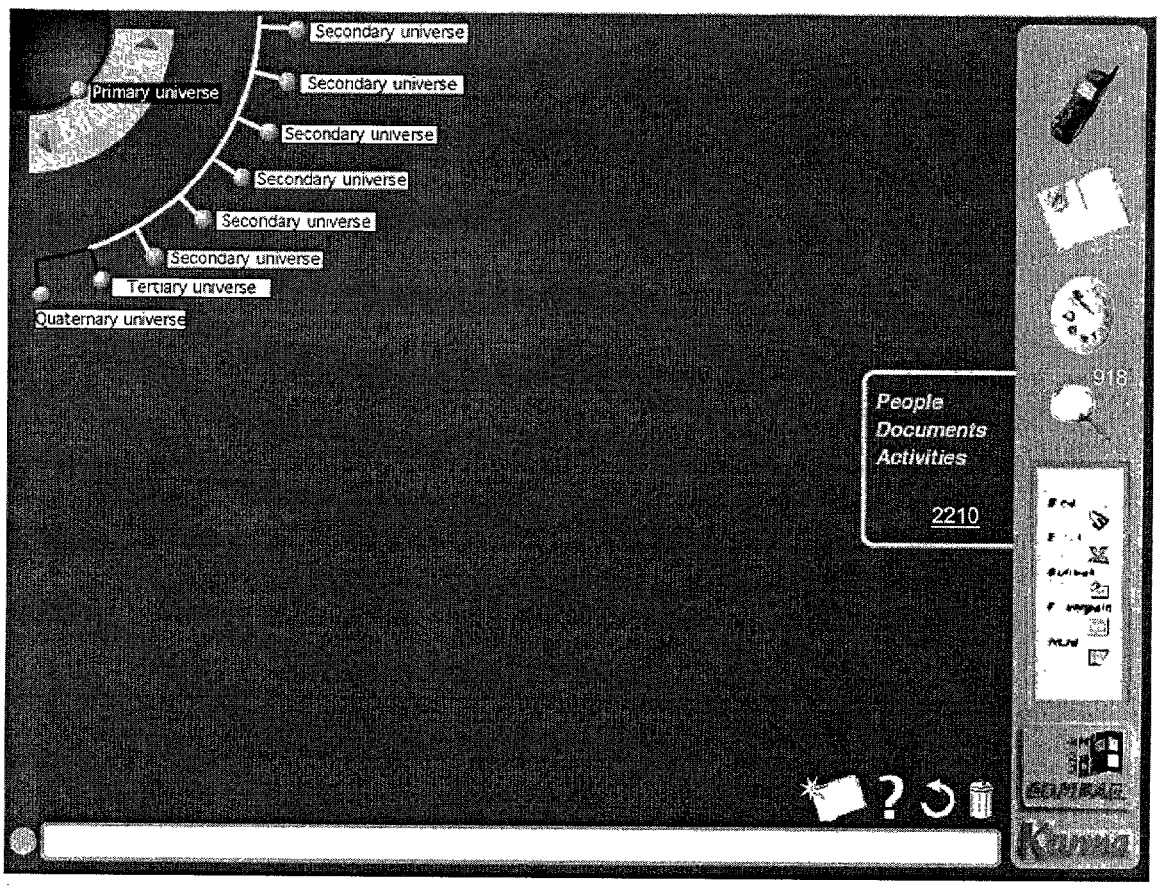
FIG. 22A illustrates an example of the KUI of FIG. 1 when the search operator is selected.
Figure 22B:
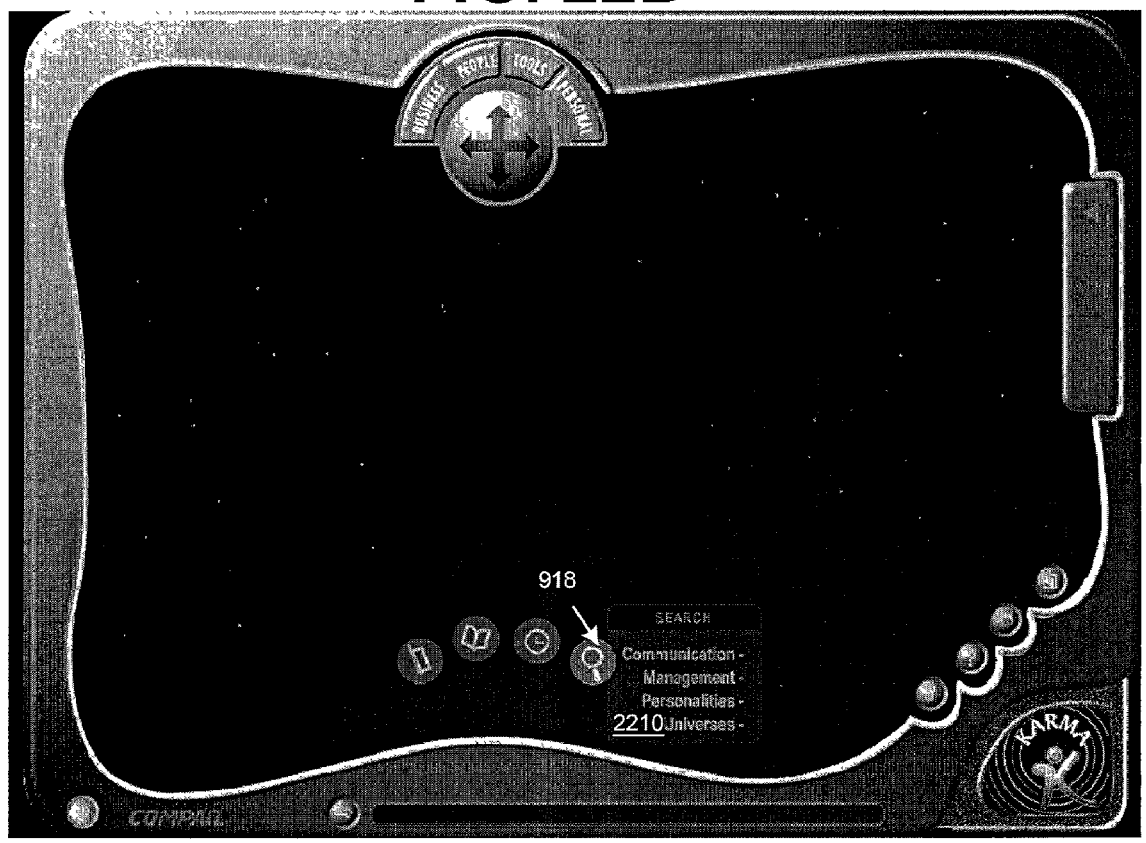
FIG. 22B illustrates another example of the KUI of FIG. 1 when the search operator is selected.

The magnifying glass icon 918 provides the user access to a comprehensive search capability in the system. As illustrated in FIGS. 22A and 22B, selection of the magnifying glass icon 918 displays a submenu 2210 that may include search filters such as a communication filter, management filter, people filter, and universes filter, documents filter, and activities filter. Depending upon which filter is selected, the system may present the user with further refinements through a search string entered by the user. For example, if the user selects the people filter in submenu 2210, the system may further provide the user the ability to refine the search based on name, attribute, note, address, contact detail, or purpose.

Returning to FIGS. 9A and 9B, a configurable tool bar 920 is included in the KUI 107. The configurable tool bar 920 may enable direct access to recently used tools as well as third party applications. Furthermore, KUI 107 may include a set of global icons 922. The set 922 includes an icon for adding universes or personalities 924, an icon to undo previous actions, an icon to access help, and a trash icon. The icons on the KUI 107 provide short cut access to actions that the user performs often. Further, new icons may be added to provide more efficient access to operators, tools, and information in the Karma system 100.

As previously noted, the present invention consists of integrated tools as well as third party compatible tools that are incorporated into the Karma environment. The present invention does not require a user to open and close applications programs manually. Instead, operators can be used on any universe or personality, which would represent real world tasks that a user would perform, such as emailing an individual, and are associated with a particular email application. There are also applications or functions that do not correspond to a direct activity, e.g. maintenance and archiving utilities, web browsing applications, statistical analysis or graphical design utilities. These can be accessed from the Tools sphere 908.

Figure 23:
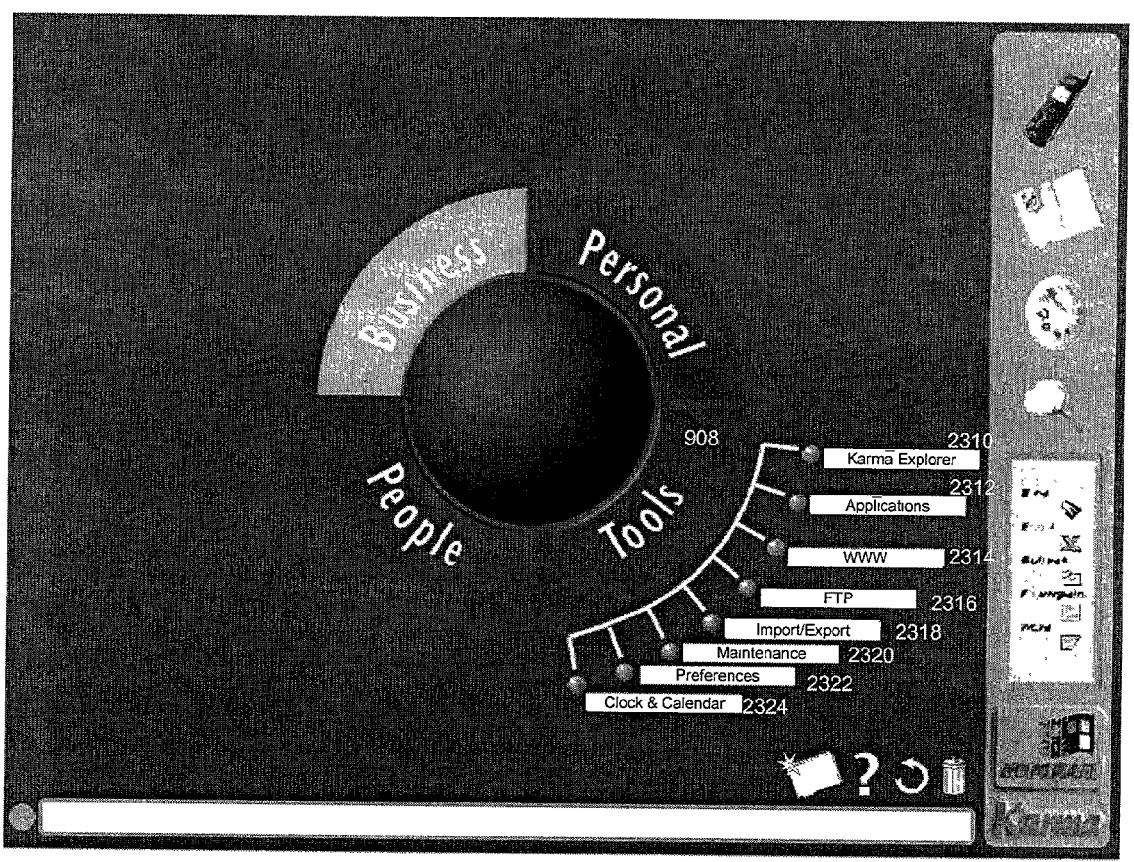
FIG. 23 illustrates the universes in the Tools sphere in an example of the KUI of FIG. 1.

The tools sphere 908 provides direct access to applications which may or may not correspond to any of the four operators. An illustrative embodiment of the tools sphere 908 is depicted in FIG. 23. The universes include a system navigation application known as Karma Explorer 2310, an applications universe 2312 which lists all the applications resident on the user's information appliance, web universe 2314 for browsing the internet, file transfer protocol (FTP) universe 2316, import/export universe 2318, maintenance universe 2320, preferences universe 2322, and clock and calendar universe 2324. These universes provide direct access to associated tools and utilities. In an illustrative embodiment, some tools such as maintenance and preference tools can only be accessed through the tools sphere 908.

The system navigation universe 2310, labeled "Karma Explorer" in FIG. 23, provides an alternative method of navigating through the spheres, universes, and personalities in the system. Entering the system navigation universe 2310 reveals a specialized notebook that displays a tree diagram through which the user is able to access information by expanding or collapsing chosen nodes in the diagram. The tree diagram has a left column of vertically networked nodes representing spheres, universes, and personalities in addition to a right column for displaying specific items of information from the universe notebooks associated with the nodes that represent those universes. The right column may further be divided up into sections such as a document section and an appointments and tasks section. For example, a node in the left column that represents a sphere can be expanded by clicking the mouse to reveal further nodes that represent its universes. Selecting a node that represents a universe causes all the documents associated with that universe to be displayed in the document section and all the appointments and to do activities associated with the universe to be displayed in the appointments section. Additionally, the user can enter a node representing a universe by double clicking the mouse that then displays the associated notebook on the screen as well as bringing the selected node into focus.

The applications universe 2312 provides access to all applications available through the system. These applications include both integrated applications intended to be used within the present invention as well as other independent third party products. An illustrative embodiment of the applications universe 2312 has a specialized notebook that displays a list of names and corresponding icons of applications as well as options to add and delete access to applications from the system. By double clicking on an icon, the application associated with that icon is activated. If an application is opened to create a new file, the file can be automatically associated with a selected universe or the currently selected universe. For example, if the user should launch Microsoft Word® from a universe named "XYZ Acquisition," the results are saved or "journaled" in conjunction with the universe in which the program was opened. This is also true for any other tools the user would run for any particular universe. All applications that do not correspond to any of the four operators are also accessible from the adaptive toolbar 920, allowing the user to open the desired application and automatically associate the new document with the required universe/personality without losing his/her location in the Karma 100 GUI.

Similarly, the web universe 2314 provides focused browser access to the World Wide Web. The browser may be a third party product or an integrated portion of the system. As noted earlier, if a universe is currently selected, then if there exists a web page associated with that universe, it will be automatically displayed when the browser is activated through the web universe 2314. Similarly, if a user saves a web page through the browser, that page will be automatically associated with the currently selected universe. One embodiment of the notebook associated with the web universe 2314 also provides a navigation structure, similar to the tree diagram structure of system navigation universe 2310, for organizing web bookmarks, favorites, and shortcuts.

The file transfer protocol (FTP) universe 2316 provides the user access to an FTP client. The FTP client may be a third part product or an integrated portion of the system. As noted earlier, if there is a FTP server specified in the notebook of a currently selected universe, then the FTP client connects to this FTP server when it is activated through the FTP universe 2316. By default, files transferred into the system are associated with the currently selected universe but may be associated with any other selected universe if the user so desires.

The specialized notebook associated with the import/export universe 2318 provides synchronization capabilities for several situations. Such synchronization capabilities include but are not limited to synchronization with personal digital assistants (PDA), off site web servers, laptop computers, and person information management systems. Such synchronization services are further discussed in the last section of this detailed description. Illustrative embodiments of the system also enable it to interact and import/export files and folders between the Karma user interface 107 and data storage areas and the underlying operating system hierarchical filing system. Such illustrative embodiments may further provide the capability to import or export the data representation of existing tasks, appointments, and contacts in the present system into standards compliant formats or de facto standards used by industry. For example, the present invention can import or export data representations in the form of comma separated values (CSV) text files or Microsoft Excel® files.

Figure 24:
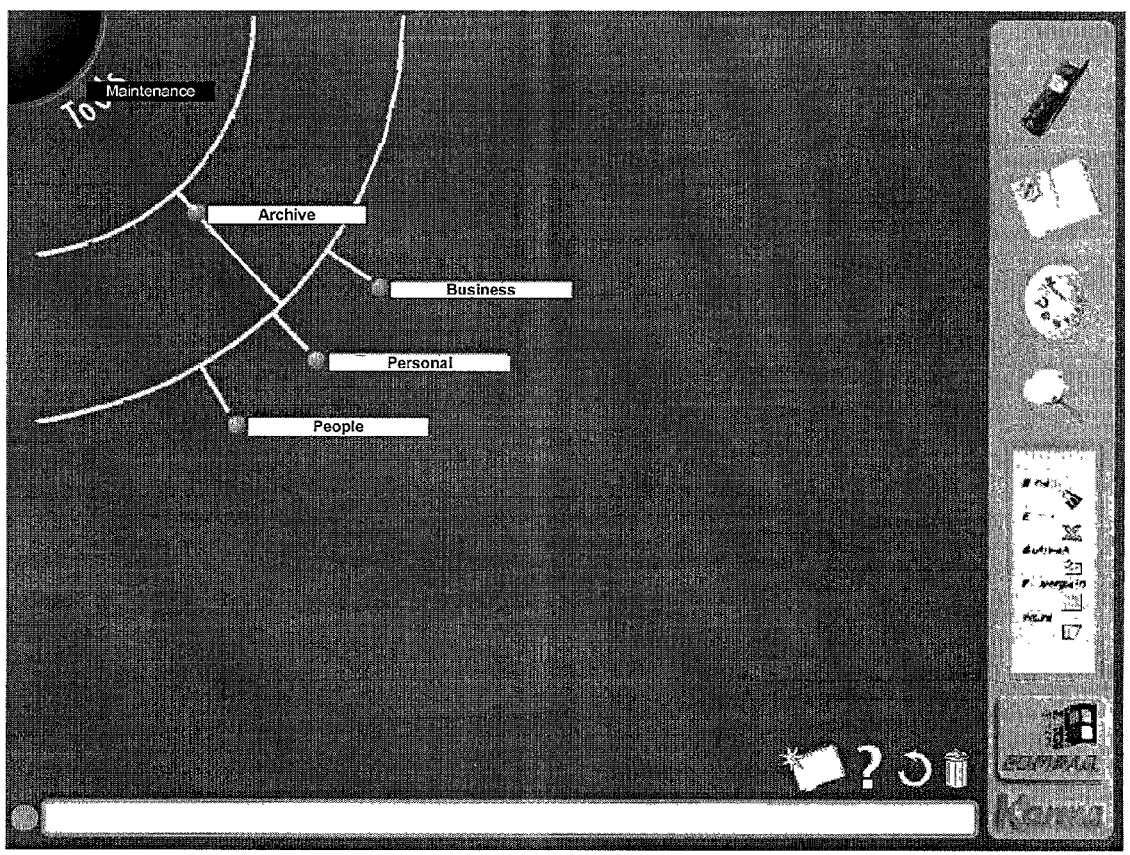
FIG. 24 illustrates an example of the KUI of FIG. 1 when the user chooses to access the system archive.

The notebook associated with the maintenance universe 2320 in FIG. 23 provides the user access to backup and restoration utilities as well as archival and retrieval utilities. For example, when a user requests the system to archive a certain universe, that universe is removed from its present location and moved to an archival location. As depicted in FIG. 24 one embodiment of the system organizes the archive as a child universe 2410 of the maintenance universe 2320. This archive universe 2410 has three child universes of its own: a business child universe 2412, a personal child universe 2214, and a people child universe 2116. These child universes correspond to the Business 902, Personal 904, and People 906 spheres. For example, if the user chooses to archive a universe from the Business sphere 902, the universe is removed and placed as a child universe of business child universe 2412. Child universes of a universe that the user chooses to archive may be archived along with the chosen universe or associated with other existing, non-archived universes. While an archived universe can be accessed in the same way other universes are, they cannot be changed. Alternative embodiments of the system may move archived documents and information to a folder in the file system of an underlying operating system.

The notebook associated with the preferences universe 2322 presents the user with a display to set preferences for the system. Such preferences may include regional location, sorting criteria, timing durations, trash size, default applications for the configurable toolbar 920, duration for purging history logs, date and time format, and currency and number format. Additionally, the notebook associated with the clock and calendar universe 2324 provides a display for the user to set the global clock and calendar of the system.

A second method for accessing tools is through the tools bar 910. Like accessing tools through the tool sphere 908, if there exists a currently selected universe, certain tools will open within the context of that universe. For example, in FIG. 19A, primary universe 1210 is the currently selected universe. Thus, if the user chooses the email selection from the submenu 1910, the email application will provide the user the ability to email any contacts that are found in the notebook of primary universe 1210. For example, referring to FIGS. 16A and 16B, activation of the email application through submenu 1910 will select the email address 1624 provided by contacts sheet 1620 of the notebook as the intended address for the composition of an email message. An alternative method of using the tool bar 910 to load applications in the context of a universe is to drag the chosen universe's node into one of the icons in the tool bar 910 and then select an application from the subsequently displayed submenu.

Additionally, as noted earlier, the configurable tool bar 920 of tool bar 910 provides access to an unlimited number of third party applications. The applications that are accessible through the configurable tool bar 920 may be determined by the user through use of preferences universe 2322 or may be manually entered by the user and updated in the KUI 107. The applications in the configurable tool bar 920 are also accessible through the applications universe 2312 of the tools sphere 908.

Finally, a third method for accessing tools is through the notebooks of individual universes. Management applications are automatically displayed in the context of the selected universe by accessing the management sheets of the notebook. Similarly, document creating applications are accessible by double clicking the add document icon in management sheet 1840, as shown in FIGS. 18A and 18B. The document creating applications will thereby load the specific file listed in sheet 1840 associated with the selected icon for editing. Similarly, communications applications may be accessed by viewing the contacts sheet of the notebook and double clicking on information such as an email address or telephone number.

Figure 25:
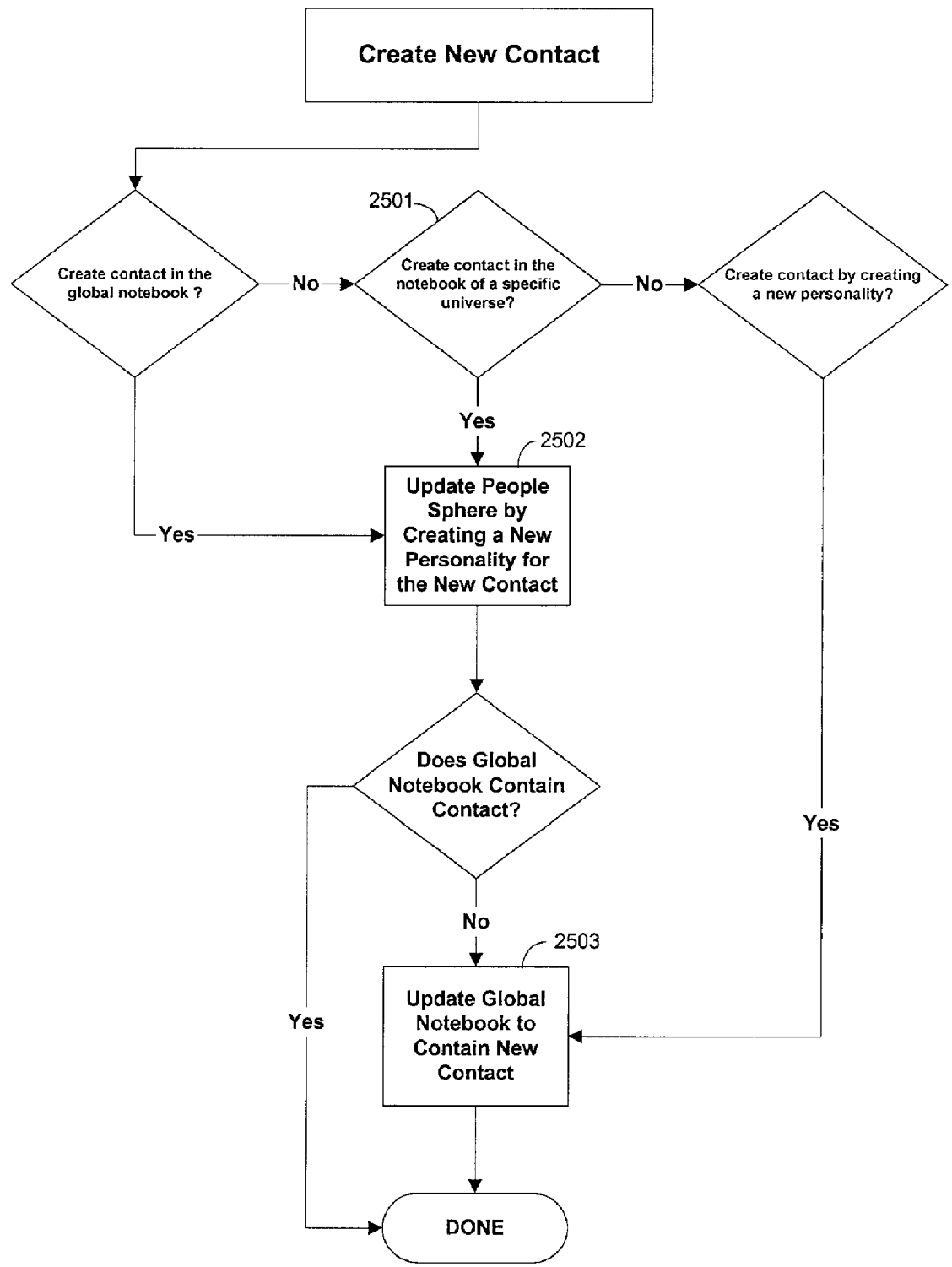
FIG. 25 is a flowchart showing the automatic update process of an illustrative embodiment of the system upon creation of a new contact.

In an alternative embodiment of the invention, Karma system 100 automatically synchronizes information access capabilities of the system when certain structures are created or modified. For example, following the flowchart in FIG. 25, if a new contact is created in a notebook corresponding to a particular universe (step 2501), the system will automatically generate a new personality (step 2502) corresponding to the new contact as well as generate a new entry in a global notebook (step 2503) for the new contact. Thus, in addition to the new contact in the notebook, subsequent access to the People sphere 906 will display a new personality for the contact and subsequent access to the global notebook will also display an entry for the new contact. It is important to note that the new contact in the notebook, the corresponding personality, and the corresponding entry in the global notebook are simply different ways of accessing the same data record, an example of which is shown in FIG. 6. Thus a modification to the data record 600 will be reflected in all three methods of accessing the contact information. Similarly, if a new personality is created through the People sphere 906 or a new contact is created in the global notebook, such personalities or contacts can easily be further associated with particular universe notebooks.

The system also enables the user to modify the current relationships of universes. For example, the user can create jump relationships between universes associated with the same sphere simply by selecting a universe on the display and dragging and dropping it on the other universe. The user can also establish jump relationships between universes from different spheres. For example, suppose the user selects a universe in the Business sphere 902 in a display similar to FIGS. 11A and 11B. The user then drags the universe to the upper left corner of the display, beyond the Business sphere's arc, and waits for a pre-defined time duration. The display will automatically change to the initial display as shown in FIGS. 9A and 9B, whereupon the user then continues to drag the selected universe over to the Personal sphere 904. Once over the Personal sphere 904, the user waits again for a pre-defined time duration whereupon the display automatically changes to Personal sphere display (similar to the Business sphere display in FIGS. 11A and 11B, but with the Personal sphere 904 instead). The user then drops the selected universe over the another selected universe in order to establish a jump relationship. Alternatively, the system may enable the user to use a similar drag and drop functionality to modify the current structure of the system through use of the tree diagram display in the Karma Explorer 2310 of the Tools sphere 908 as explained earlier.

An illustrative embodiment of the system incorporates extensive synchronization features. For example, one embodiment of the system resides on a desktop computer. With such an embodiment of the system, the user is able to synchronize information between the desktop and a third party information management system residing on a personal digital assistant (PDA) or a laptop computer. Alternative embodiments may reside completely on its own in a PDA or laptop computer. In such embodiments, synchronization also occurs between the present system on the desktop and the present system on the PDA or laptop computer.

The system also may provide several compatibility capabilities. One embodiment of the system may reside on top of an existing operating system, for example Microsoft Windows® or Apple Macintosh®. In such an embodiment, the system is able to import and export data from information management applications designed for the underlying operating system. For example, one embodiment of the system can import and export data to Microsoft Outlook® and Lotus Organizer®. Similarly, the present system can also interact with the underlying file system of the operating system through the operating system's own graphical user interface. In one embodiment, the user is able to drag and drop folders and documents from the operating system's own graphical user interface into the universes and notebooks of the present invention.

An illustrative embodiment of the system may also provide World Wide Web services. In such an embodiment, the system comprises an off site Web server to which users can upload the spheres, notebooks, universes, and documents of their local system. Such a Web server further may offer global access applications that do not exist on the local portion of the present system. Users can then access, organize, and navigate a Web representation of the uploaded information. Furthermore, such an embodiment would provide synchronization services between the Web server and the local portion of the system. The Web server may also provide services for receiving and organizing messages such as email, faxes, or voice mail. It may also provide sharing services to enable a second user to access the spheres, universes, and notebooks of a first user in accordance with the first user's permission.

The present invention is portable via diskettes, e-mail, LAN/WAN connection or over the Internet via upload and download to any computer. In an illustrative embodiment, the computer user's profile can be transferred to another computer. This enables the user to carry his Karma from one computer to any other computer, so long as the Karma system 100 is installed on each computer.

The present invention can also be installed on a network server. This would allow the user to maintain his personal Karma as she moves from one workstation to another. The user profile can be kept on the server or copied into the workstation hard drive upon log on. In a preferred embodiment, the user profile is made secure via a password.

Portability will now be explained by way of example. Suppose the user decides to travel for a brief work assignment. He creates a series of diskettes that will contain his entire user profile. Alternatively, the user could upload his user profile to a web site so he could download it into his computer that the other office as soon as he arrives there.

When the user arrives in his new office, he can install his user profile in the computer he will use while he is working at this location. Everything works the same as on his regular computer.

In an alternative embodiment, Karma may employ learning as a method of increasing the relationships between universes. The method examines words in a document to determine whether a link may be necessary between two universes and observes whether the user established a link between the two universes. The method recognizes and learns relationship pattern regularities that appear over time. For example, the user regularly associates documents that have X, Y, and Z personalities on the CC: line with X, Y, and Z personalities. The method may recognize this pattern and learn that links need to be created between the current universe and X, Y, and Z personalities. The ability to predict relationships allows Karma to be more useful if the user has forgotten to explicitly make the link between the appropriate universes. For example, the user while in the Project ABC universe writes a letter with X, Y, and Z on the CC: line. The user forgets to establish a link to X, Y, and Z. At some later date, the user would like to enter into a project with Z but forgets who Z is, contact details, and how the user met Z. In such a situation, Z is easily found by using Karma.

The use of the Karma system 100 allows the user to perform a variety of functions, heretofore accomplished using either a complicated combination of tasks and applications. For example, the present invention allows the user to define a business sphere for all profit-related activities and information however still related to the user's personal sphere. Thus, all relationships in the computer can be displayed within the user's graphical user interface.

Provided below are practical applications for the present invention.

EXAMPLE 1

Starting Karma

Figure 26:
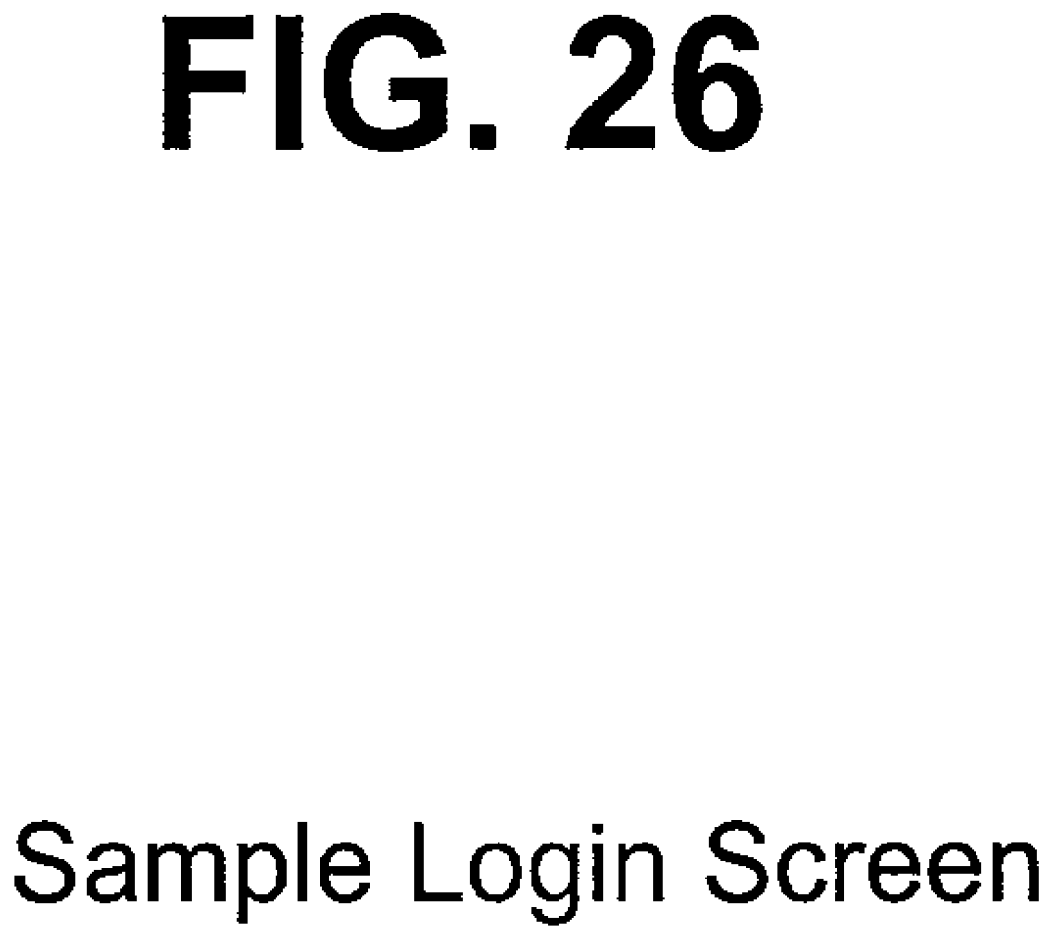
Figure 27:
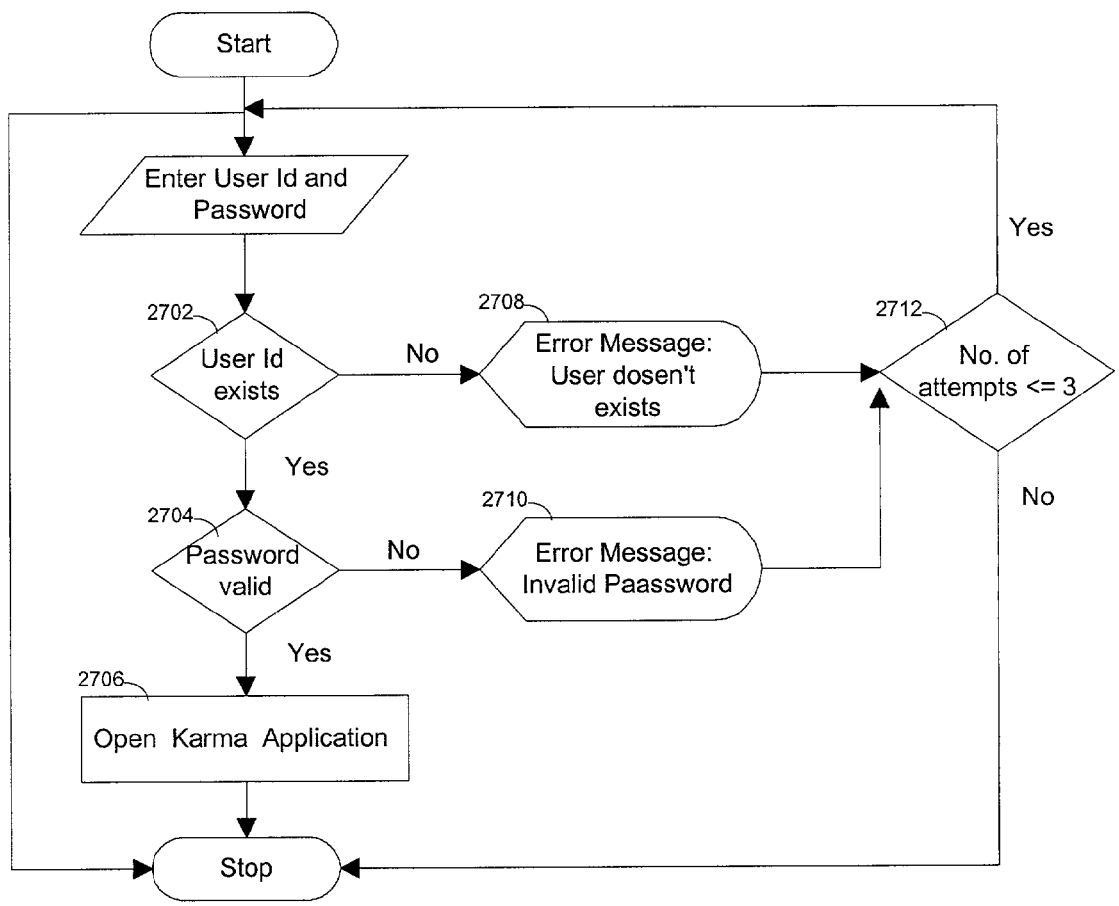
FIG. 27 is a flowchart showing the login process.

In practicing an embodiment of this invention, the user first encounters a login in screen as shown in FIG. 26, which may include a password validation, as is shown in the flowchart of FIG. 27. As is shown in FIG. 27, authentication of the user is performed by verifying the user Id (Block 2702) and validating a password for the given user (Block 2704). If both criteria are met, then the Karma application is started (Block 2706); otherwise, appropriate error messages (Blocks 2708 and 2710), are presented to the user. Further, in an illustrative embodiment of the invention, the user is not given more than three attempts to successfully start the Karma application (Block 2712). The password validation (Block 2704) may be any password or security system, such as those which are well known to those skilled in the art. For example, the password may include a type-in validation, voice-activated validation, fingerprint validation, signature validation, or the like.

EXAMPLE 2

Entering a Universe

Figure 28:
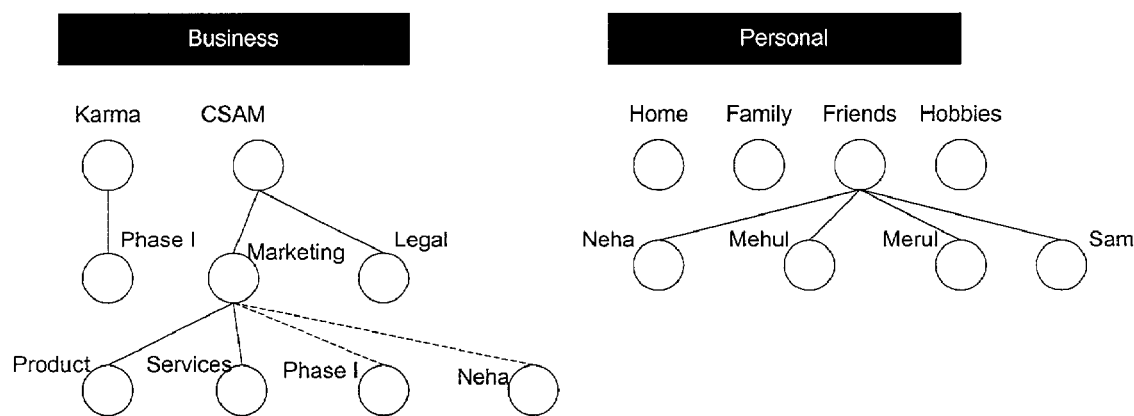
FIG. 28 illustrates the tree-like hierarchy of the relationship manager.
Figure 29:
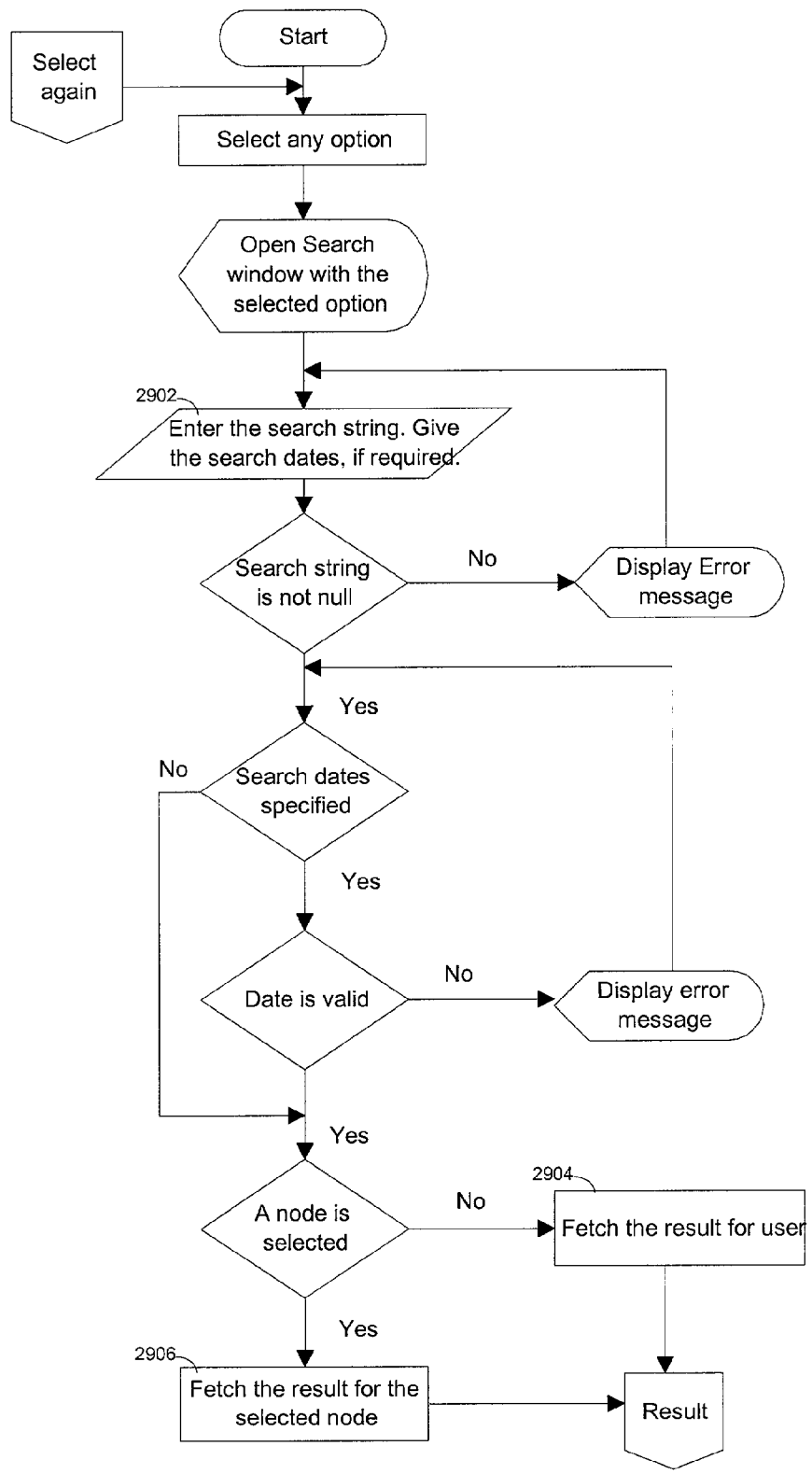
FIG. 29 is a flowchart showing the search operation of an embodiment of FIG. 1.
Figure 30:
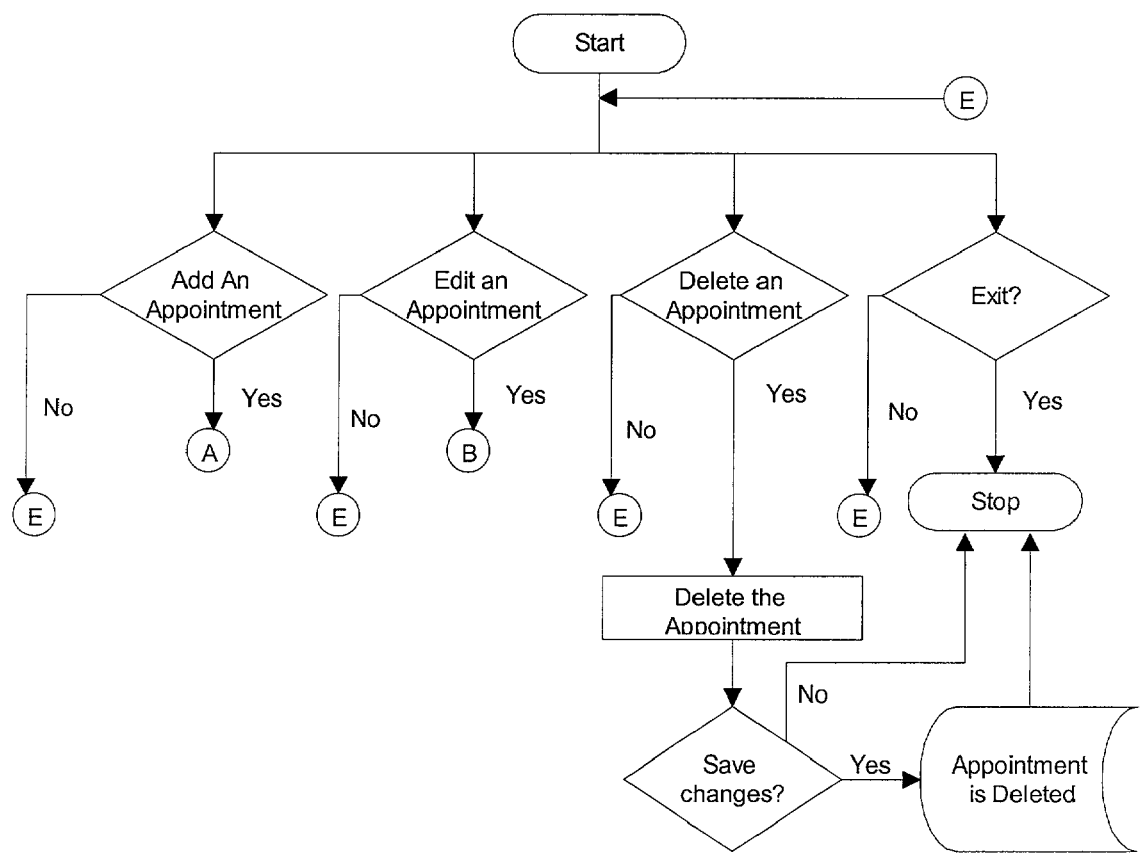
FIG. 30 is a flowchart showing the management operations of an embodiment of FIG. 1.
Figure 31:
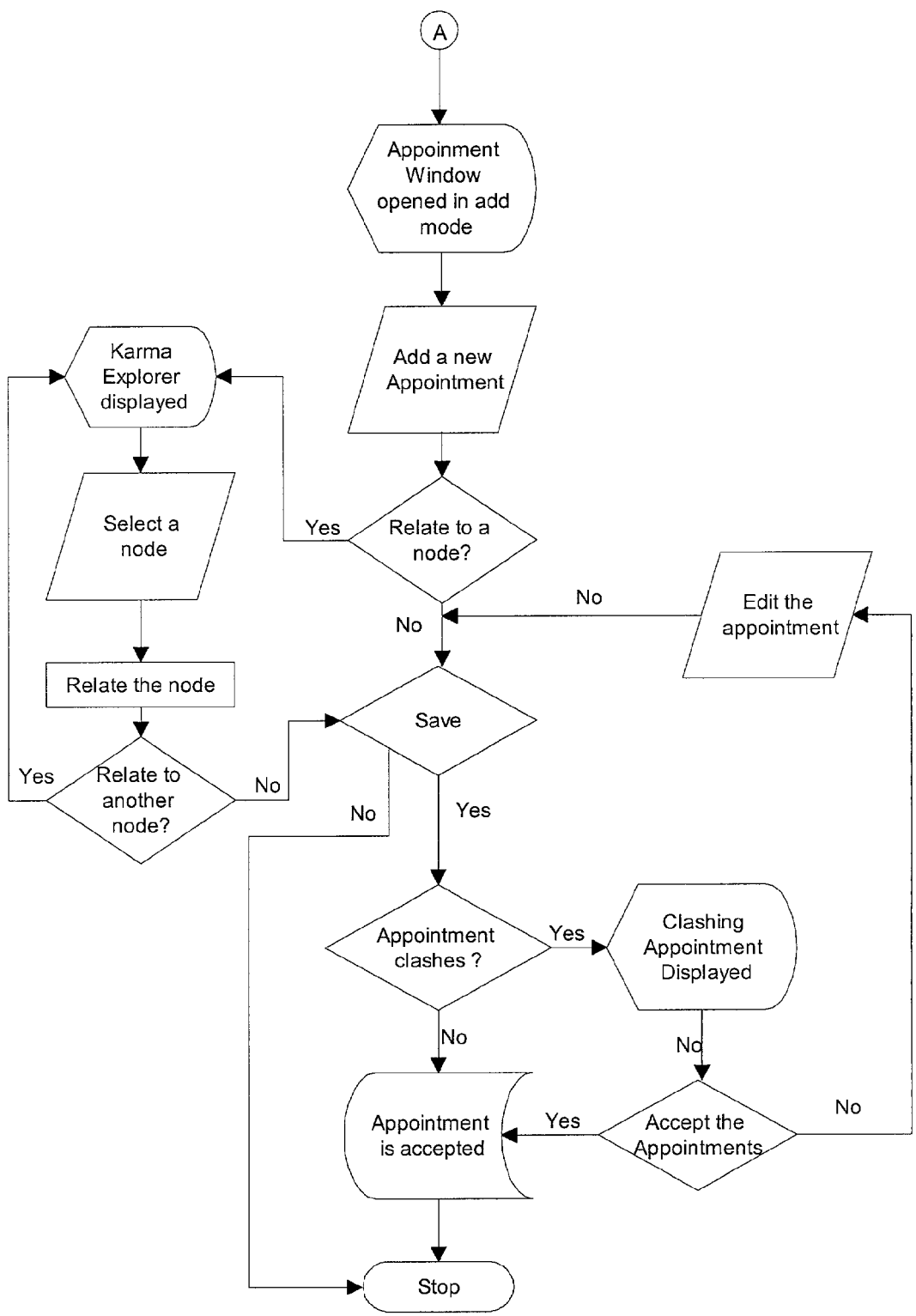
FIG. 31 is a flowchart showing the appointment management operation.
Figure 32:
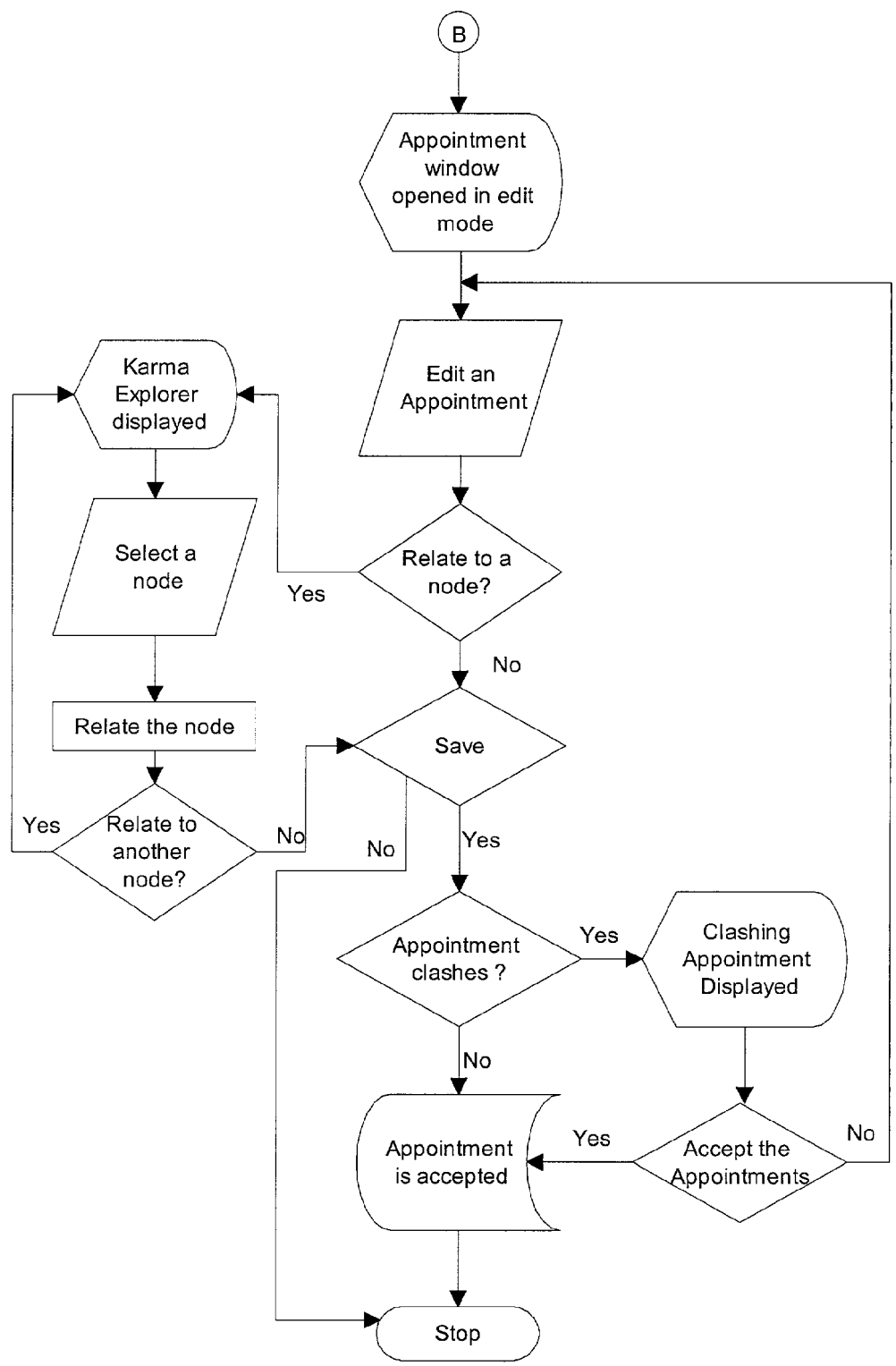
FIG. 32 is a flowchart that continues the appointment management operation of FIG. 31.
Figure 33:
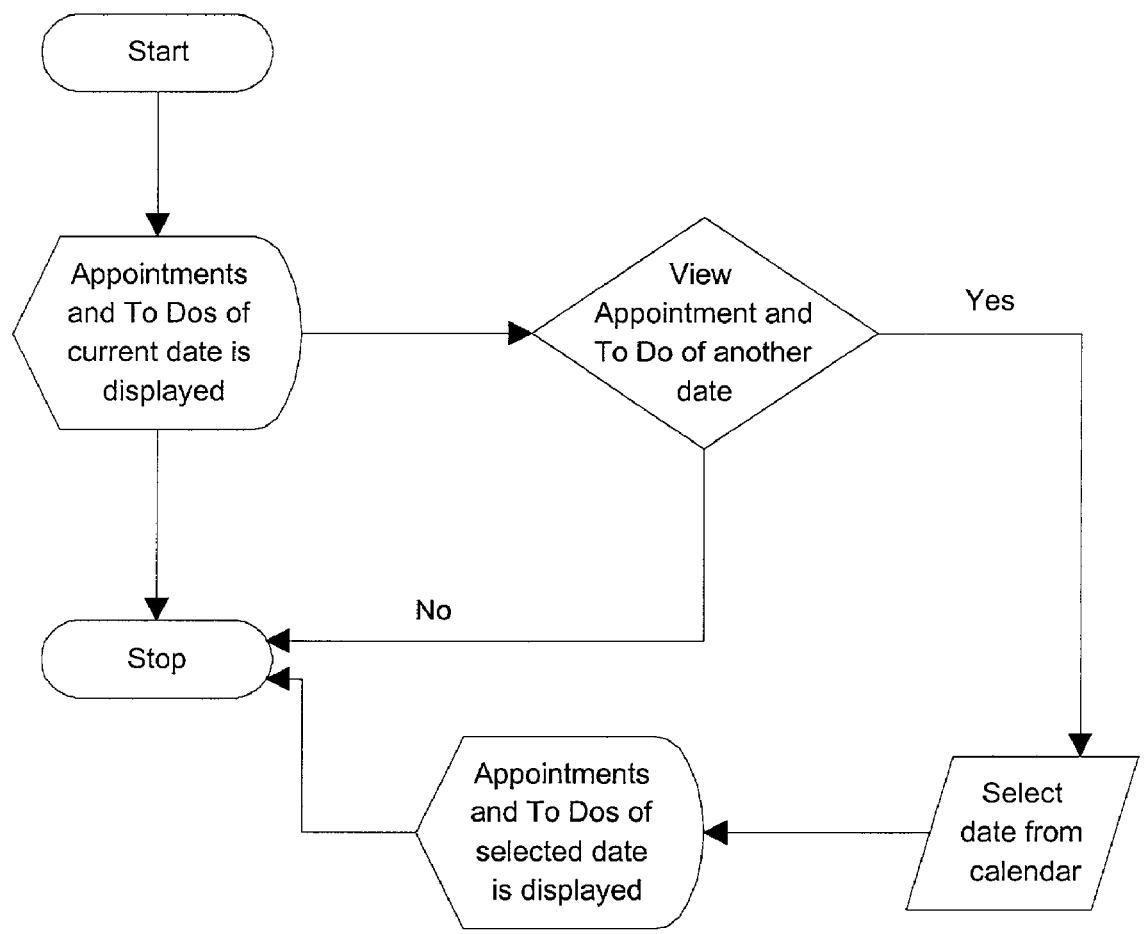
FIG. 33 is a flowchart that continues the appointment management operation of FIG. 31.
Figure 34:
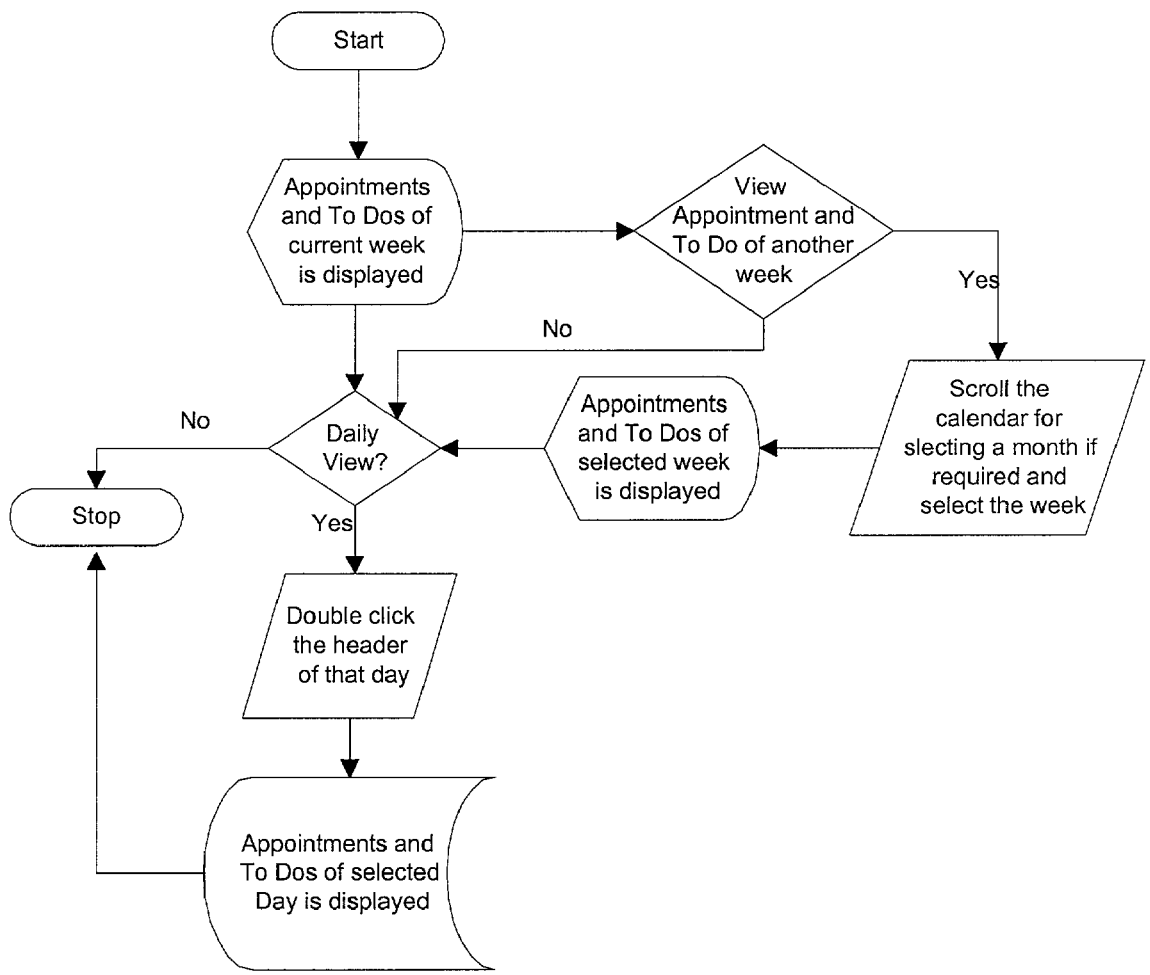
FIG. 34 is a flowchart that continues the appointment management operation of FIG. 31.
Figure 35:
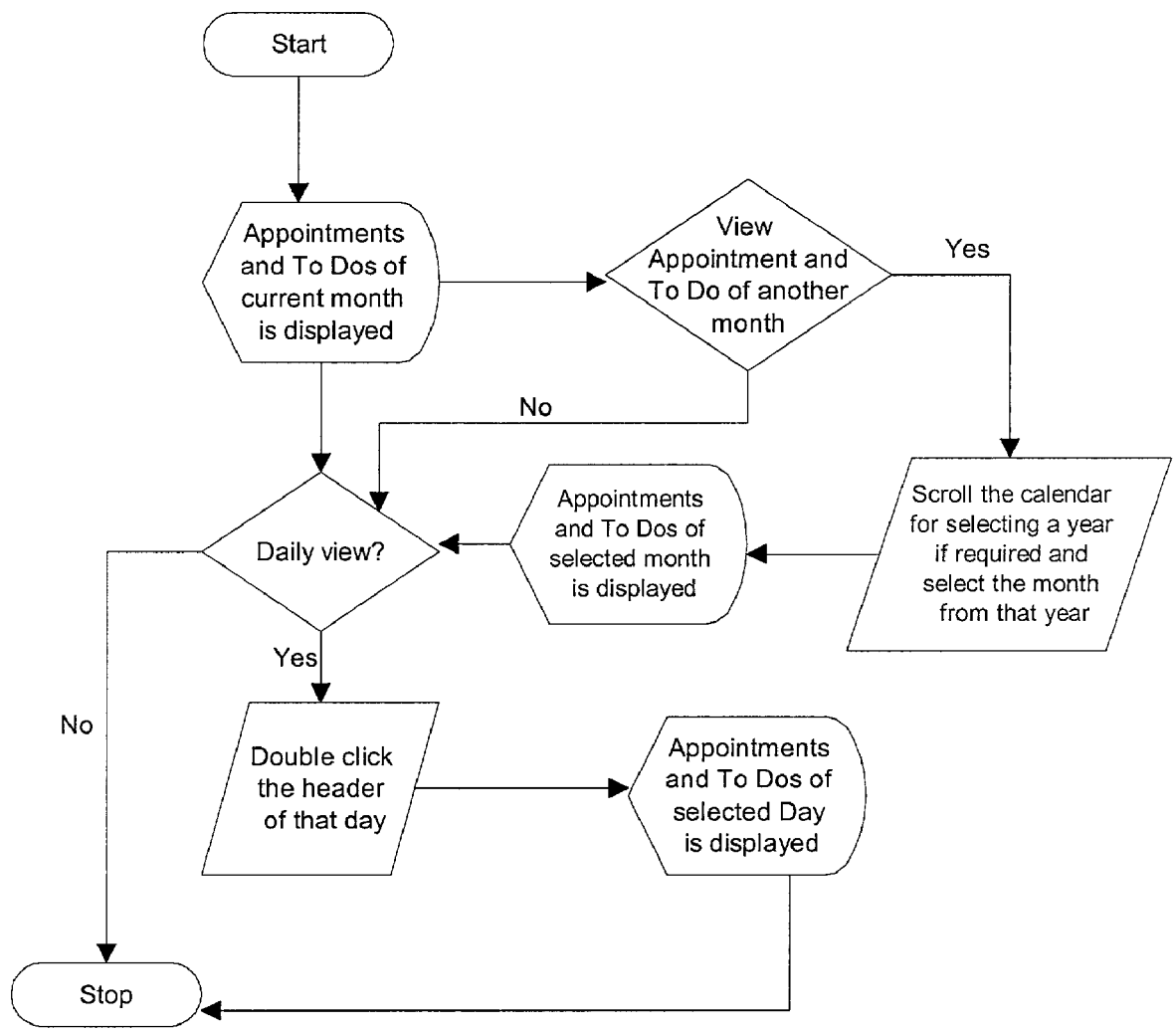
FIG. 35 is a flowchart that continues the appointment management operation of FIG. 31.

In an illustrative embodiment of this invention, the user may enter any specific universe by a number of ways. The user may navigate to the specific universe by following the continuation of relationships between universes. For example, in FIG. 28, there is shown a tree-like hierarchy of relationships between universes. If the user wants to enter the "Marketing" universe of CSAM, the user may consecutively click on "Business," then "CSAM." and finally "Marketing." Otherwise, the user may use the search feature of KUI 107, and seek out appropriate nodes that match the search criteria. FIG. 29 illustrates a flow chart of how the search feature works in a preferred embodiment of Karma. The user is prompted to enter a search string (Block 2902). If the user is searching for a particular universe and, hence, a node is not selected, then Karma Explorer is used to return the results of the search operation (Block 2904). If, however, a node is selected, for example, the CSAM universe of the above example, then the search is performed for the particular string in the CSAM universe (Block 2906).

EXAMPLE 3

Creation of a Universe

In an illustrative embodiment of the invention, the creation of new universes is performed by clicking on an icon 924 for adding nodes, as shown in the global icon set 922 in FIGS. 9A and 9B. For example, if the display is currently focused on the Business sphere as illustrated in FIGS. 11A and 11B, then clicking the icon 924 will create a new universe associated with the Business sphere. Similarly, if the display is currently focused on the People sphere, then, clicking the icon 924 will create a new personality. Alternatively, a new universe can be created by dragging the mouse from a selected parent outward towards the center of the display. For example, a primary universe such as universe 1210 in FIG. 12 would be created by dragging the mouse from the Business sphere's arc towards the center of the display. A secondary universe, such as one of the universes 1212 in FIG. 12, would be created by dragging the mouse from universe 1210 towards the center of the display. Other embodiments may enable the creation of new universe by typical processes known to those skilled in the art. For example, one embodiment may simply have a "Create New Universe" menu item in a typical menu bar on top of the display. Another embodiment may enable a user to right click the mouse over a universe or sphere to create a new child universe by accessing a contextual menu. Similarly, specific keystrokes may be assigned the function of creating a new universe.

EXAMPLE 4

Creating a Relationship

There are a number of ways to create a relationship in Karma. One way is to select a universe, right click on the mouse, and select the option to create a relationship. A second method is to drag one universe or personality on top of another. A third method is to go to the relationships sheet of the notebook associated with a particular node and add a new relationship manually using the Karma Explorer by clicking a <Add Relationship> icon.

EXAMPLE 5

Managing Appointments

As is shown in FIGS. 30-35, the user may schedule new and existing appointments through the appointment sheet. To add an appointment, the user may press a <Add More> button in the KUI 107. The user may edit an existing appointment by double clicking on the appropriate appointment and making the required changes in the appointment window. The user can delete an appointment by dragging the appointment into the trashcan or selecting the appointment and pressing a delete key.

EXAMPLE 6

Organizing Documents

Figure 36:
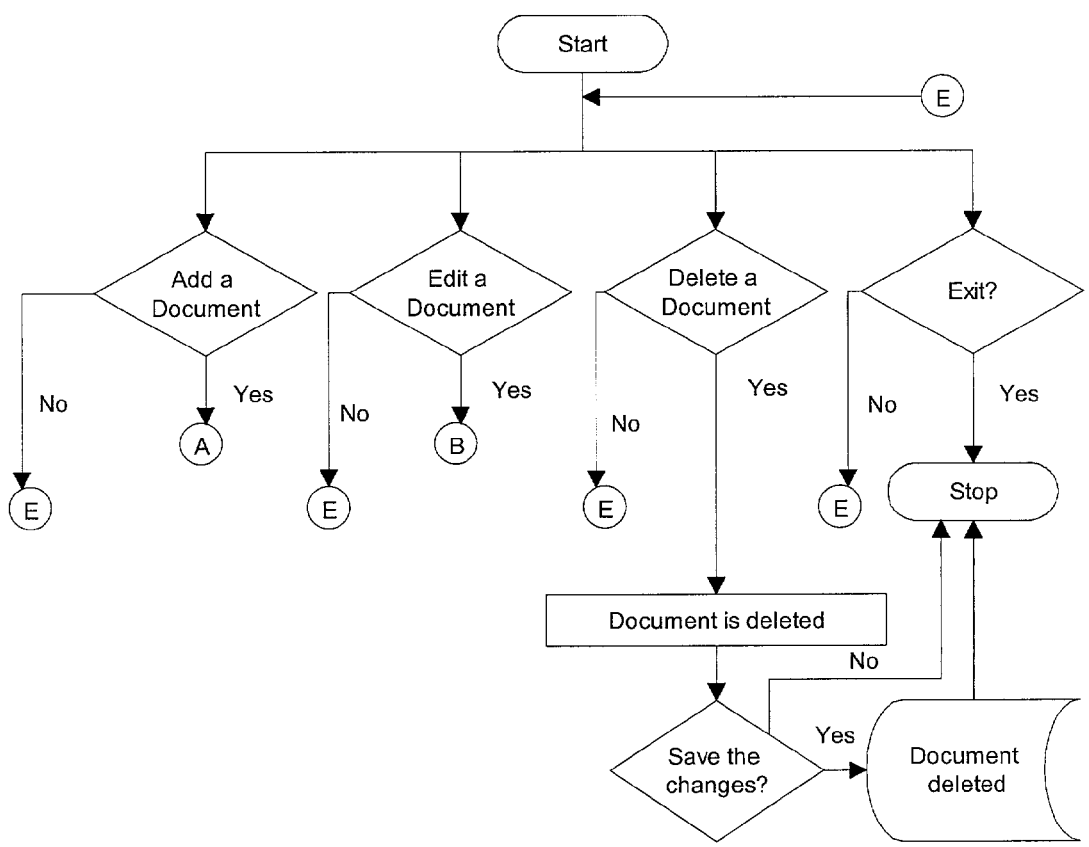
FIG. 36 is a flowchart showing the document management operation.
Figure 37:
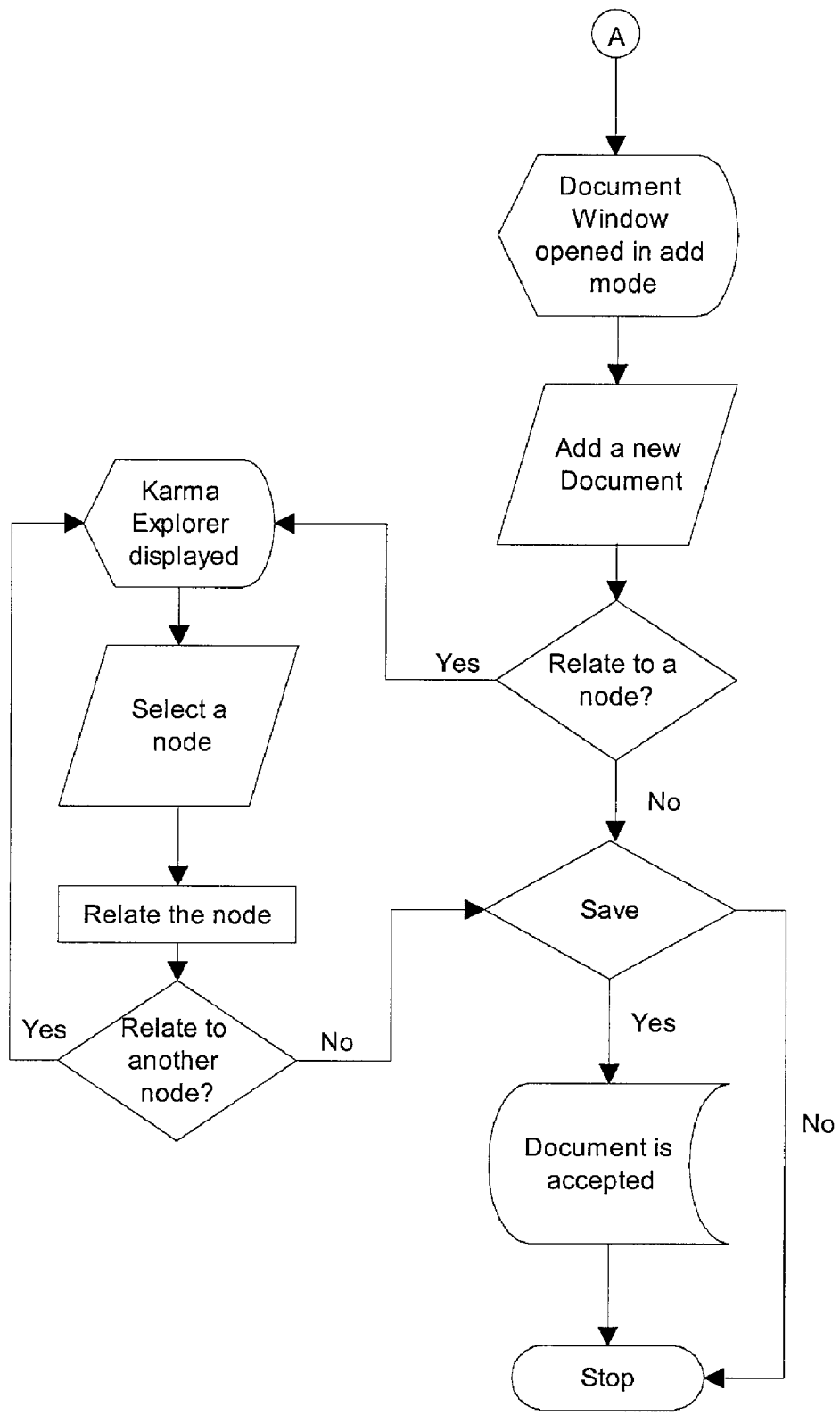
FIG. 37 is a flowchart that continues the document management operation of FIG. 36.
Figure 38:
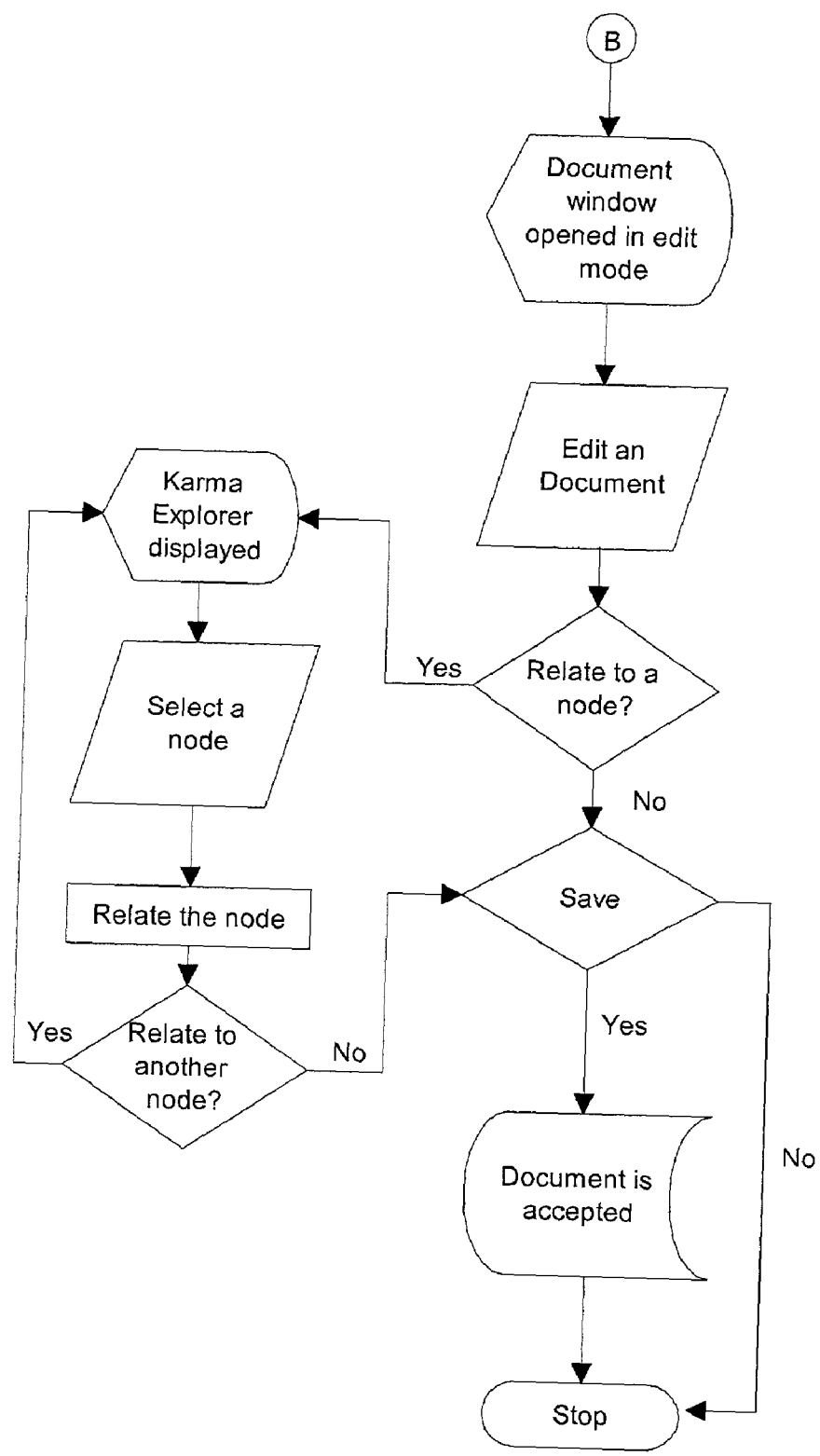
FIG. 38 is a flowchart that continues the document management operation of FIG. 36.

As is shown in FIGS. 36-38, the user may organize documents in Karma. Double clicking on an existing document, opens the document in a corresponding document application window. A document may be added by pressing <Add Document>. Also, a document may be deleted by dragging the document to the trashcan or selecting delete document from a menu.

EXAMPLE 7

Managing Tasks

Figure 39:
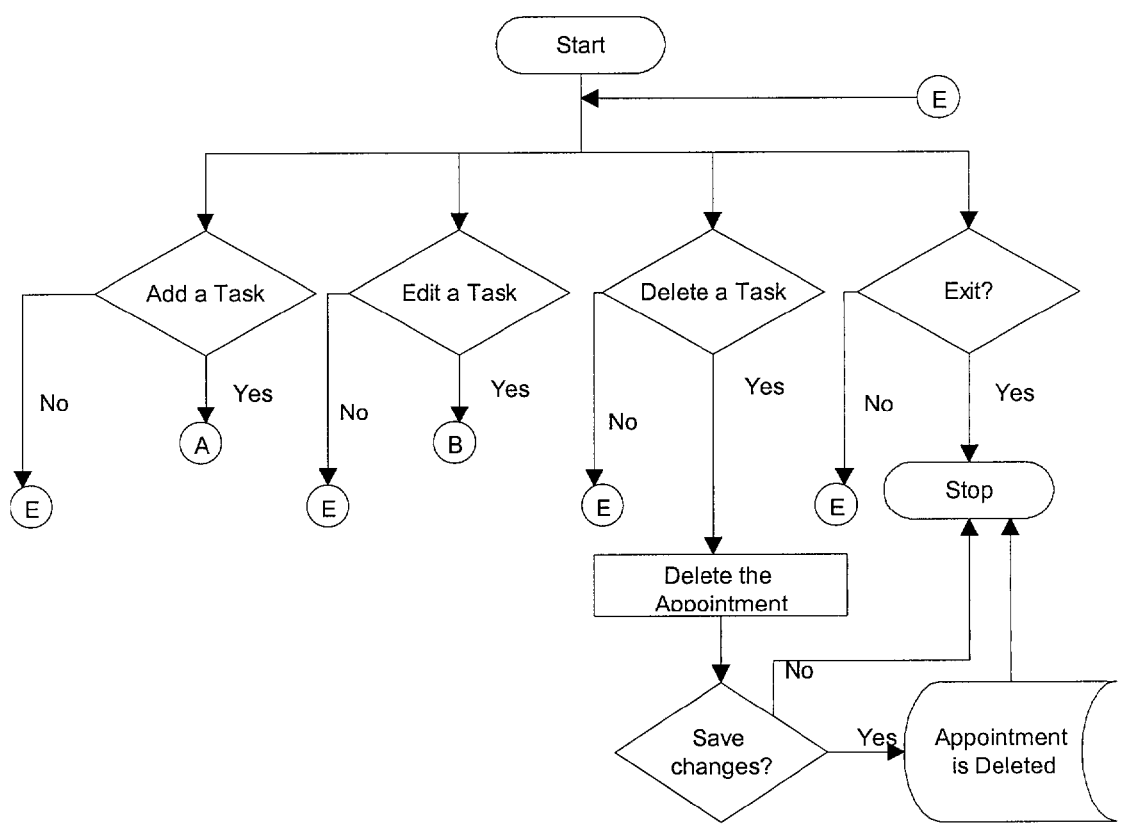
FIG. 39 is a flowchart showing the task management operation.
Figure 40:
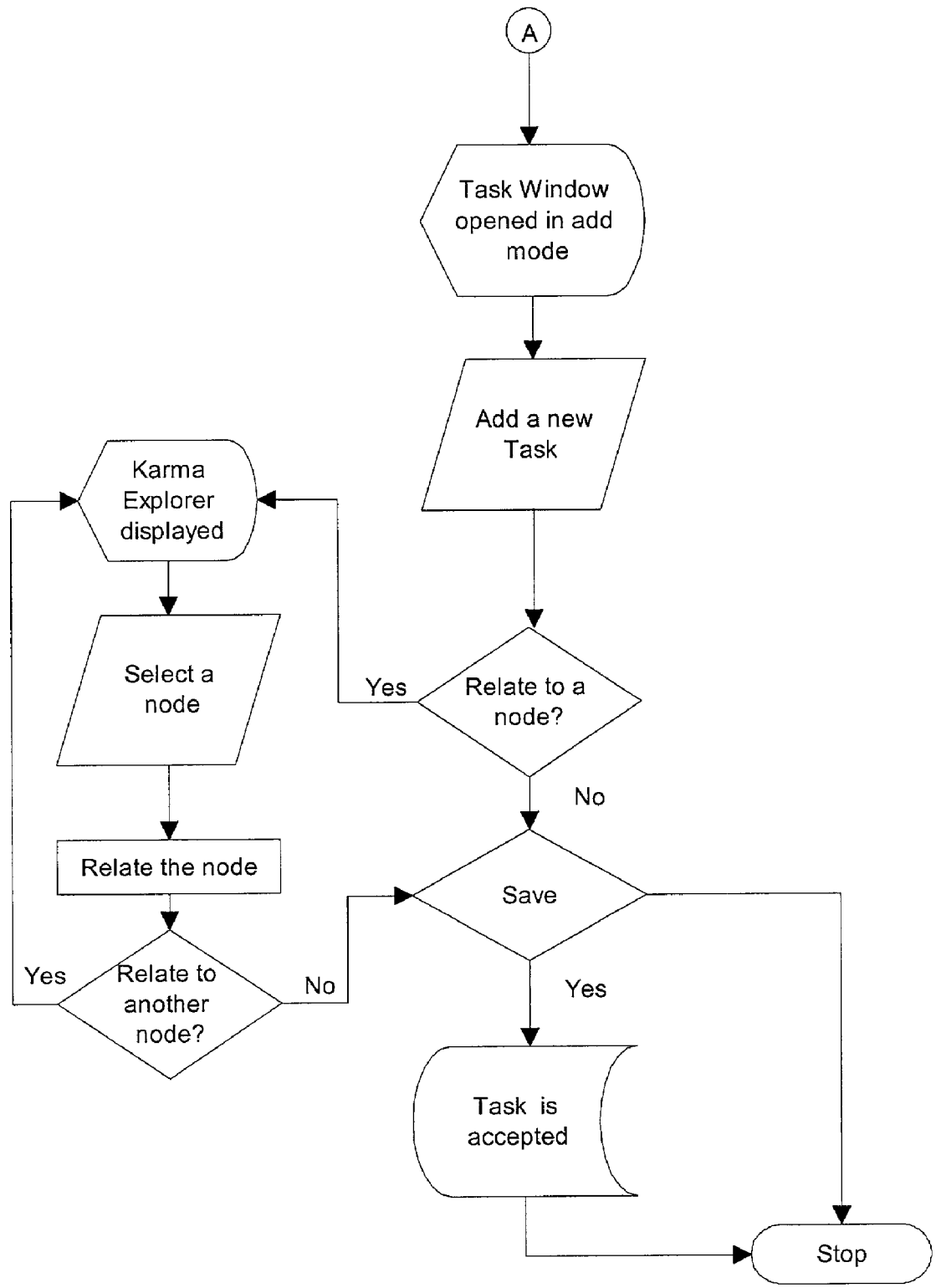
FIG. 40 is a flowchart that continues the task management operation of FIG. 39.
Figure 41:
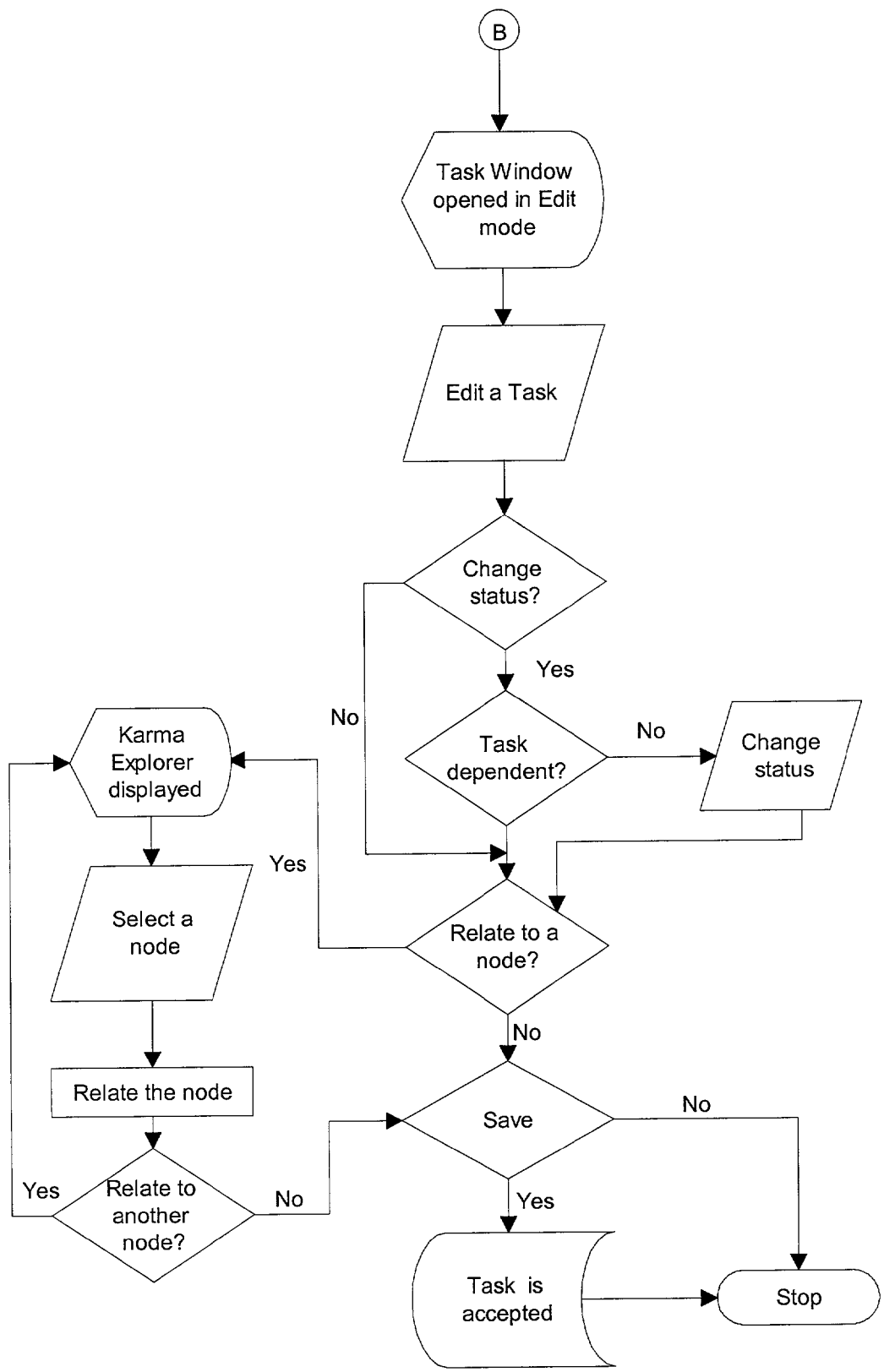
FIG. 41 is a flowchart that continues the task management operation of FIG. 39.

As is shown in FIGS. 39-41, the user may manage tasks by the To Do sheet of Karma. The user may add a new task by pressing <Add Task> and entering appropriate task related information in a task window. The user may update a task by double clicking on the task. Further, a task may be deleted by dragging the task to the trashcan or selecting delete form a task menu.

EXAMPLE 8

Organizing Contacts

The user may organize information pertaining to contacts, associations, connections, family and friends. The user may add an address relating to a high school friend by entering information into a contact window. The user may enter business, home, and vacation addresses, telephone numbers, facsimile numbers, and email addresses for his or her high school friend through the contact window. Further, information relating to URL addresses may be managed through this window.

EXAMPLE 9

Managing Communications

The user may manage information relating to communications made by the user using the telephone, email, chat, voice mail, and facsimile. In an illustrative embodiment, the user may send an email to a business partner. The log entry of such a communication may contain the date, type, email address, and a note relating to the actual email sent. Further, the log entry may be associated with the person that the email was sent to and with the business that the communication pertains to. Such relationships may also be created for facsimiles, voice mails, chat sessions, and telephone conversations relating to the business partner. In such a manner, instead of having facsimiles in one folder and voice mails in another, all communications are located and organized in one place.

EXAMPLE 10

Managing a Home

The Karma system 100 may be used to manage a person's home and the activities and information relating to the home. If the user creates a grocery universe, a chronicle may be displayed with personalities and tools associated with the universe. A summary of activities such as groceries bought and those that need to be bought may be listed. Further, information relating to the cost and budget may be displayed. Further, the same information may be managed for activities including auto maintenance, home collections, home inventory, medical information, diet information, favorite places, music collections, video collections and gift ideas. The auto maintenance universe may contain vehicle information, vehicle name, mileage, service date, service center, service person, service performed, phone number, quality of service, service warranty, total cost, and mode of payment for auto maintenance activities. The home collections tab may include item, category, created by, artist, manufacturer, condition, place of acquisition, acquisition date, current value, and notes for home collectibles. The home inventory universe may contain item, category, serial number, place of acquisition, manufacturer, purchase date, purchase price, actual value, and description for home appliances and products. The medical information universe may contain name, address, specialization, telephone number, facsimile number, service date, and medicines prescribed for medical activities. The diet information universe may contain item, number of units, calories/unit, calories, and total calories for individual dietary activities. The music collections universe may include name, category, artist, location, recording company, media type, price, year, loaned to, loan date, and songs for music. The movie collections universe may include name, category, director, studio, price, year, length, leading actor, leading actress, supporting actress, rating, critics rating, loaned to, loan date and awards for movies. The number of activities in the home that are managed in such a manner is limitless and extends across many categories.

The present invention provides the user with a user-centric interface and personal portal. The user becomes more productive, accomplishing work faster and more efficiently. The present invention creates a graphical user interface of the user's choice. Its use becomes adaptive and reflexive. It mitigates many inefficiencies of the typical graphic user interface, while preserving it's many benefits. The present invention keeps a history of the user's actions.

While various embodiments of the invention have been described, it will be apparent to those of ordinary skill in the art that many more embodiments and implementations are possible that are within the scope of this invention.

What is claimed is:

1. A computerized method for organizing user activities and information, the method comprising the steps of:
   creating a plurality of spheres corresponding to the activities and information;
   identifying activities and information for each sphere;
   creating universes corresponding to a subset of the activities and information, wherein each universe is related to at least one sphere;
   creating personalities corresponding to an individual associated with the user and the user's activities and information, wherein each personality corresponds to at least one sphere;
   a computer user establishing parent, child, and jump relationships among the spheres, universes and personalities;
   a computer system learning a pattern of relationships established by the computer user and creating additional relationships that follow the learned pattern; and
   representing the spheres, universes, and personalities as nodes in a graphical user interface, and further representing the relationships as links between the nodes.

2. The method of claim 1 further comprising the step of associating a notebook with each universe wherein the notebook organizes a plurality of characteristics corresponding to the universe.

3. The method of claim 2 wherein the notebook comprises general, communication, management, and document activities and information and access to communication, management, and document creating applications.

4. The method of claim 1 wherein each universe comprises related information, and transactions.

5. The method of claim 1 wherein the spheres comprise objects relating to business activities and information, personal activities and information, people information, and tools.

6. The method of claim 5 wherein the communication, management, and document creating applications may be compatible third party applications.

7. The method of claim 2 further comprising the step of consolidating all information from associated notebooks into one global notebook.

8. The method of claim 1 further comprising the step of performing operations on the universes and personalities to perform functions comprising communication, documentation, management, and navigation.

9. The method of claim 8 wherein operations are performed by associating software applications to perform communication, documentation, management, and navigation.

10. The method of claim 1 further comprising the step of tracking user operations and storing the user operations in a database.

11. The method of claim 1 further comprising the step of sending the graphical user interface to a networked computer for remote access.

12. A computer system for organizing user activities and information, the system comprising:
    a visual display for representing the user activities and information;
    a storage medium for storing and retrieving information related to the user activities and information;
    a computer processor coupled to the visual display and to the storage medium for accessing and processing information stored in the storage medium to provide a graphical user interface of user activities and information;
    an input means coupled to the computer processor for entering information related to the representation of user activities and information;
    a software portion for creating a plurality of spheres corresponding to the activities and information;
    a software portion for identifying activities and information for each sphere;
    a software portion for creating universes corresponding to a subset of the activities and information wherein each universe corresponds to at least one sphere;
    a software portion for creating personalities corresponding to an individual associated with the user and the user's activities and information, wherein each personality corresponds to at least one sphere;
    a software portion for establishing parent, child, and jump relationships among the spheres, universes and personalities, for learning patterns of relationships established by a computer user and for adding relationships that follow patterns of relationships established by the computer user; and
    a software portion for providing navigation of the spheres, universes, and personalities.

13. The system of claim 12 wherein the graphical user interface comprises:
    a software portion for displaying icons representing spheres corresponding to activities and information;
    a software portion for selecting an icon, whereby the selected icon and icons representing the universes, comprising child and jump, corresponding to the selected icon are displayed;
    a software portion for traversing through related universes, whereby selection of an icon representing a universe displays icons representing child and jump universes; and
    a software portion for selecting a desired universe from the displayed icons representing child and jump universes.

14. The system of claim 13 further comprising a software portion for displaying a notebook associated with the desired universe, the notebook comprising activities and information and access to applications.

15. The system of claim 13 wherein the software portions reside on top of an existing operating system and interacts with the existing operating system.

16. The system of claim 13 such that the system is embodied in an existing operating system.

17. The system of claim 13 wherein the software portions reside in computer systems comprising a cellular telephone, a personal digital assistant, a networked computer, a computer server, and a stand alone computer.

18. The system of claim 13 further comprising a software portion for providing a relational database to process information and relationships between the spheres, universes, personalities and notebooks.

19. The system of claim 13 further comprising a software portion for transparently incorporating compatible third party applications into the system.

20. The system of claim 13 further comprising a software portion for synchronizing information with third party information management systems.

21. The system of claim 13 further comprising a set of preconfigured spheres, universes, and relationships between spheres and universes.

22. The system of claim 13 further comprising a remote server for providing remote access to the representation of user activities and information.

23. A computer program product for organizing user activities and information comprising:
- a computer usable storage medium having computer readable program code means embodied in the storage medium for a representation of user activities and information;
- computer readable program code means to construct spheres, each sphere comprising universes, wherein each universe corresponds to particular user activities and information;
- computer readable program code means to construct a hierarchy of universes corresponding to an associated sphere;
- computer readable program code means to construct a notebook related to a universe, wherein the notebook organizes the user activities and information corresponding to the related universe;
- computer readable program code means to establish relationships between spheres, universes, and personalities based on relationships selected by a computer user;
- computer readable program code means to add relationships between spheres, universes, and personalities based on a learned pattern of relationships established by the computer readable code means to establish relationships; and
- a computer readable program code means to provide a graphical user interface to navigate through the user activities and information wherein the spheres, universes, and personalities are represented as nodes and the relationships are represented as links between the nodes.

24. The computer program product of claim 23 further comprising computer readable program code means for a set of preconfigured spheres and universes.

25. The computer program product of claim 23 further comprising computer readable program code means for an expert system to predict user activities and information.

26. The method of claim 1 wherein the step of the computer predicting additional relationships further comprises the step of the computer system examining a document to determine whether a relationship may be necessary between two universes and observing whether the computer user has established similar relationships in the past.

* * * * *